(12) United States Patent  
Yoshida et al.

(10) Patent No.: US 7,640,269 B2  
(45) Date of Patent: Dec. 29, 2009

(54) IMAGE PROCESSING SYSTEM AND IMAGE PROCESSING METHOD

(75) Inventors: Hiroyoshi Yoshida, Ohta-ku (JP); Shinichi Kato, Kawasaki (JP); Kenzou Sekiguchi, Machida (JP); Hiroyuki Tsuji, Yokohama (JP); Eiichi Nishikawa, Kawasaki (JP); Hiroyuki Yaguchi, Yokohama (JP); Masakazu Kitora, Kawasaki (JP); Yushi Matsukubo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 11/174,457

(22) Filed: Jul. 6, 2005

(65) Prior Publication Data

US 2006/0010115 A1 Jan. 12, 2006

(30) Foreign Application Priority Data

Jul. 7, 2004 (JP) .............................. 2004-200801

(51) Int. Cl.
*G06F 17/30* (2006.01)
(52) U.S. Cl. ..................... 707/104.1; 707/102; 399/182
(58) Field of Classification Search ................ 382/176, 382/309, 173; 358/452, 448, 537; 399/182; 707/102, 6
See application file for complete search history.

(56) References Cited

U.S. PATENT DOCUMENTS

| | | | | |
|---|---|---|---|---|
| 4,759,075 A | 7/1988 | Lipkie et al. | ............... | 382/46 |
| 4,908,873 A | 3/1990 | Philibert et al. | ........... | 382/34 |
| 4,935,821 A | 6/1990 | Sano et al. | ............... | 358/427 |
| 5,062,074 A | 10/1991 | Kleinberger | ............ | 364/900 |
| 5,251,268 A | 10/1993 | Colley et al. | .............. | 382/14 |
| 5,642,435 A | 6/1997 | Loris | ........................ | 382/229 |
| 5,761,655 A | 6/1998 | Hoffman | ..................... | 707/4 |
| 5,761,689 A * | 6/1998 | Rayson et al. | ............ | 715/533 |
| 5,848,186 A | 12/1998 | Wang et al. | ............... | 382/176 |
| 5,859,662 A | 1/1999 | Cragun et al. | ............. | 348/13 |
| 5,890,808 A | 4/1999 | Neff et al. | ................ | 382/209 |
| 5,995,978 A | 11/1999 | Cullen et al. | ............. | 707/104 |

(Continued)

FOREIGN PATENT DOCUMENTS

CN 1276569 12/2000

(Continued)

OTHER PUBLICATIONS

Scalable Vector Graphics (SVG) 1.1 Specification W3C Recommendation Jan. 14, 2003 http://www.w3.org/TR/SVG11/.*

*Primary Examiner*—Neveen Abel Jalil
*Assistant Examiner*—Vei-Chung Liang
(74) *Attorney, Agent, or Firm*—Fitzpatrick, Cella, Harper & Scinto

(57) ABSTRACT

This invention provides an image processing system and image processing method which can promote efficient use of a memory by vectorizing all data of a representative object and, for the same or similar object, referring to the vectorized representative object and using difference data and also convert the same or similar objects at once by editing only the representative object. Input image information is vectorized. The vector data of a representative object is stored. Identity between a target object and the representative object is determined. If the two objects are identical, property information containing information about the reference destination of the vector data of the representative object is stored in place of the vector data of the target object.

11 Claims, 43 Drawing Sheets

U.S. PATENT DOCUMENTS

| | | | | |
|---|---|---|---|---|
| 6,043,823 | A * | 3/2000 | Kodaira et al. | 345/619 |
| 6,104,500 | A | 8/2000 | Alam et al. | 358/1.15 |
| 6,138,156 | A | 10/2000 | Fletcher et al. | 709/224 |
| 6,275,610 | B1 | 8/2001 | Hall, Jr. et al. | 382/180 |
| 6,275,850 | B1 | 8/2001 | Beyda et al. | 709/206 |
| 6,301,586 | B1 | 10/2001 | Yang et al. | 707/104 |
| 6,360,252 | B1 | 3/2002 | Rudy et al. | 709/206 |
| 6,397,213 | B1 | 5/2002 | Cullen et al. | 707/5 |
| 6,434,552 | B1 | 8/2002 | Leong | 707/4 |
| 6,466,694 | B2 * | 10/2002 | Kamada et al. | 382/181 |
| 6,470,336 | B1 | 10/2002 | Matsukawa et al. | 707/4 |
| 6,580,820 | B1 | 6/2003 | Fan | 382/135 |
| 6,658,145 | B1 | 12/2003 | Silver et al. | 382/149 |
| 6,687,741 | B1 | 2/2004 | Ramaley et al. | 709/206 |
| 6,707,568 | B1 | 3/2004 | Yu | 358/1.15 |
| 6,741,743 | B2 | 5/2004 | Stalcup et al. | 382/217 |
| 6,782,402 | B1 | 8/2004 | Hidaka et al. | 707/203 |
| 6,799,717 | B2 | 10/2004 | Harris | 235/375 |
| 6,944,344 | B2 | 9/2005 | Imagawa et al. | 382/229 |
| 6,944,815 | B2 | 9/2005 | Bierbrauer et al. | 715/500 |
| 6,977,754 | B2 | 12/2005 | Matsumoto et al. | 358/1.9 |
| 7,085,437 | B2 * | 8/2006 | Nakajima et al. | 382/311 |
| 7,203,364 | B2 * | 4/2007 | Yamazaki | 382/177 |
| 7,240,077 | B1 * | 7/2007 | Edelman et al. | 707/203 |
| 7,248,744 | B2 | 7/2007 | Cockshott | 382/253 |
| 2001/0014164 | A1 | 8/2001 | Daniels et al. | 382/101 |
| 2002/0003633 | A1 | 1/2002 | Matsumoto et al. | 358/1.9 |
| 2002/0037100 | A1 | 3/2002 | Toda et al. | 382/166 |
| 2002/0071606 | A1 | 6/2002 | Watanabe et al. | 382/177 |
| 2002/0141660 | A1 | 10/2002 | Bellavita et al. | 382/309 |
| 2002/0196465 | A1 | 12/2002 | Ohta | 358/1.16 |
| 2003/0019922 | A1 | 1/2003 | Kuo et al. | 235/375 |
| 2003/0031371 | A1 | 2/2003 | Kato et al. | 382/239 |
| 2003/0046352 | A1 | 3/2003 | Katsuda et al. | 709/206 |
| 2003/0050933 | A1 | 3/2003 | DeSalvo | 707/102 |
| 2003/0051044 | A1 | 3/2003 | Parry et al. | 709/231 |
| 2003/0072500 | A1 * | 4/2003 | Sugegaya et al. | 382/305 |
| 2003/0085162 | A1 | 5/2003 | Daniels, Jr. et al. | 209/584 |
| 2003/0107771 | A1 | 6/2003 | Shibata | 358/3.28 |
| 2003/0197891 | A1 | 10/2003 | Honda | 358/1.15 |
| 2004/0010419 | A1 | 1/2004 | Sinnott | 705/2 |
| 2004/0083434 | A1 | 4/2004 | Fitch | 715/541 |
| 2004/0085327 | A1 | 5/2004 | Jones et al. | 345/591 |
| 2004/0090641 | A1 | 5/2004 | Namikata | 358/1.9 |
| 2004/0137416 | A1 | 7/2004 | Ma et al. | 434/365 |
| 2004/0141613 | A1 | 7/2004 | Hayashi | 380/28 |
| 2004/0148274 | A1 | 7/2004 | Warnock et al. | 707/2 |
| 2004/0151377 | A1 | 8/2004 | Boose et al. | 382/193 |
| 2004/0250083 | A1 | 12/2004 | Schwab | 713/182 |
| 2005/0010868 | A1 | 1/2005 | Schowtka et al. | 715/517 |
| 2005/0015379 | A1 * | 1/2005 | Aureglia et al. | 707/100 |
| 2005/0018237 | A1 | 1/2005 | Cossel et al. | 358/1.15 |
| 2005/0023355 | A1 * | 2/2005 | Barrus | 235/462.15 |
| 2005/0071676 | A1 | 3/2005 | Park et al. | 713/201 |
| 2005/0089229 | A1 * | 4/2005 | Morishita | 382/218 |
| 2005/0111052 | A1 | 5/2005 | Nishikawa et al. | 358/448 |
| 2005/0111053 | A1 | 5/2005 | Yoshida et al. | 358/448 |
| 2005/0123209 | A1 | 6/2005 | Kitora et al. | 382/243 |
| 2005/0134906 | A1 | 6/2005 | Takashima | 358/1.15 |
| 2005/0144136 | A1 | 6/2005 | Murashita | 705/51 |
| 2005/0262243 | A1 | 11/2005 | Ternasky et al. | 709/225 |
| 2005/0271296 | A1 | 12/2005 | Tsuji et al. | 382/275 |
| 2005/0286805 | A1 | 12/2005 | Yoshida | 382/305 |
| 2005/0288943 | A1 | 12/2005 | Wei et al. | 705/1 |
| 2006/0007481 | A1 | 1/2006 | Kato et al. | 358/1.15 |
| 2006/0008113 | A1 | 1/2006 | Matsukubo et al. | 382/100 |
| 2006/0008114 | A1 | 1/2006 | Sekiguchi et al. | 382/100 |
| 2006/0010116 | A1 | 1/2006 | Yaguchi et al. | 707/3 |
| 2006/0116993 | A1 | 6/2006 | Oguri et al. | 707/3 |
| 2006/0143153 | A1 | 6/2006 | Mifune et al. | 707/1 |

FOREIGN PATENT DOCUMENTS

| | | |
|---|---|---|
| CN | 1277410 | 12/2000 |
| EP | 1 058 199 A2 | 12/2000 |
| GB | 2 313 729 A | 12/1997 |
| JP | 2-184173 | 7/1990 |
| JP | 4-34650 | 2/1992 |
| JP | 4-302073 | 10/1992 |
| JP | 5-12402 | 1/1993 |
| JP | 5-28254 | 2/1993 |
| JP | 5-303644 | 11/1993 |
| JP | 5-334430 | 12/1993 |
| JP | 5-342408 | 12/1993 |
| JP | 6-46271 | 2/1994 |
| JP | 6-119448 | 4/1994 |
| JP | 6-178066 | 6/1994 |
| JP | 6-270477 | 9/1994 |
| JP | 6-290264 | 10/1994 |
| JP | 7-36433 | 2/1995 |
| JP | 7-85221 | 3/1995 |
| JP | 8-242326 | 9/1996 |
| JP | 9-50433 | 2/1997 |
| JP | 10-293737 | 11/1998 |
| JP | 11-143794 | 5/1999 |
| JP | 11-185018 | 7/1999 |
| JP | 11-232296 | 8/1999 |
| JP | 11-284835 | 10/1999 |
| JP | 11-312244 | 11/1999 |
| JP | 2000-261574 | 9/2000 |
| JP | 2000-322425 | 11/2000 |
| JP | 2001-57631 | 2/2001 |
| JP | 2001-218030 | 8/2001 |
| JP | 2003-22307 | 1/2003 |
| JP | 2003-107119 | 4/2003 |
| JP | 2003-134327 | 5/2003 |
| JP | 2003-169169 | 6/2003 |
| JP | 2003-248832 | 9/2003 |

* cited by examiner

FIG. 4
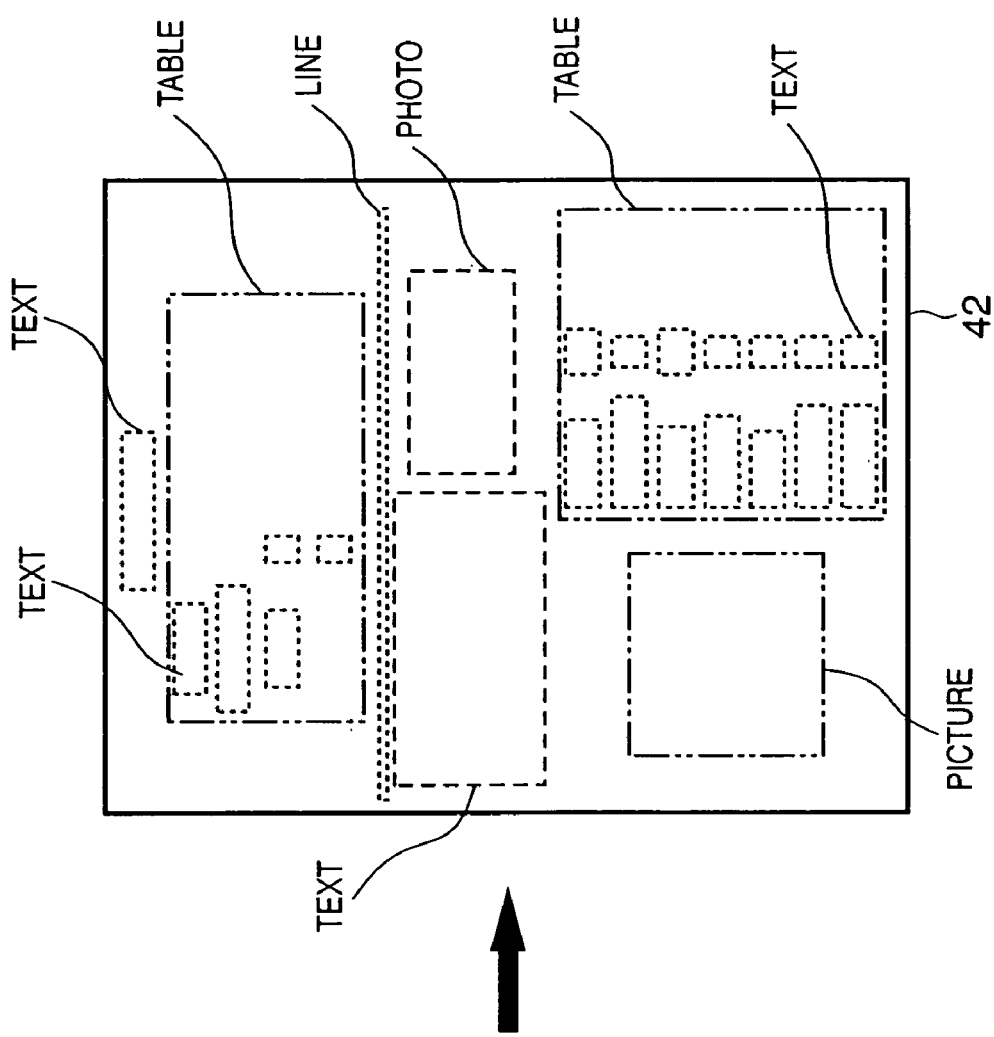
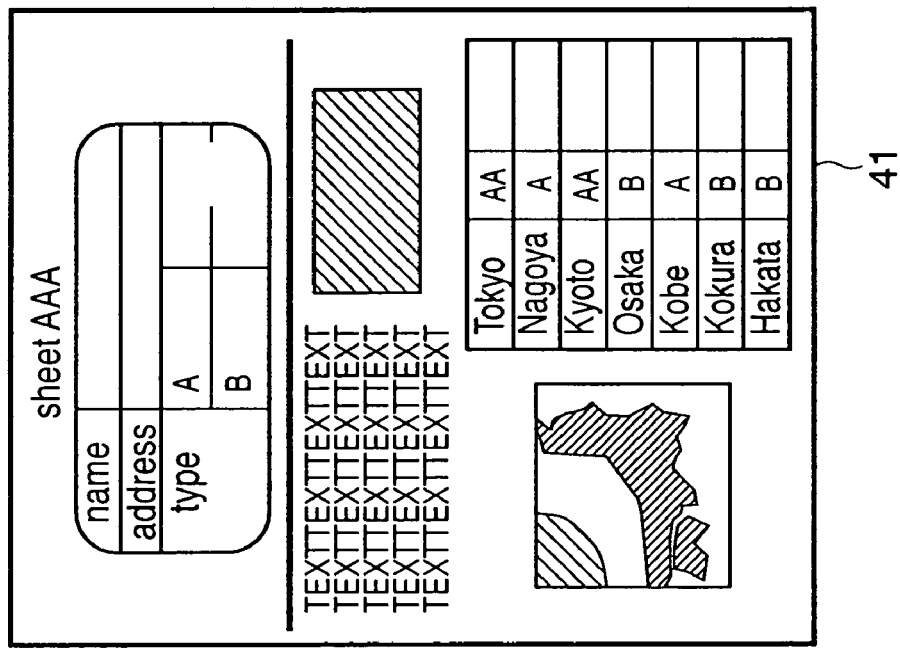

FIG. 5

BLOCK INFORMATION

| | PROPERTY | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

PROPERTY  1 : text  2 : picture  3 : table  4 : line  5 : photo

INPUT FILE INFORMATION

| TOTAL NUMBER OF BLOCKS | N(=6) |
|---|---|

F I G. 11
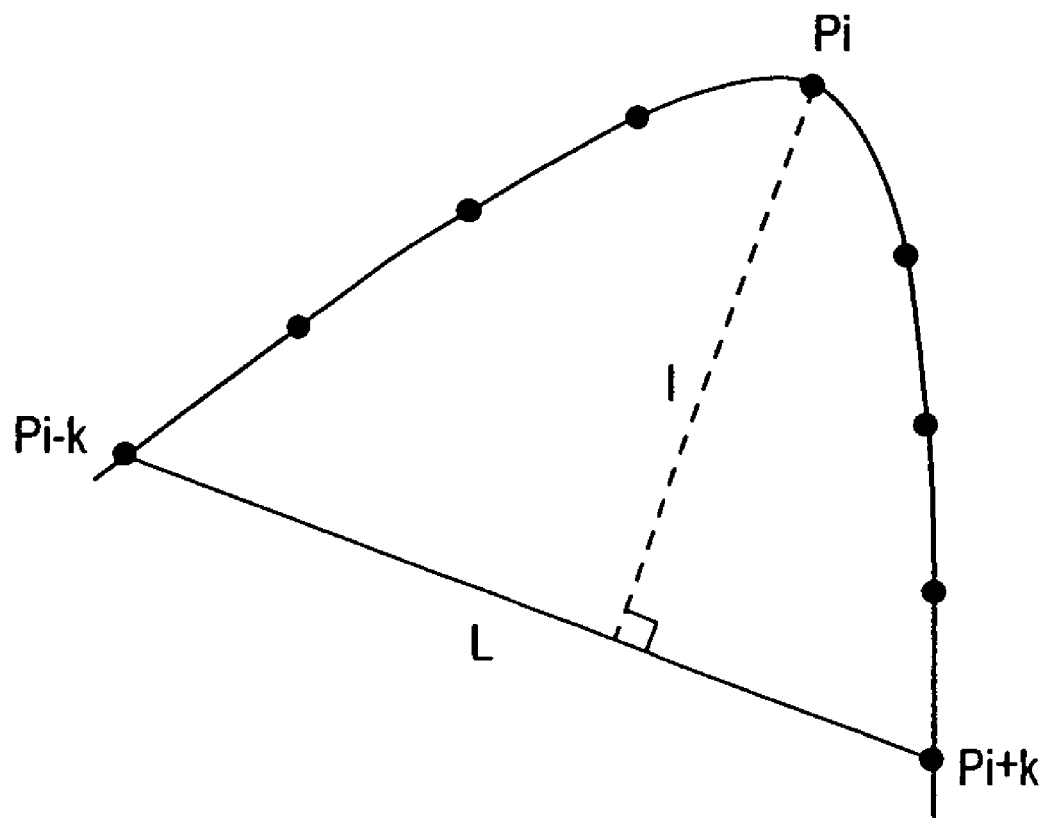

FIG. 20

| REPRESENTATIVE OBJECT NUMBER | VECTOR DATA STORAGE ADDRESS | REFERENCE OBJECT LIST ADDRESS |
|---|---|---|
| 1 | /image/vectorized/188527806 | /image/reference/188527806 |
| 2 | /image/vectorized/188527807 | /image/reference/188527807 |
| | | |

FIG. 21

REFERENCE OBJECT LIST
/image/reference/188527806

| |  |
|---|---|
| /image/vectorized/18853009 | ~21a |
| /image/vectorized/18853046 | ~21b |
| /image/vectorized/18856035 | ~21c |
| | |

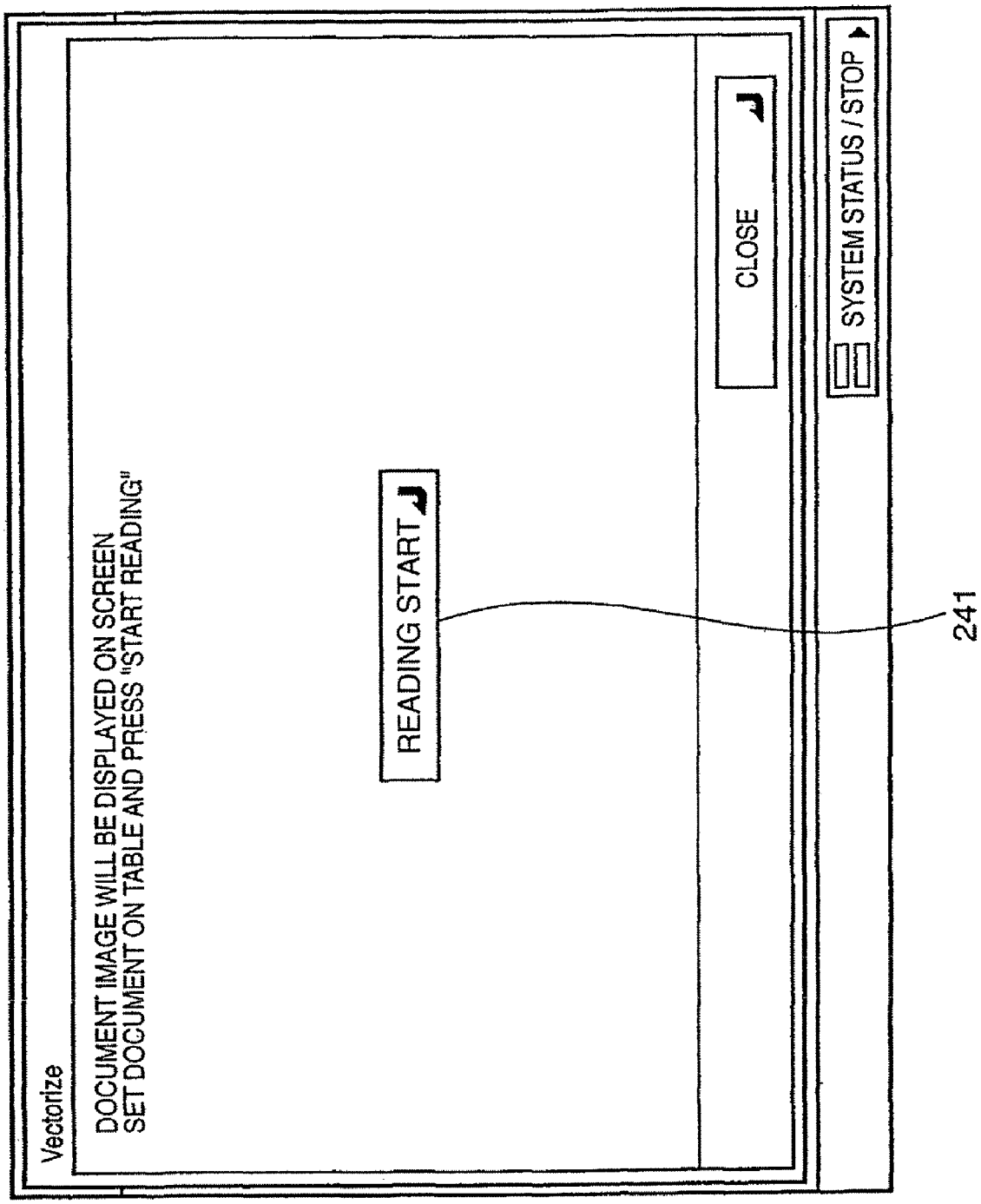

FIG. 25

```
001: <?xml version="1.0" standalone="no"?>
002: <!DOCTYPE svg PUBLIC" -//W3C//DTD SVG 20010904//EN" "http://www.
w3.org/TR/2001/REC-SVG-20010904/DTD/svg10.dtd">
003: <svg width="4in" height="3in" xmlns="http://www.w3.org/2000/svg" xmlns:
xlink="http://www.w3.org/1999/xlink">
004: <desc>This graphic links to an external image
005: </desc>
006: <image x="200" y="200" width="100px" height="100px" xlink:href="/image/
vectorize/18853007">
007: </image>
008: <atrib size=50% rotate=270 location=(15,89)><image x="200" y="200"
width="100px" height="100px" xlink:href="/image/vectorize/188527806">
009: </image>
      ---------- snip ----------
886: </svg>
```

IMAGE PROCESSING SYSTEM AND IMAGE PROCESSING METHOD

FIELD OF THE INVENTION

The present invention relates to an image processing system and image processing method, which convert input image information into vector data reusable by general-purpose document creation application software.

BACKGROUND OF THE INVENTION

Along with a recent growing interest in environmental issues, move to paperless offices has rapidly been promoted. For this purpose, there is conventionally known a document management system which reads paper documents accumulated in binders by using a scanner, converts the read images into portable document format (to be abbreviated as "PDF" hereinafter) data, and accumulates them in an image storage device as a database.

An image processing system has also been developed, which reads a paper document by using a scanner, extracts objects such as characters, tables, and illustrations on the document by executing image processing such as OCR (Optical Character Recognition) and edge extraction, and generates reusable vector data (e.g., Japanese Patent Application Laid-Open No. 5-342408).

In the above-described conventional image processing system to generate vector data, however, any batch process of a plurality of images has not been examined. For example, when document sheets each having a company's logotype are read, the same object repeatedly appears in the plurality of images. In storing such images in a memory as vector data, individually vectorizing and storing all objects such as a logotype that appears many times is not efficient from the viewpoint of utilization of the memory as a limited hardware resource. In addition, to reuse these data stored in the memory, even similar objects must individually be edited, resulting in cumbersome operation. Furthermore, the objects may be reconstructed as different due to conversion errors.

SUMMARY OF THE INVENTION

The present invention has been proposed to solve the conventional problems, and has as its object to provide an image processing system and image processing method which can promote efficient use of a memory by vectorizing all data of a representative object and, for the same or similar object, referring to the vectorized representative object and using difference data and also convert the same or similar objects at once by editing the representative object.

In order to solve the above problems, according to the present invention, there is provided an image processing system comprising:

an input unit, adapted to input image information;

a vectorization unit, adapted to vectorize the image information;

a first storage unit, adapted to store vector data of a first object (i.e., a representative object) contained in the image information;

a determination unit, adapted to determine identity between the first object and a second object contained in the image information; and a second storage unit, adapted to, when the first object and the second object are identical, store property information containing information about a reference destination of the vector data of the first object in place of vector data of the second object.

The image processing system is characterized in that the second storage unit also stores difference information between the first object and the second object in association with the property information.

In order to solve the above problems, according to the present invention, there is also provided an image processing system comprising:

a first storage unit, adapted to store vector data of a first object serving as a representative for image information containing a plurality of identical objects;

a second storage unit, adapted to store, as data of a second object identical to the first object, property information containing information about a reference destination of the first object and difference information between the second object and the first object;

a first reconstruction unit, adapted to, in reconstructing the image information, reconstruct the first object from the vector data stored in the first storage unit; and a second reconstruction unit, adapted to, in reconstructing the image information, reconstruct the second object by referring to the first object on the basis of the property information stored in the second storage unit and using the vector data of the first object and the difference information.

The image processing system is characterized in that when the second object cannot be reconstructed from the vector data of the first object as the reference destination, the second reconstruction unit reconstructs the second object by using vector data of an alternate object.

According to the present invention, there is also provided an image processing method comprising:

an input step of inputting image information;

a vectorization step of vectorizing the image information;

a first storage step of storing, in a storage device, vector data of a first object contained in the image information;

a determination step of determining identity between the first object and a second object contained in the image information; and a second storage step of, when the first object and the second object are identical, storing, in the storage device, property information containing information about a reference destination of the vector data of the first object in place of vector data of the second object.

According to the present invention, there is also provided an image processing method in an image processing system including a first storage unit, adapted to store vector data of a first object serving as a representative for image information containing a plurality of identical objects, and a second storage unit, adapted to store, as data of a second object identical to the first object, property information containing information about a reference destination of the first object and difference information between the second object and the first object, comprising:

a first reconstruction step of, in reconstructing the image information, reconstructing the first object from the vector data stored in the first storage unit; and a second reconstruction step of, in reconstructing the image information, reconstructing the second object by referring to the first object on the basis of the property information stored in the second storage unit and using the vector data of the first object and the difference information.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 4 is a view showing a state wherein read image data of one page is segmented into a plurality of blocks by a block selection process by determining properties;

FIG. 5 is a table showing an example of block information of respective blocks obtained by the block selection process in step S1201;

FIG. 11 is a view for explaining a point with a maximal curvature;

FIG. 20 is a view showing an example of property information of vectorized representative objects;

FIG. 21 is a view showing an example of a character information link table as a list of objects which refer to representative objects;

FIG. 24 is a view showing a vectorization process window to execute a vectorization process function;

FIG. 25 is a view showing an example of an XML-based SVG file generated by reading a document;

DETAILED DESCRIPTION OF THE PREFERRED EMBODIMENTS

The arrangement of an image processing system according to a preferred embodiment of the present invention and the contents of various kinds of image processes using the system will be described below with reference to the accompanying drawings.

[Arrangement of Image Processing System]

Figure 1:
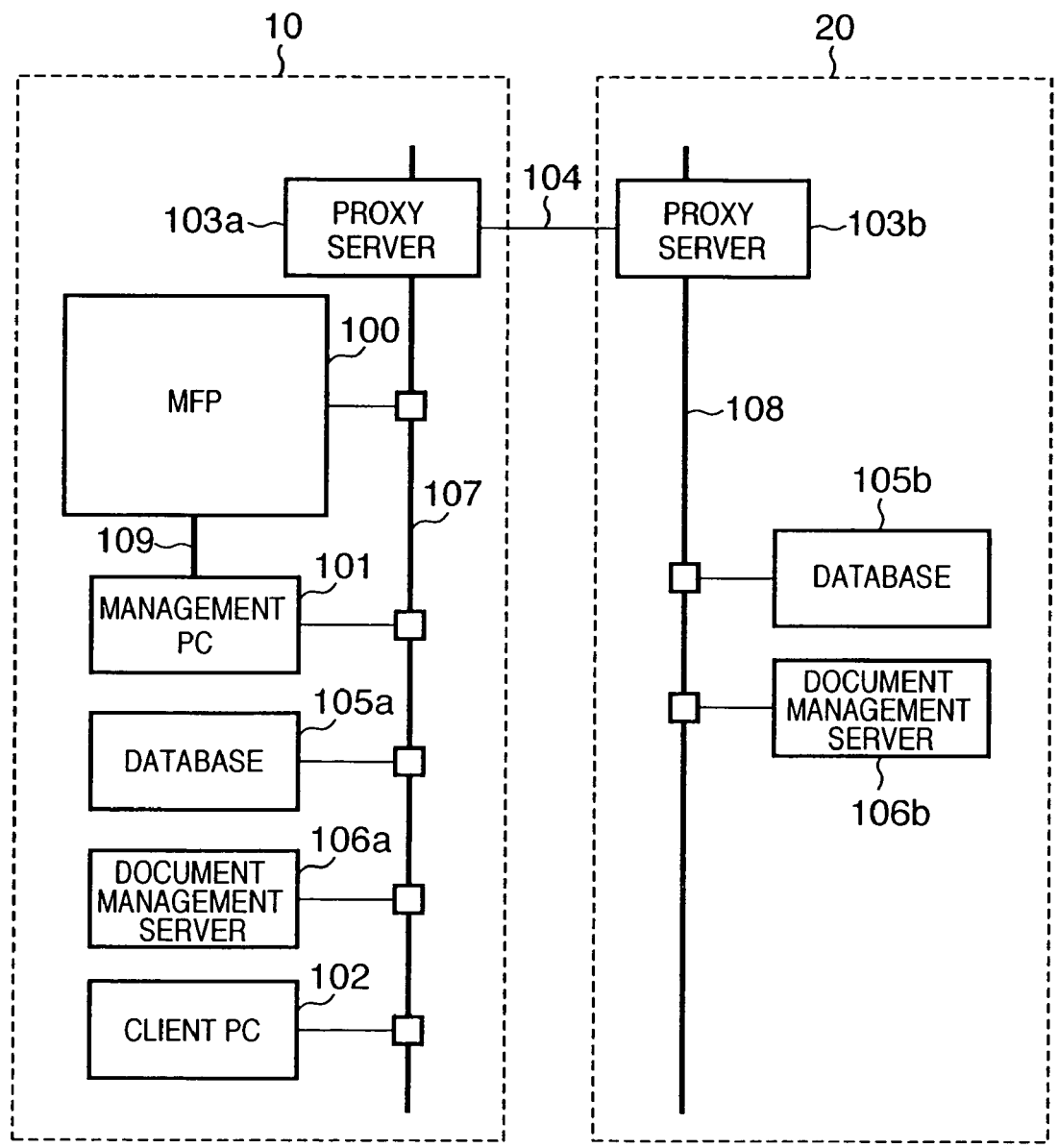
FIG. 1 is a block diagram showing the arrangement of an image processing system according to an embodiment of the present invention.

FIG. 1 is a block diagram showing the arrangement of an image processing system according to an embodiment of the present invention. The image processing system shown in FIG. 1 is implemented in an environment in which offices 10 and 20 are connected via an network 104 such as the Internet.

A digital multifunction peripheral (MFP) 100, a management PC 101 which controls the MFP 100, a client PC 102, a document management server 106a, a database 105a, and a proxy server 103a are connected to a LAN 107 formed in the office 10. The MFP 100 can be implemented by, e.g., a copying machine or facsimile apparatus having a multifunction. A document management server 106b, database 105b, and proxy server 103b are connected to a LAN 108 formed in the office 20. The client PC 102 comprises an external storage unit, search image input unit, and search result output unit. The LAN 107 and the LAN 108 in the office 20 are connected to the network 104 such as the Internet via the proxy servers 103a and 103b, respectively.

The MFP 100 in this embodiment is in charge of an image reading process of optically reading a paper document and converting it into an image signal and some of image processes for the read image signal, and inputs the image signal to the management PC 101 via a LAN 109. The management PC 101 can also be implemented by a normal PC and incorporates an image storage unit, image processing unit, display unit, and input unit. The management PC 101 may partially or wholly be integrated with the MFP 100.

Figure 2:
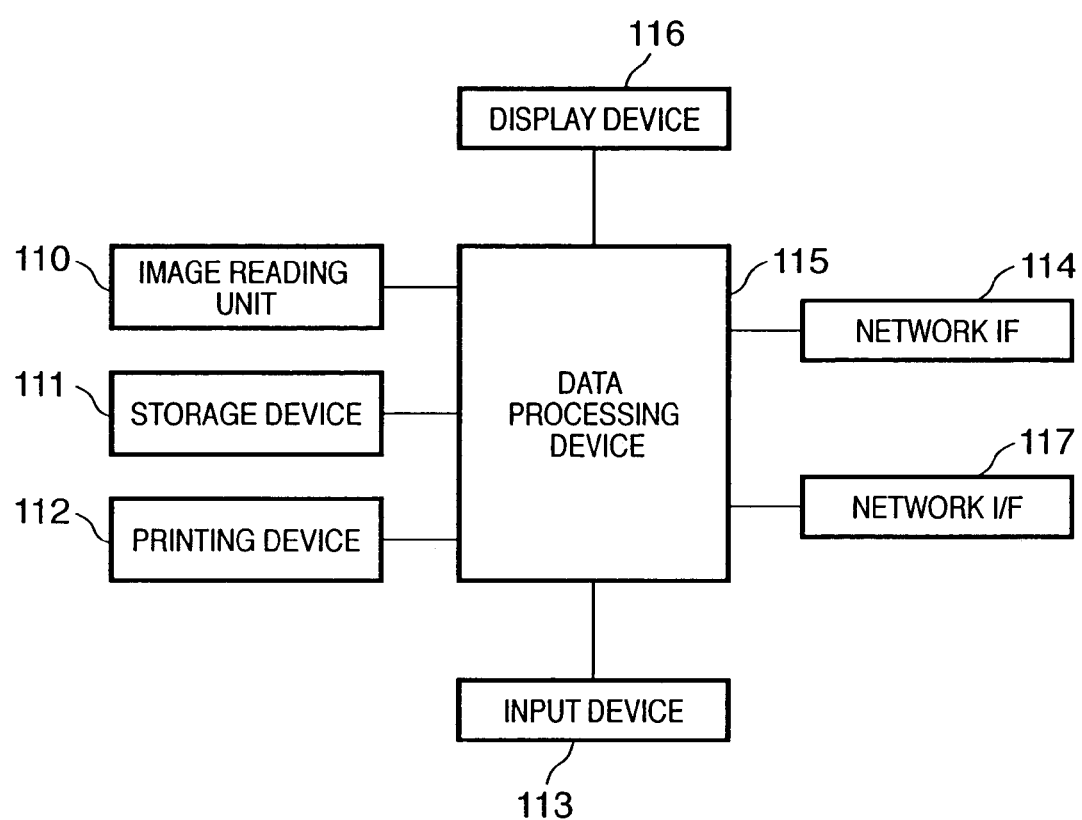
FIG. 2 is a block diagram showing the arrangement of an MFP 100 according to the embodiment of the present invention.

FIG. 2 is a block diagram showing the arrangement of the MFP 100 according to the embodiment of the present invention. Referring to FIG. 2, an image reading device 110 including an auto document feeder (to be abbreviated as an "ADF" hereinafter) irradiates a document image on each of one or a plurality of stacked documents with light from an internal light source, forms an image of light reflected by the document on a solid-state image sensing element via a lens, and obtains an image reading signal in the raster order as image information at a resolution of, e.g., 600 dpi from the solid-state image sensing element. When a normal copying function is used, a data processing device 115 executes an image process of that image signal to convert it into a recording signal. In case of a multi-copying process, recording data of one page is temporarily stored in a storage device 111 and sequentially output to a printing device 112, and then images are formed on paper sheets.

Print data output from the client PC 102 is input from the LAN 107 to the MFP 100 and to the data processing device 115 via a network IF 114 and converted into recordable raster data by the data processing device 115. The raster data is then input to the printing device 112 to form a recording image on a paper sheet.

An operator's instruction to the MFP 100 is input through an input device 113 such as keys equipped on the MFP 100 or an input device including a keyboard and mouse of the management PC 101. The series of operations is controlled by a controller in the data processing device 115.

On the other hand, status of operation inputs and image data whose process is underway are displayed on a display device 116 of the MFP 100 or on the monitor of the management PC 101 or client PC 102. The storage device 111 is also controlled from the management PC 101. Data exchange and control between the MFP 100 and management PC 101 are done by using a network I/F 117 and the directly connected LAN 109.

[Outline of Reading Process]

Figure 3:
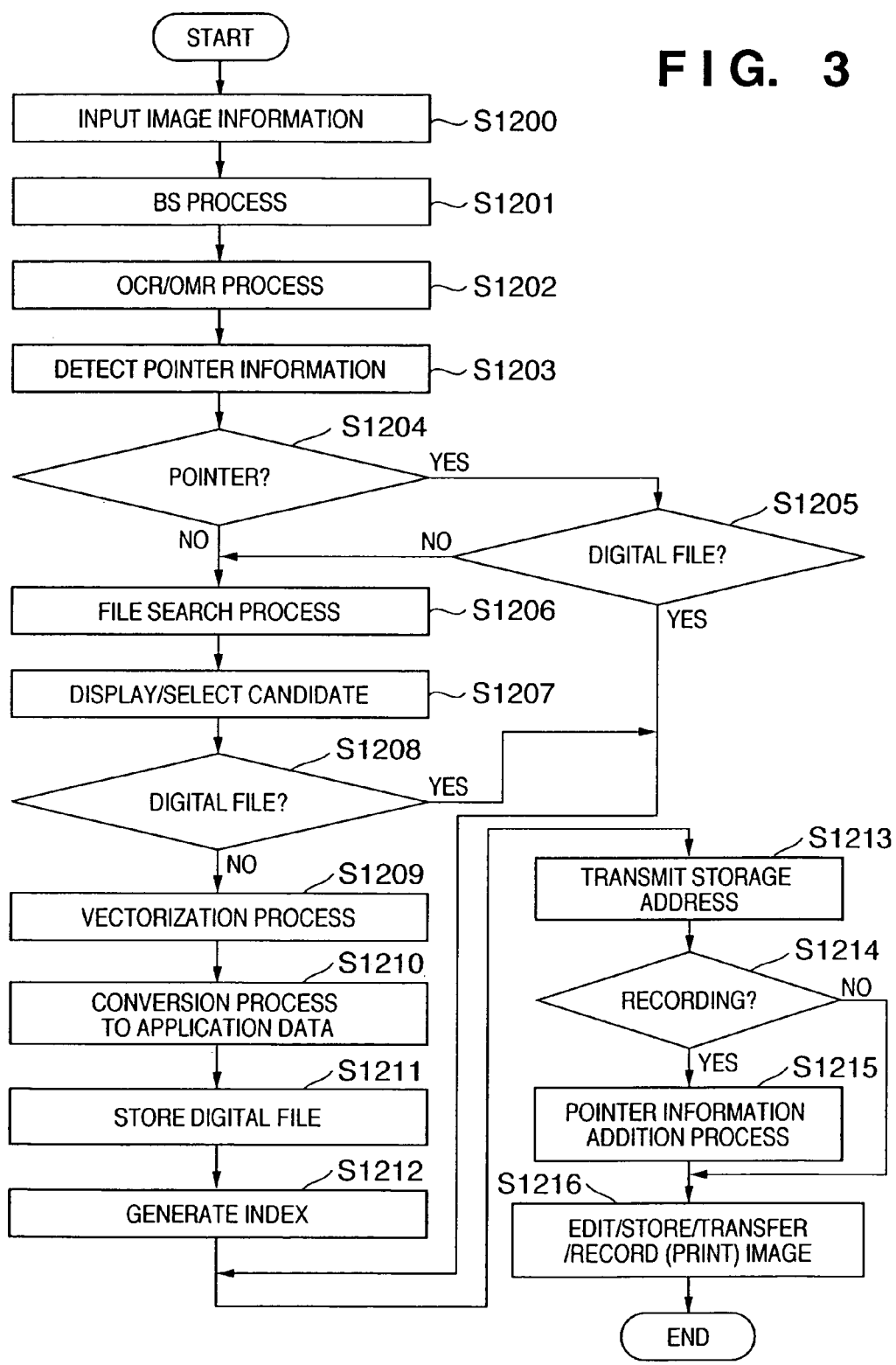
FIG. 3 is a flowchart for explaining the image process procedures of the image processing system according to the embodiment of the present invention.

An outline of the entire image process of the image processing system according to the embodiment of the present invention will be described below. FIG. 3 is a flowchart for explaining the image process procedures of the image processing system according to the embodiment of the present invention. A process of acquiring image information by reading a paper document will be described with reference to the flowchart in FIG. 3.

The image reading device 110 of the MFP 100 is operated to scan one document in a raster order to obtain an, e.g., 8-bit image signal of 600 dpi (image information input process: step S1200). This image signal undergoes a pre-process by the data processing device 115 and is saved as image data of one page in the storage device 111.

The CPU of the management PC 101 separates text/line art portions and halftone image portions from the image signal stored in the storage device 111. Each text portion is further separated into blocks combined as clusters for the respective paragraphs or tables and graphics formed of lines. The separated parts are segmented. On the other hand, each image portion expressed by halftone is segmented into independent objects for the respective so-called blocks such as an image portion and background portion, which are separated into rectangles so that the object unit is recognizable (BS process: step S1201).

At this time, an object corresponding to a 2D barcode or URL, which is recorded in the document image as additional information, is detected. The URL undergoes an OCR process (Optical Character Recognition process) to recognize the characters. The 2D barcode or object is decoded (step S1202). Vectorization control information of the document is detected from the decoding result (step S1203). To add pointer information, information may be embedded in the spacings between characters. Alternatively, information may be embedded in a halftone image as a digital watermark which is not directly visible. If additional information is embedded as a digital watermark, the watermark information is detected and decoded in step S1202.

It is determined in step S1203 whether the pointer information is detected (step S1204). If the pointer information is detected (YES in step S1204), the flow branches to step S1205 to determine whether an original digital file (i.e., the vector data of a representative object) is stored at the address indicated by the detected pointer information.

In this embodiment, the digital file is stored in a hard disk in the client PC 102, the databases 105a and 105b connected to the LANs 107 and 108 in the offices 10 and 20, or the storage device 111 of the MFP 100 itself in FIG. 1. These storage devices are searched in accordance with the address detected in step S1203.

If no digital file is found (NO in step S1205), if the found file is a so-called image file represented by JPEG or tiff in, or if the pointer information itself is not present (NO in step S1204), the flow branches to step S1206.

Step S1206 is a document file search process routine. More specifically, a full-text search process is executed by extracting words from the result of the OCR process which is executed for each text block in step S1202 described above. Alternatively, layout search is executed on the basis of the layout and properties of objects (step S1206). If digital files with a high similarity level are found as search results, they are displayed as the thumbnails of candidates. If one of a plurality of digital files must be selected by the operator, a file is specified by an operator's input operation (step S1207). If only one file is found as a candidate by the search process in step S1206, the flow automatically branches from step S1208 to step S1213 to notify the operator of the storage address of the file.

If no digital file is found by the search process (NO in step S1206), or if the found file is a so-called image file represented by JPEG or tiff, the flow branches to step S1209.

The process in step S1209 is a conversion process from image information into vector data, in which a digital file which is close to an original digital file is obtained.

For example, for a text block which has undergone the OCR process in step S1202, the character size, style, and font are recognized so that the data is converted into font data which are visually faithful to characters obtained by scanning the document. For a table or graphic block formed of lines, the outline of the shape is specified. An image block is processed as an individual JPEG file as image data. These vectorization processes are done for the respective objects, and layout information of each object is saved and converted into application data such as an rtf file (step S1210). The application data obtained by conversion is stored in the storage device 111 as a digital file (step S1211).

For the digital file stored in step S1211, index information for search is generated and added to the search index file so that the document image can directly be searched as a digital file in the subsequent processes (step S1212). The operator is notified of the storage address of the digital file (step S1213). Even when an digital file is specified by the file search process (YES in step S1208 or S1205), the flow branches to step S1213 to directly specify the digital file in the subsequent processes. Then, the operator is notified of the storage address.

It is determined whether the process to be done now by the operator is a recording (printing) process (step S1214). If it is a recording process (YES in step S1214), the flow branches to step S1215 to add pointer information representing the storage address to the file as image data.

After the pointer information is added in step S1215 or it is determined that the process to be done by the operator is not a recording process (NO in step S1214), for example, recording, editing, transfer, or storage of the document can be executed by using the digital file itself obtained by the above-described processes (step S1216). These processes can increase the storage efficiency in the memory and shorten the transfer time because the information amount is reduced as compared to a case wherein image data is used. In addition, the digital file can be used as high-quality data when it is recorded (printed) or displayed.

Each process block will be described in detail below.

[Block Selection Process]

The block selection (BS) process in step S1201 will be described below. FIG. 4 is a view showing a state wherein read image data of one page is segmented into a plurality of blocks by a block selection process by determining properties. More specifically, in the block selection process, image data 41 of one page read in step S1200 is recognized as a cluster 42 of objects, and the properties of the respective blocks are determined as text (TEXT), photo (PHOTO), line (LINE), table (TABLE), and the like so that the image data is segmented into regions (blocks) having different properties.

An embodiment of the block selection process will be described below.

An input image is binarized to monochrome image data. Outline tracking is executed to extract a cluster of pixels surrounded by black pixels. For a black pixel cluster having a large area, outline tracking is executed for white pixels in that cluster to extract a cluster of white pixels. A cluster of black pixels is also extracted recursively from a white pixel cluster having a predetermined area or more. The above-described process is executed for a document having black characters printed on a white background. A document of another type can be processed in the same way by setting the color corresponding to the background to "white" and that corresponding to an object to "black".

The obtained black pixel clusters are classified into regions having different properties in accordance with their sizes and shapes. For example, a pixel cluster having an aspect ratio of almost 1 and a size in a predetermined range is determined as a pixel cluster corresponding to a character. Furthermore, a portion where neighboring characters regularly line up and can be regarded as a group is determined as a text region. A low-profile pixel cluster is categorized as a line region. A range occupied by a black pixel cluster which includes rectangular white pixel clusters which regularly line up and have a predetermined size or more is categorized as a table region. A region where pixel clusters with indeterminate forms are distributed is categorized as a photo region. A cluster with an arbitrary shape is categorized as a graphic region. With this process, more advanced limits can be imposed for reuse of digital data created by reading one document.

FIG. 5 is a table showing an example of block information of respective blocks obtained by the block selection process in step S1201. Information of each block shown in FIG. 5 is used as information for vectorization to be described later.

The OCR/OMR process of extracting the storage location of a file from image information in step S1202 will be described next.

Figure 6:
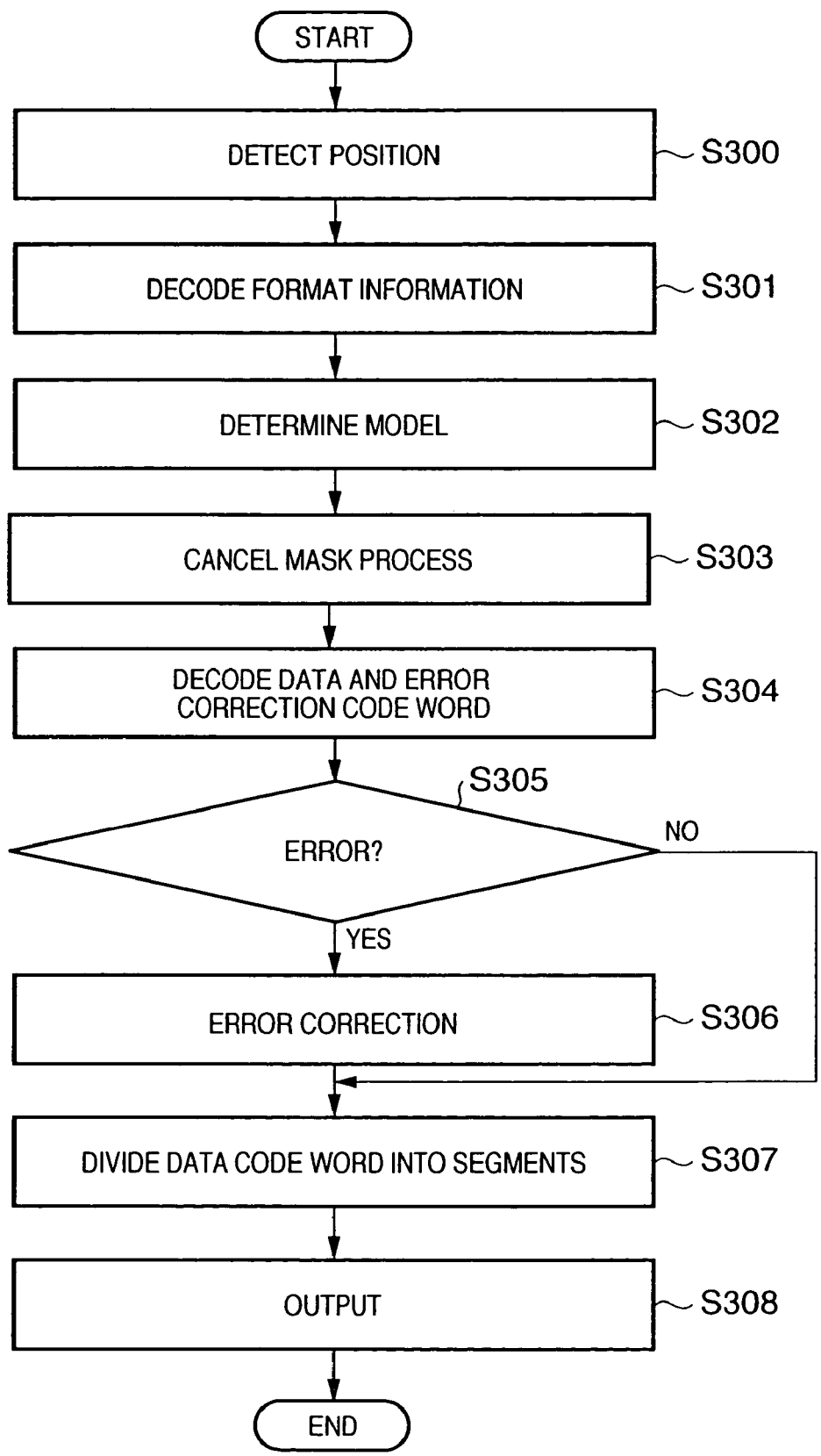
FIG. 6 is a flowchart for explaining procedures of decoding a 2D barcode (QR code symbol) added to a document image and outputting a data character string.
Figure 7:
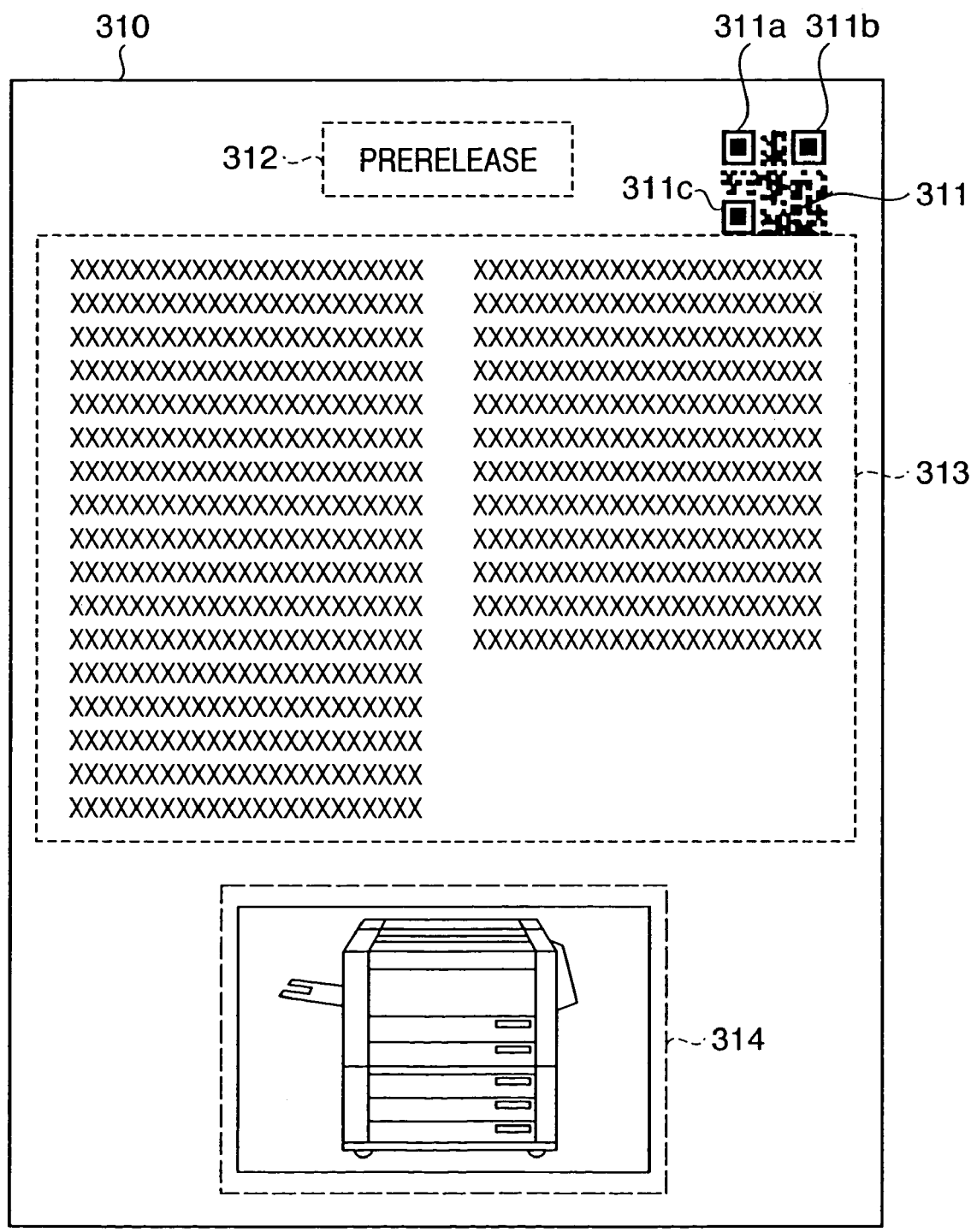
FIG. 7 is a view showing an example of a document 310 to which the 2D barcode symbol is added.

FIG. 6 is a flowchart for explaining procedures of decoding a 2D barcode (QR code symbol) added into the document image and outputting a data character string. FIG. 7 is a view showing an example of a document 310 to which the 2D barcode symbol is added.

Image data which is obtained by reading the document 310 and stored in the page memory in the data processing device 115 is scanned by the internal CPU to detect the position of a predetermined 2D barcode symbol 311 from the result of the above-described block selection process. The QR code position detection pattern is made up of identical position detection element patterns 311a to 311c, which are located at three of the four corners of the symbol (step S300).

Next, format information adjacent the position detection pattern is decoded to obtain an error correction level and mask pattern applied to the symbol (step S301). After the model of the symbol is determined (step S302), the encoded region bit pattern is XORed by using the mask pattern obtained from the format information to cancel the mask process (step S303).

A symbol character is read in accordance with the layout rule corresponding to the model to decode message data and an error correction code word (step S304). It is detected whether a decoded code includes an error (step S305). If any error is detected (YES in step S305), the error is corrected (step S306). The data code word from the error-corrected data is divided into segments on the basis of the mode indicator and character count indicator (step S307). Finally, data characters are decoded on the basis of the specification mode, and the result is output (step S308). If no error is detected (NO in step S305), the flow advances to step S307.

The data encoded in the 2D barcode represents vectorization control information.

In this embodiment, the document 310 added with vectorization control information by using the 2D barcode has been exemplified. When vectorization control information is recorded directly by using a character string, a block of a character string according to a predetermined rule is detected by the block selection process. Each character of the character string indicating the pointer information is recognized, thereby directly obtaining the vectorization control information.

Vectorization control information can also be added by embedding watermark information in the character spacings by applying imperceptible modulation to, e.g., the spacings between neighboring characters of the character string of a text block 312 or 313 of the document 310 shown in FIG. 7. When such watermark information is used, the vectorization control information can be obtained by detecting the character spacings in a character recognition process (to be described later). Vectorization control information can also be added as a digital watermark in a natural image block 314.

[Digital File Search Process Based on Pointer Information]

Figure 8:
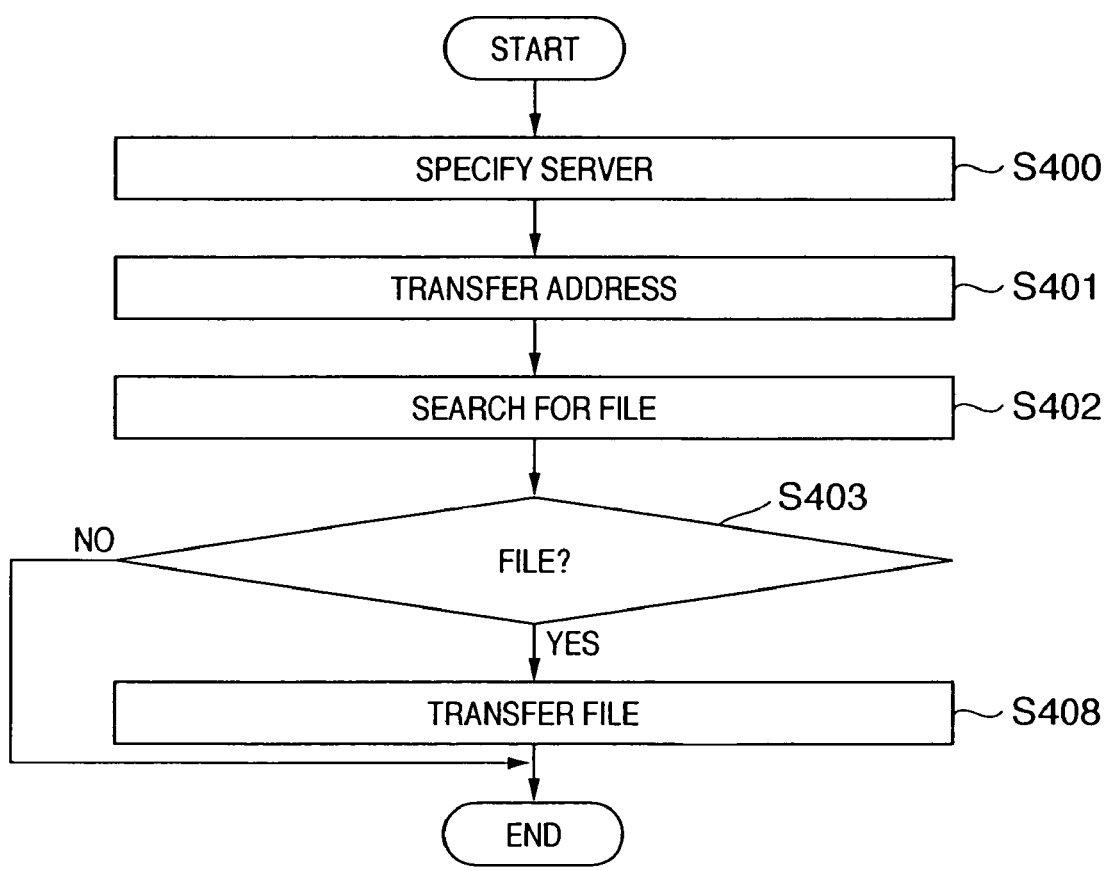
FIG. 8 is a flowchart for explaining process procedures of searching for a digital file on the basis of detected pointer information.

The process of searching for a digital file on the basis of pointer information in steps S1205 and S1208 in FIG. 3 will be described next in detail. FIG. 8 is a flowchart for explaining process procedures of searching for a digital file on the basis of detected pointer information.

A file server which stores a digital file of interest is specified on the basis of a server address contained in the pointer information (step S400). The file server indicates the client PC 102, the document management servers 106*a* and 106*b* that incorporate the databases 105*a* and 105*b*, or the MFP 100 itself that incorporates the storage device 111. The address is path information containing a URL or server name.

After the file server is specified, the address is transferred to the server (file server) indicated by the pointer information detected in step S1203 in FIG. 3 (step S401). The file server searches for the digital file in accordance with the file search process in step S1206 (step S402). It is determined whether the digital file is present (step S403).

If the digital file is not present (NO in step S403), the MFP 100 is notified of it, and the process is ended. If the digital file is present (YES in step S403), candidates are displayed to execute the difference extraction processes, as described with reference to FIG. 3. After that, the address of the digital file is sent, and the digital file is transferred to the user (i.e., the MFP 100) (step S408).

[Server Search Process Based on Pointer Information Containing File Access Right]

An embodiment which considers the file access right will be explained next. Usual document files often include documents whose reuse by a third party is preferably limited. The search process in FIG. 8 has been explained under the condition that all files accumulated in the file server can be freely accessed, and the entire file or some objects of the file are reusable. A case will be explained below in which a digital file searched on the basis of pointer information has an access right limitation.

Figure 9:
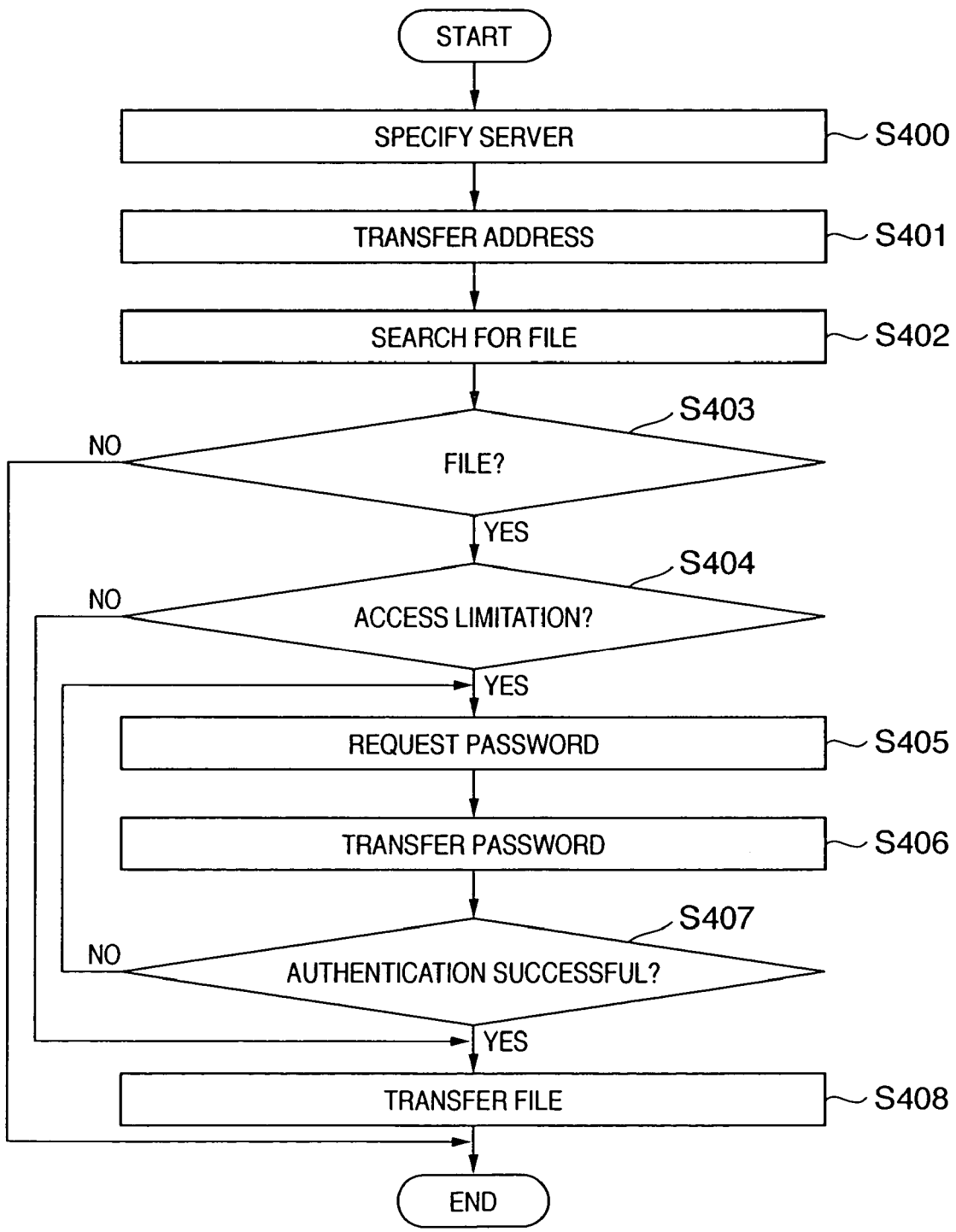
FIG. 9 is a flowchart for explaining process procedures of searching for a server which stores a digital file on the basis of pointer information including a file access right.

FIG. 9 is a flowchart for explaining process procedures of searching for a server which stores a digital file on the basis of pointer information including a file access right. Steps S400 to S403 in FIG. 9 are the same as in FIG. 8, a description thereof will be omitted. When a file is specified (YES in step S403), the file server checks access right information of the file (step S404). If access of the file is limited (YES in step S404), the file server requests the MFP 100 to transmit a password (step S405).

The MFP 100 prompts the operator to input authentication information such as a password and transmits the input password to the file server (step S406). The file server collates the received password (step S407). If authentication has succeeded (YES in step 407), the file server notifies the MFP 100 of the address of the digital file, as described in FIG. 3. If the process that the user wants is image data acquisition, the digital file is transferred to the MFP 100 (step S408).

The authentication method for access right control is not limited to the method using the password in steps S405 and S406. For example, various other authentication means such as popular biometrics authentication including fingerprint authentication and authentication using a card can be employed.

If the file cannot be specified from the file server in step S403, the vectorization process explained in step S1209 in FIG. 3 can also be limited. That is, when a limitation of the access right to an original digital file is detected from image data obtained by scanning a paper document, the vectorization process is executed only when authentication is successful, thus limiting use of documents with high secrecy.

[File Search Process]

The file search process in step S1206 in FIG. 3 will be described below in detail with reference to FIGS. 5 and 10. As described above, the process in step S1206 is done when it is determined in step S1204 that the input document (input file) has no pointer information, pointer information is available but no digital file is found, or the digital file is an image file. Assume that blocks extracted by the OCR/OMR process in step S1202 and the input file have information (block information and input file information) shown in FIG. 5. In this embodiment, as the information contents, a property, coordinate position, width and height as a size, and availability of OCR information are used, as shown in FIG. 5.

Figure 10A:
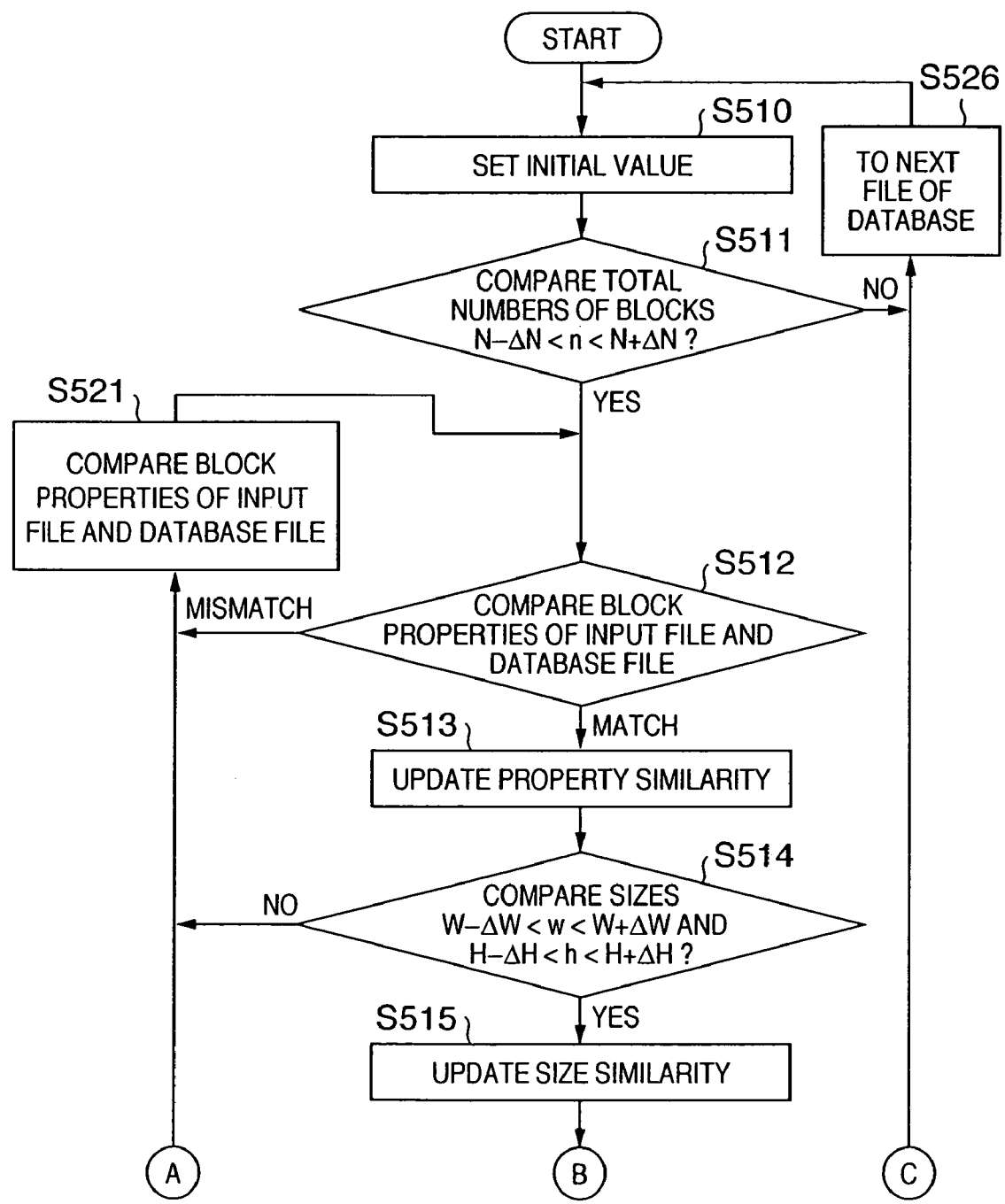
FIGS. 10A and 10B are flowcharts for explaining procedures of searching a database for a digital file layout similar to an input image file.
Figure 10B:
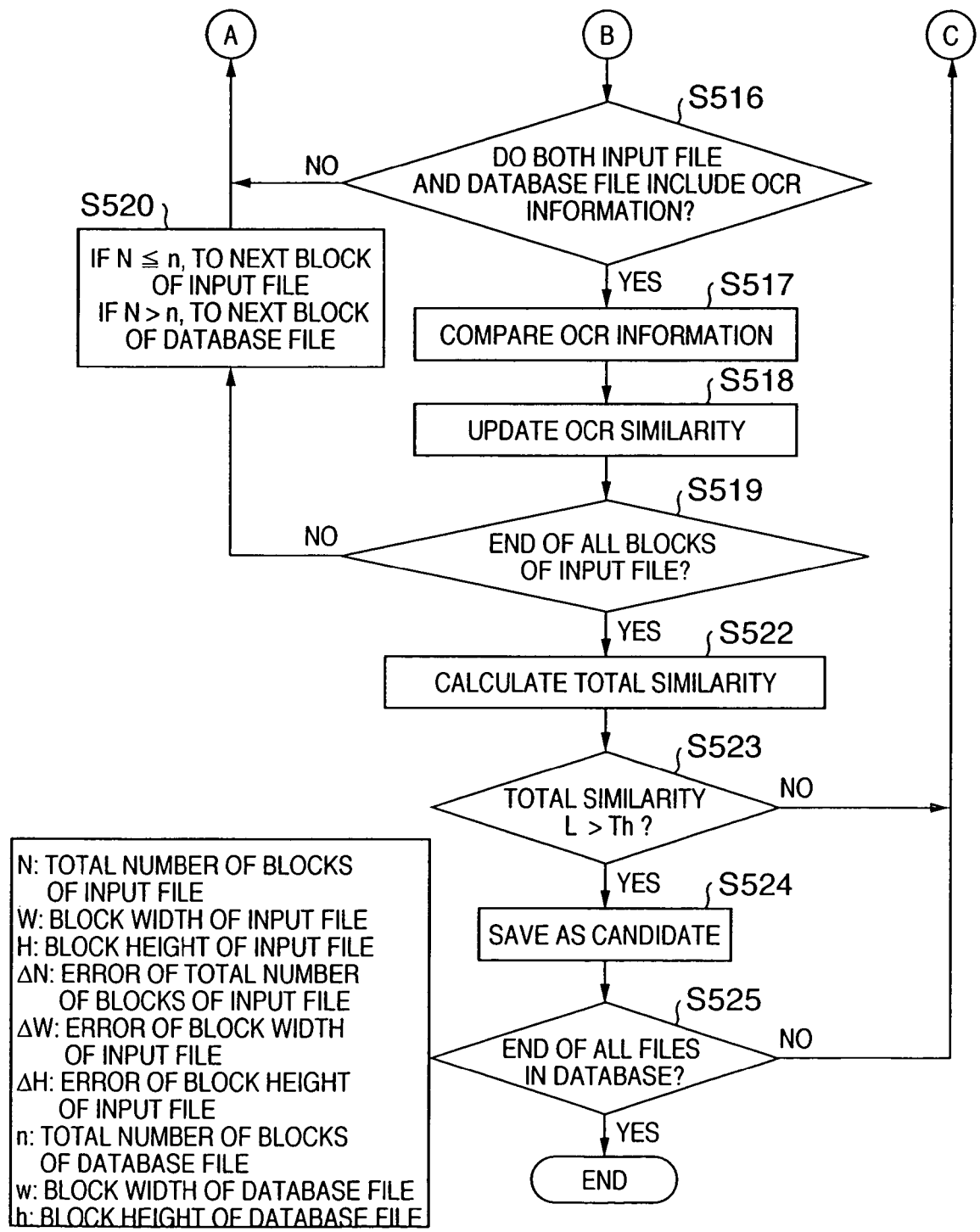

The properties are categorized into text, line, photo, picture, table, and the like. For the sake of simplicity, blocks are named as blocks 1, 2, 3, 4, 5, and 6 in ascending order of coordinate X (e.g., X1<X2<X3<X4<X5<X6) in FIG. 5. The total number of blocks indicates that of those included in an input file and is 6 in the example shown in FIG. 5. Procedures of searching a database for a digital file layout similar to an input image file by using these pieces of information will be described below. FIGS. 10A and 10B are flowcharts for explaining the procedures of searching a database for a digital file layout similar to an input image file. Assume that files in the database have the same kinds of information as those in FIG. 5. In the flow of the flowchart shown in FIGS. 10A and 10B, a digital file read from an input document is sequentially compared with digital files in the database.

The similarity level (to be described later) and the like are initialized to set initial values (step S510). The total numbers of blocks are compared (step S511). If true (YES in step S511), the pieces of information of blocks in files are compared sequentially (step S512). That is, it is checked if the number n of blocks of each file in the database falls within the range of an error $\Delta N$ of the number N of blocks of the input file. If n falls within the error range, "true" is determined (YES in step S511). Otherwise, "false" is determined (NO in step S511). In step S512, block properties of the input file and each database file are compared. If the two properties match, the flow advances to the comparison process from step S513. Otherwise, the flow advances to step S521.

Upon comparing information of blocks, property, size, and OCR similarity levels are respectively calculated in steps S513, S515, and S518. In step S522, a total similarity level is calculated on the basis of these levels. A known technique can be used to calculate each similarity level, a description thereof will be omitted.

It is determined in step S523 whether the total similarity level is higher than a preset threshold value Th. If the total similarity level is higher than the threshold value (YES in step S523), the digital file is saved as a similar candidate (step S524). In FIGS. 10A and 10B, N, W, and H respectively indicate the total number of blocks, each block width, and each block height in an input file, and $\Delta N$, $\Delta W$, and $\Delta H$ indicate values which consider errors with reference to the block information of the input file. In addition, n, w, and h respectively indicate the total number of blocks, each block width, and each block height in a file stored in the database. In size comparison in step S514, position information (X,Y) may be compared.

Database files saved as candidates each having a total similarity level higher than the threshold value Th are displayed as thumbnails (step S1207). If the operator must select one of the plurality of candidates, a file is specified by the operator's input operation.

[Vectorization Process]

The vectorization process in step S1209 in FIG. 3 will be described next. As described above, if it is determined in step S1208 that the digital file is not present, input image information is vectorized for each block.

<<Character Recognition>>

A character recognition process is executed for each text block. For the character recognition process, in this embodiment, an image extracted for each character is recognized by using one of pattern matching methods, thereby obtaining a corresponding character code. In this recognition process, an observation feature vector obtained by converting a feature obtained from a character image into a several-ten-dimensional numerical value string is compared with a dictionary feature vector obtained in advance for each character type, and a character type with a shortest distance is output as a recognition result. Various known methods are available for feature vector extraction. For example, a method of dividing a character into a mesh pattern and counting character lines in respective meshes as line elements depending on their directions to obtain a (mesh count)-dimensional vector as a feature can be used.

When character recognition is to be executed for a text region extracted by the block selection process (step S1201), the writing direction (horizontal or vertical direction) of the region is determined. Lines are extracted in the direction. Then, character images are obtained by extracting characters. In determining the writing direction (horizontal or vertical direction), horizontal and vertical projections of pixel values in that region are calculated. If the variance of the horizontal projection is larger than that of the vertical projection, the region is determined as a horizontal writing region. Otherwise, the region is determined as a vertical writing region.

Decomposition into character strings and characters is done in the following way. For horizontal writing, lines are extracted by using the horizontal projection. In addition, characters are extracted on the basis of the vertical projection for each extracted line. For a vertical writing text region, the relationship between "horizontal" and "vertical" is reversed. The character size can be detected on the basis of the extracted size.

<<Font Recognition>>

A plurality of sets of dictionary feature vectors for the number of character types used in character recognition are prepared in correspondence with character shape types, i.e., font types, and a font type is output together with a character code upon matching, thus recognizing the font of a character.

<<Vectorization of Character>>

Using a character code and font information obtained by the above-described character recognition process and font recognition process, the information of a character portion is converted into vector data by using outline data prepared in advance. When an input document image is a color image, the color of each character is extracted from the color image and recorded together with vector data.

With the above processes, image information which belongs to a text block can be converted into vector data with a nearly faithful shape, size, and color.

<<Vectorization of Non-Text Portion>>

For a region which is determined as a drawing, line, or table region by the block selection process in step S1201, the outline of each extracted pixel cluster is converted into vector data. More specifically, a point sequence of pixels which form an outline is divided into sections at a point considered as a corner, and each section is approximated by a partial line or curve. "Corner" indicates a point where the curvature is maximal.

FIG. 11 is a view for explaining a point with a maximal curvature. As shown in FIG. 11, a chord is drawn between points Pi−k and Pi+k separated k points from an arbitrary point Pi to the left and right. A point with a maximal curvature is obtained as a point where the distance between the chord and the point Pi becomes maximal. Let R be the chord length/arc length between Pi−k and Pi+k. Then, a point where the value R is equal to or smaller than a threshold value can be regarded as a corner. Sections obtained by dividing the line at corners can be vectorized by using a method of least squares with respect to a point sequence for a line and a ternary spline function for a curve.

When the subject has an inner outline, it is similarly approximated by a partial line or curve by using a point sequence of a white pixel outline extracted by the block selection process.

As described above, when partial line approximation of outlines is used, the outline of a graphic with an arbitrary shape can be vectorized. When the input document is a color document, the color of each graphic is extracted from the color image and is recorded together with vector data.

Figure 12:
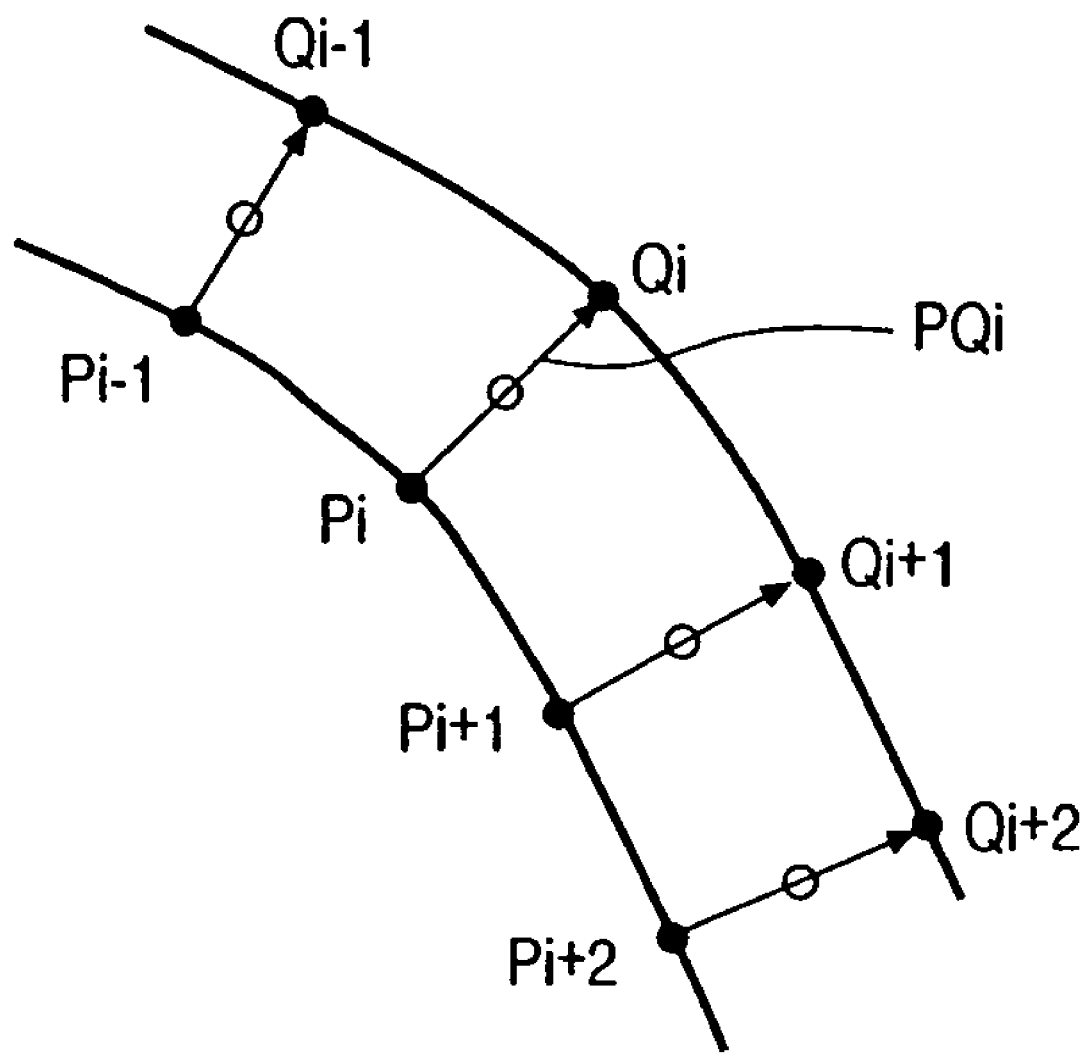
FIG. 12 is a view for explaining an example wherein an outer outline which is close to an inner outline or another outer outline is expressed as a line with a given width.

FIG. 12 is a view for explaining an example wherein an outer outline which is close to an inner outline or another outer outline is expressed as a line with a given width. When an outer outline is close to an inner outline or another outer outline in a given section, as shown in FIG. 12, the two outlines can combined and expressed as a line with a given width. More specifically, lines are drawn from points Pi on a given outline to points Qi on another outline such that two corresponding points have the shortest distance. When distances PQi maintain a predetermined value or less on the average, the section of interest is approximated by a line or curve using PQi middle points as a point sequence, and the average value of the distances PQi is set as the width of the line or curve. A line or a table ruled line as a set of lines can efficiently be expressed by vector data as a set of lines having a given width, as described above.

In vectorization using the character recognition process for a text block, a character which has the shortest distance from a dictionary as a result of the character recognition process is used as a recognition result, as described above. When this distance is equal to or larger than a predetermined value, the recognition result does not always match an original character, and a wrong character having a similar shape is often recognized. In this embodiment, therefore, such character is handled in the same manner as a general line art, as described above, and converted into outline data. That is, even a character that causes a recognition error in the conventional character recognition process can be vectorized on the basis of outline data which is visually faithful to image data without being vectorized to a wrong character. In the present invention, a block which is determined as a photo is not vectorized and is output as image data without any process.

<<Graphic Recognition>>

A process of grouping vectorized partial lines for each graphic object after the outline of a graphic with an arbitrary shape is vectorized, as described above, will be described below.

Figure 13:
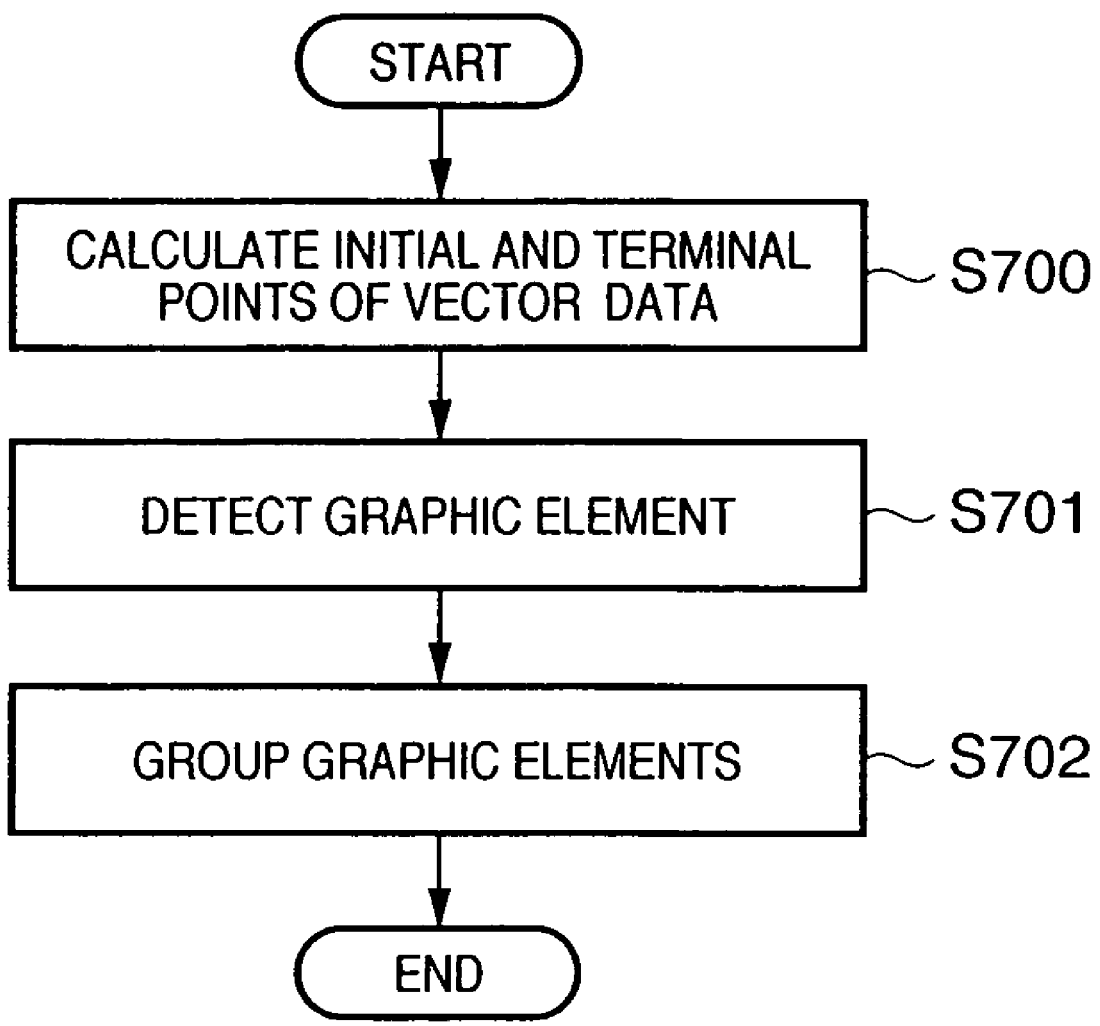
FIG. 13 is a flowchart for explaining process procedures executed until vector data are grouped for each graphic object.

FIG. 13 is a flowchart for explaining process procedures executed until vector data are grouped for each graphic object. Initial and terminal points of each vector data are calculated (step S700). Using the initial and terminal point information of respective vectors, a graphic element is detected (step S701). Detecting a graphic element is to detect a closed graphic formed by partial lines. Detection is executed by applying the principle that each vector which forms a closed shape has vectors coupled to its two ends.

Next, other graphic elements or partial lines present in the graphic element are grouped to set one graphic object (step S702). If any other graphic elements or partial lines are not present in the graphic element, the graphic element is set as a graphic object.

Figure 14:
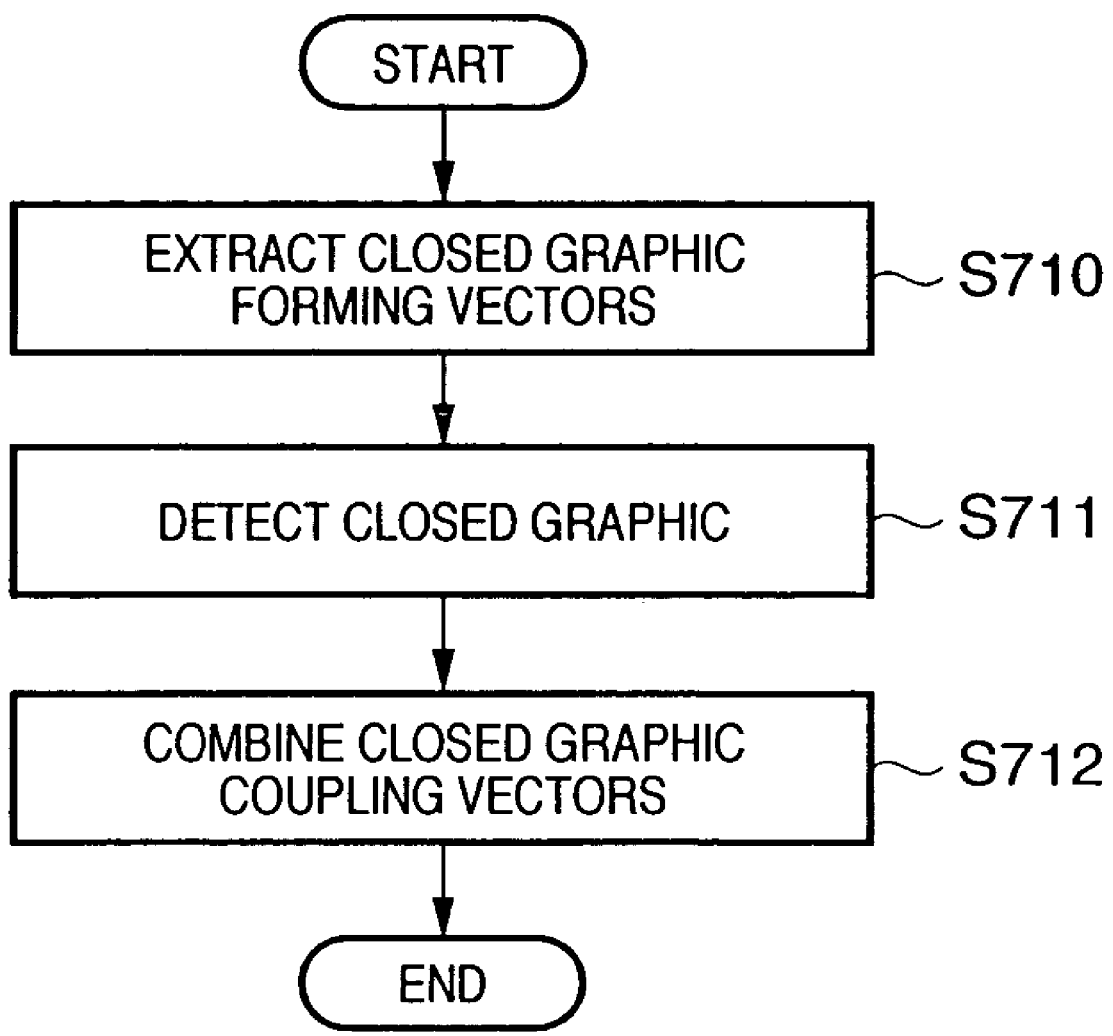
FIG. 14 is a flowchart for explaining process procedures of detecting a graphic element.

FIG. 14 is a flowchart for explaining process procedures of detecting a graphic element. Unwanted vectors each having two ends unconnected to other vectors are removed from vector data to extracted closed graphic forming vectors (step S710). The initial point of a vector of interest of the closed graphic forming vectors is set as a start point, and vectors are sequentially tracked clockwise. This tracking is executed until returning to the start point. All passing vectors are grouped as a closed graphic which forms one graphic element (step S711). All closed graphic forming vectors present in the closed graphic are also grouped. The initial point of a vector which is not grouped yet is set as a start point, and the above process is repeated. Finally, of the unwanted vectors removed in step S710, those which join the vectors grouped as the closed graphic in step S711 are detected and grouped as one graphic element (step S712).

With the above process, a graphic block can be handled as an independently reusable graphic object.

[Conversion Process into Application Data]

Figure 15:
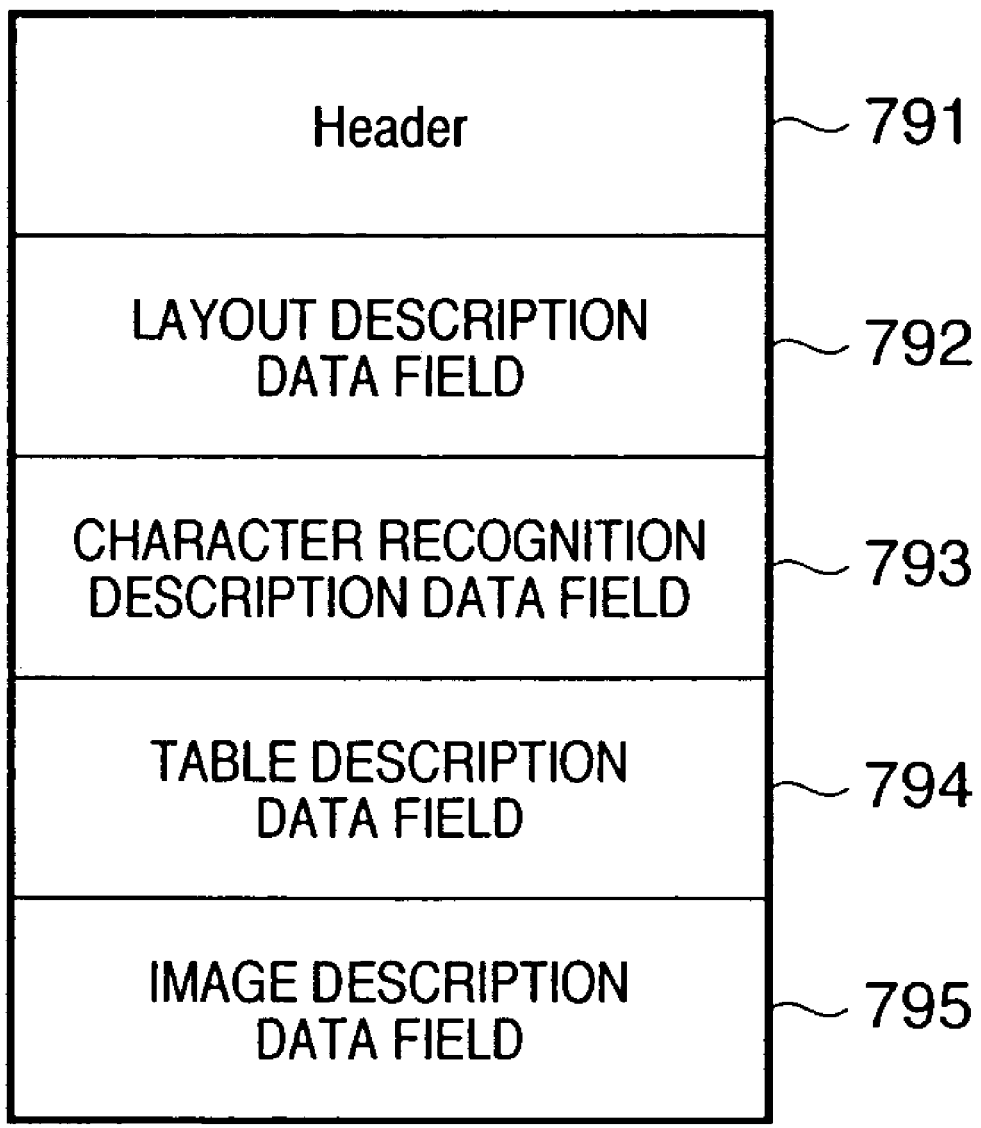
FIG. 15 is a view showing a DAOF data structure.

FIG. 15 is a view showing the data structure of a file having an intermediate data format as a result obtained by converting image data of one page by the block selection process (step S1201) and the vectorization process (step S1209). The data format shown in FIG. 15 is called a document analysis output format (DAOF). That is, FIG. 15 shows the DAOF data structure.

Referring to FIG. 15, reference numeral 791 denotes a Header which holds information about document image data to be processed. Reference numeral 792 denotes a layout description data field which holds property information and rectangular block address information of blocks in the document image data, which are recognized for the properties such as TEXT (text), TITLE (title), CAPTION (caption), LINEART (line art), PICTURE (natural image), FRAME (frame), and TABLE (table).

Reference numeral 793 denotes a character recognition description data field which holds character recognition results obtained by executing character recognition of TEXT blocks such as TEXT, TITLE, and CAPTION. Reference numeral 794 denotes a table description data field which stores details of the structure of TABLE blocks. Reference numeral 795 denotes an image description data field which holds image data of PICTURE blocks or LINEART blocks extracted from the document image data.

Such DAOF data itself is sometimes saved as a file in place of intermediate data. However, in the state of a file, individual objects cannot be reused by a general document creation application. A process of converting DAOF data into application data (step S1210) will be described next in detail.

Figure 16:
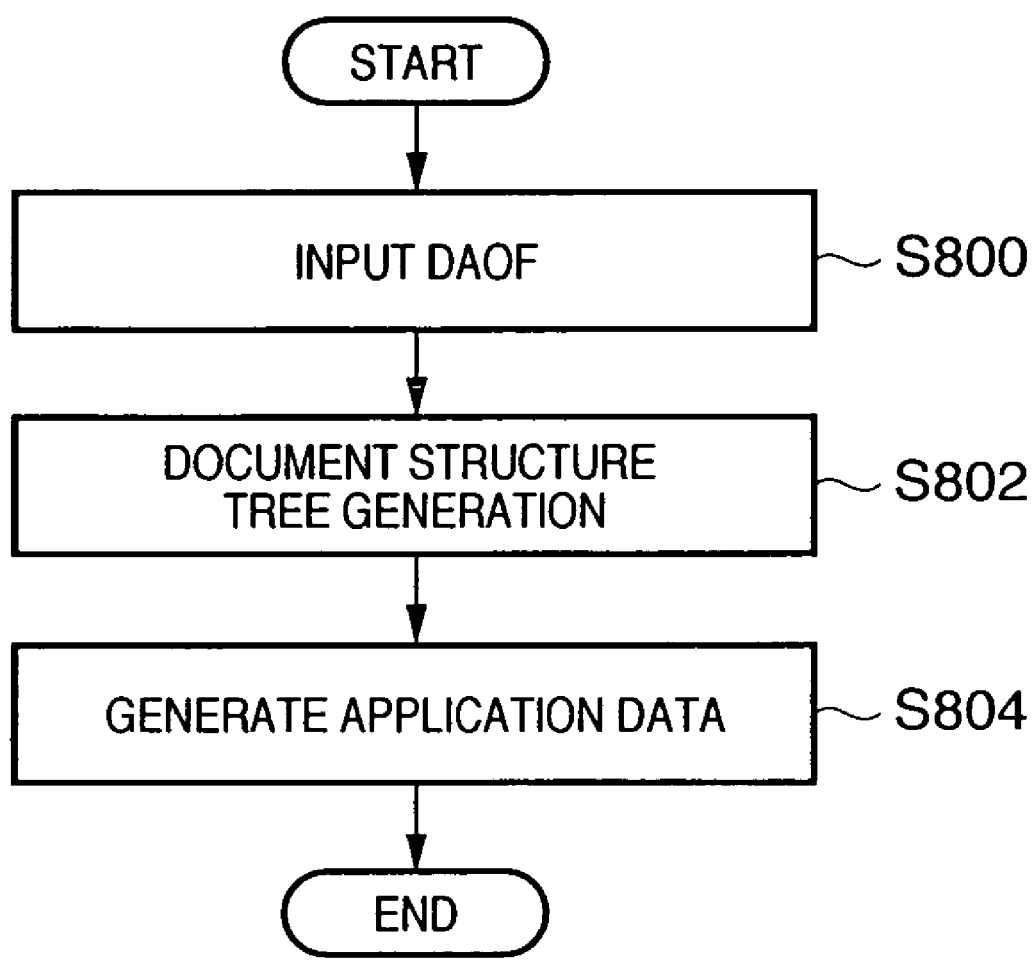
FIG. 16 is a flowchart for explaining schematic procedures of the overall conversion process into application data.

FIG. 16 is a flowchart for explaining schematic procedures of the overall conversion process into application data. DAOF data is input (step S800). A document structure tree serving as a base of application data is generated (step S802). Actual data in the DAOF are input on the basis of the generated document structure tree to generate actual application data (step S804).

Figure 17:
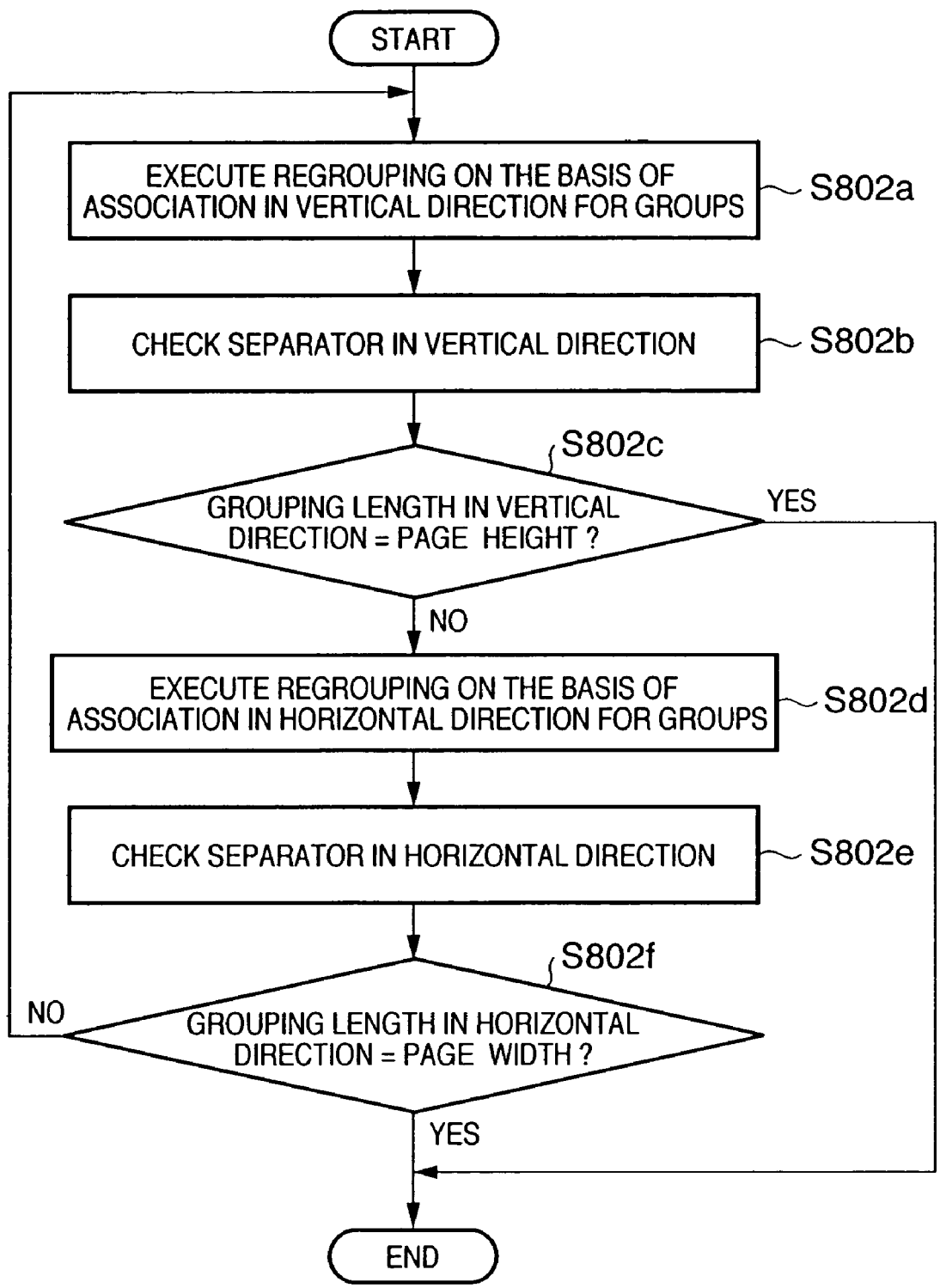
FIG. 17 is a flowchart for explaining detailed process procedures of a document structure tree generation process (step S802)

FIG. 17 is a flowchart for explaining detailed process procedures of the document structure tree generation process (step S802). FIGS. 18A and 18B are views for explaining the outline of the document structure tree. As the basic rule of overall control, the flow of processes transits from a microblock (single block) to a macroblock (a set of blocks). In the following description, a block indicates both a microblock and macroblock.

Regrouping is done for blocks on the basis of association in the vertical direction (step S802a). Immediately after the start, determination is done for each microblock. Association can be defined when the distance between blocks is small, and blocks widths (heights in case of the horizontal direction) almost equal. The pieces of information of distances, widths, and heights are extracted with reference to the DAOF.

Figure 18:
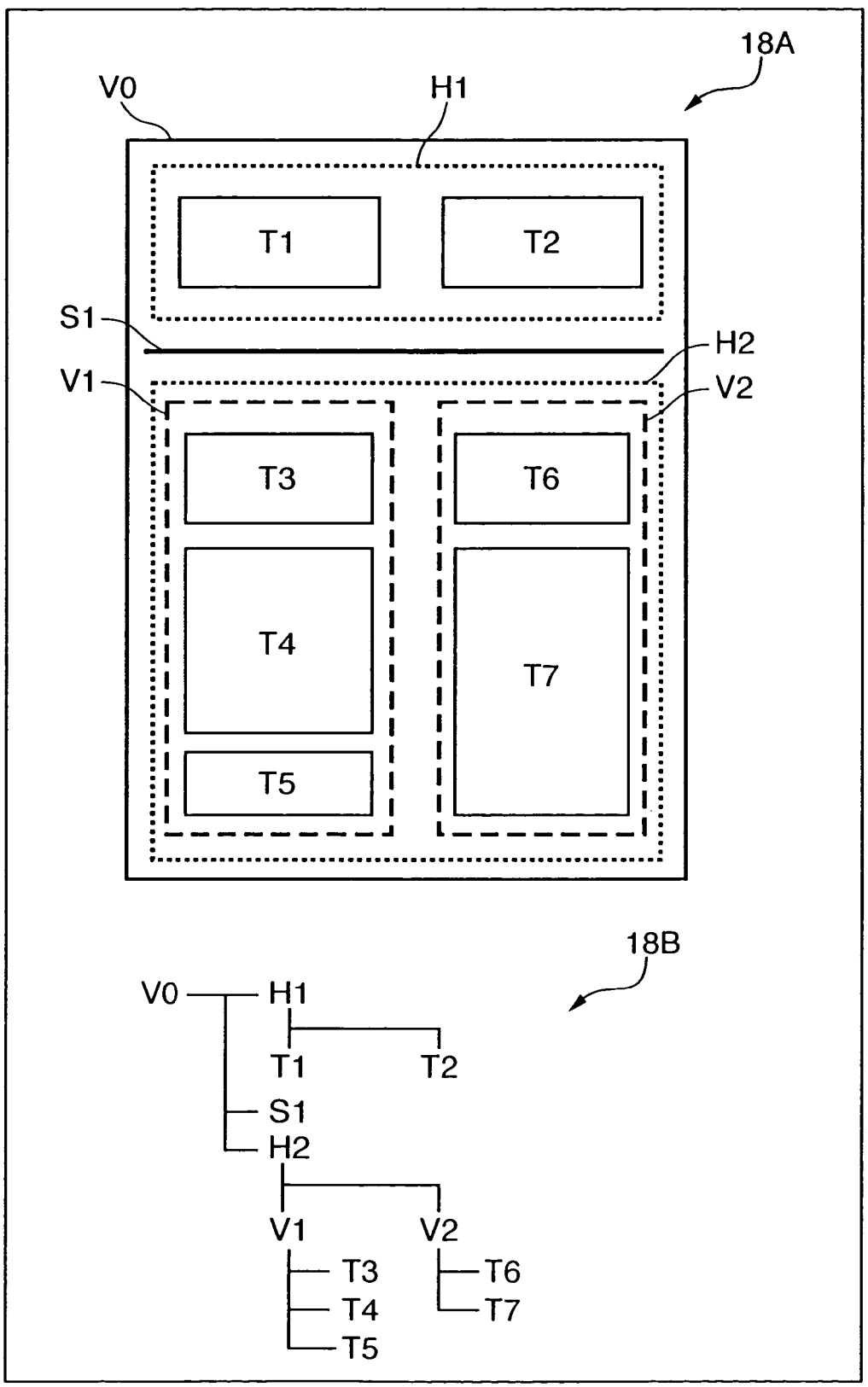
FIG. 18 is a view for explaining the outline of a document structure tree.

18A denotes an actual page configuration, and 18B denotes the document structure tree of the page in FIG. 18. As a result of grouping in step S802a, T3, T4, and T5 form one group V1, and T6 and T7 form one group V2. These groups are generated as groups which belong to the same layer.

The presence/absence of a vertical separator is checked (step S802b). Physically, a separator is an object which has a line property in the DAOF. Logically, a separator is an element which explicitly divides blocks in an application. When a separator is detected, the groups are re-divided in the same layer.

It is determined by using the group length whether no more divisions can be present (step S802c). For example, it is determined whether the grouping length in the vertical direction equals the page height. If the group length in the vertical direction equals the page height (YES in step S802c), document structure tree generation is ended. In, e.g., the structure shown in FIG. 18, no separator is present, and the group height does not equal the page height. Since No in step S802c, the flow advances to step S802d.

In step S802d, regrouping is done for blocks on the basis of association in the horizontal direction. Even in this regrouping, the first determination immediately after the start is done for each microblock. Definitions of association and its determination information are the same as those in the vertical direction. In, e.g., the structure shown in FIG. 18, T1 and T2 generate a group H1, and V1 and V2 generate a group H2. The group H1 is generated as a group one level higher than T1 and T2. The group H2 is generated as a group one level higher than V1 and V2. The groups H1 and H2 belong to the same layer.

The presence/absence of a horizontal separator is checked (step S802e). Since a separator S1 is present in FIG. 18, it is registered in the tree so that the layers H1, S1, and H2 are generated. It is determined by using the group length whether no more divisions are present (step S802f). For example, it is determined whether the grouping length in the horizontal direction equals the page width. If the group length in the horizontal direction equals the page width (YES in step S802f), document structure tree generation is ended. If the group length in the horizontal direction does not equal the page width (NO in step S802f), the flow returns to step S802b to repeat the process from association check in the vertical direction in the layer higher one level. In, e.g., the structure shown in FIG. 18, since the division width equals the page width, the process is ended. Finally, an uppermost layer V0 representing the entire page is added to the document structure tree.

After the document structure tree is completed, application data is generated in step S804 on the basis of the information of the document structure tree. A practical example for the structure shown in FIG. 18 will be explained below.

Since H1 includes the two blocks T1 and T2 in the horizontal direction, it is output as two columns. Internal information of T1 (text or image as the character recognition result with reference to the DAOF) is output. Then, a new column is set, and internal information of T2 is output. After that, S1 is output. Since H2 includes the two blocks V1 and V2 in the horizontal direction, it is output as two columns. Internal information of V1 is output in the order of T3, T4, and T5. Then, a new column is set, and internal information of V2 is output in the order of T6 and T7. In this way, the conversion process into application data can be done.

[Addition of Pointer Information]

The pointer information addition process in step S1215 will be described next in detail. When a document to be processed is specified by the search process, or when the source file is reproduced by vectorization, and the document is to undergo the recording process, pointer information is added in recording onto a paper sheet. As a result, the source file data can easily be acquired when various kinds of processes are executed again by using this document.

Figure 19:
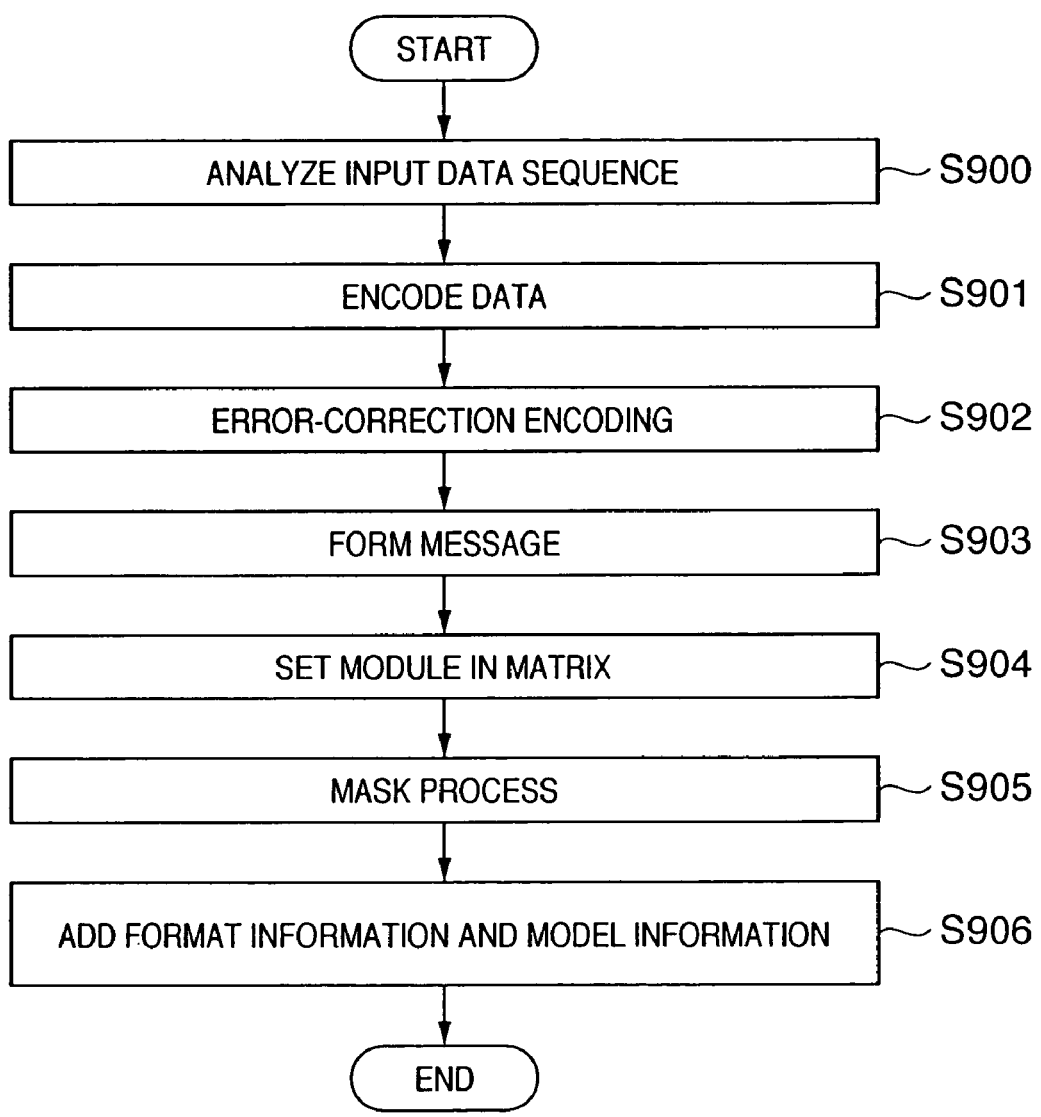
FIG. 19 is a flowchart for explaining procedures of encoding a data character string as pointer information by using a 2D barcode (QR code symbol: JIS X0510) 311 and adding the encoded to an image.

FIG. 19 is a flowchart for explaining procedures of encoding a data character string as pointer information by using the 2D barcode (QR code symbol: JIS X0510) 311 and adding the encoded data to an image.

Data to be encoded in the 2D barcode represents server address information where the corresponding file is stored and is formed of, e.g., path information containing a file server name. Alternatively, the server address information contains the URL of a corresponding server, an ID to manage the database 105*a* or 105*b* or the storage device 111 of the MFP 100 itself, which stores the corresponding file.

To identify different types of characters to be encoded, an input data sequence is analyzed. Error detection and error correction levels are selected, and a minimum model capable of storing input data is selected (step S900). The input data sequence is converted into a predetermined bit sequence. An indicator indicating the data mode (numeric, alphanumeric, 8-bit byte, or kanji) or an end pattern is added as needed. Furthermore, the bit sequence is converted into predetermined bit code words, thereby encoding the data (step S901).

At this time, for the purpose of error correction, the code word sequence is segmented into a predetermined number of blocks in accordance with the model and error correction level. Error correction code words are generated for the blocks and added after the data code word sequence (step S902). Furthermore, the data code words of the respective blocks obtained in step S902 are connected, and error correction code words and remainder code words, as needed, of the respective blocks are connected to form a message (step S903).

Next, code word modules are arranged in a matrix together with a position detection pattern, separation pattern, timing pattern, and alignment pattern (step S904). Furthermore, an optimum mask pattern for the symbol encoding region is selected. The mask processing pattern is converted by XOR operation for the modules obtained in step S904 (step S905). Finally, format information and model information are generated for the modules obtained in step S905, thus completing a 2D code symbol (step S906).

When a digital file from, e.g., the client PC 102 is to be used as print data, and a recorded image is to be formed on a paper sheet by the printing device 112, the above-described 2D barcode incorporating the server address information is converted into recordable raster data in the data processing device 115, added to a predetermined portion on the raster data, and formed as an image. The user who received the paper sheet having the formed image reads the image by the image reading device 110. With this process, the location of the server which stores the original digital file can appropriately be detected from the pointer information in step S1206 described above.

To add additional information for the same purpose, for example, a method of directly adding pointer information to a document by using a character string may be used in place of the 2D barcode described in this embodiment. Alternatively, a so-called watermarking method may be used in which information is embedded by modulating a character string and, more particularly, the spacings between characters in a document, or information is embedded in a halftone image of a document.

<Another Embodiment for Specifying File>

In the above embodiment, to specify original file data from image information obtained by scanning a document, either a method using pointer information added to the document or a method of searching for the file in accordance with object information described in the document is used, as described with reference to the flowchart in FIG. 3. To more accurately specify the original file, both methods are preferably used together.

That is, even when the presence of the original file can be detected from pointer information obtained from the document, the files are further narrowed down by using object information in the document. For example, layout search according to layout information or full-text search based on a keyword obtained by character recognition is executed for the detected file. When a high matching rate is obtained, the detected file may formally be specified as the original file. Even when the lower-bit part of pointer information is doubtful and cannot be corrected by error correction, the file can be specified by narrowing down the search range. Hence, a file can more quickly and accurately be specified.

[Another Embodiment of Vectorization]

In the above embodiment, when the original file cannot be specified by the search process, the vectorization process is executed for the entire image. In a general document, however, several objects are diverted from other files in some cases instead of newly creating all objects in the document. For example, a document creation application prepares some patterns of background objects (wallpapers), and generally, one of them is selected by the user. Hence, such objects are more likely to be present in other document files in the document file database as reusable vector data.

Under these circumstances, as another embodiment of the vectorization process (step S1209) in the flowchart shown in FIG. 3, the database is searched for a file which includes an object which matches each of individual objects segmented by the block selection process (step S1201). Vector data of the matched object is individually acquired from the found file. As a result, the input document need not be fully vectorized but can be vectorized more quickly. Furthermore, deterioration of image quality due to vectorization can be prevented.

On the other hand, when the original file can be specified as a PDF by the search process (steps S1206 to S1208) in the flowchart shown in FIG. 3, the PDF sometimes has, as an additional file, character codes already obtained by applying character recognition to text objects in the document. In vectorizing this PDF file, the character recognition process in the vectorization process from step S1209 can be omitted by using the character code file. That is, the vectorization process can be executed more quickly.

[Identical Object Comparison/Determination]

In this process, every time an object is created for a page, the identity between the object and an already created object is checked. This comparison process can be executed by using either a method of comparing an object reproduced from an already created (i.e., vectorized) object with the target object or a method of comparing the vector data of an object with the vector data of the target object.

If it is determined that the two objects are identical, the ID of the object determined as identical is stored in the property information. In image data such as PDL, identical objects contain the precisely same data, and it can easily be determined whether the two objects are identical. However, in image data obtained by, e.g., scanning a document, i.e., image data which has undergone manipulation influenced by external noise or environmental variations, even when two objects are directly compared, identical objects are not always reliably recognized as identical. Hence, in comparing objects, a predetermined margin is set for the identity to determine whether the difference component of color or size falls within some allowable range. To do this, two data to be compared are subjected to, e.g., filtering and then compared.

[Character Information Reconstruction Process]

FIG. 20 is a view showing an example of property information of vectorized representative objects. Referring to FIG. 20, objects 1 and 2 are vectorized representative objects. FIG. 21 is a view showing an example of a character information link table as a list of objects which refer to representative objects. FIG. 21 shows a state wherein the representative object 1 in FIG. 20 is referred to by objects 21a to 21c. That is, in the character information reconstruction process, when all image data are vectorized, data whose property information shown in FIG. 20 is character information are linked to create the character information link table shown in FIG. 21.

[Reconstruction Information Creation Process]

In response to a reconstruction request for a page, the list corresponding to the requested page number is extracted from the property information shown in FIG. 20. Of data whose property information is image information, data which refers to no representative object is read out from the storage location and displayed at position information read out from the medium. For data which refers to a representative object, the data is read out from the storage location of the referred object ID and displayed. Next, an object whose property information is character information is read out and displayed at position information read out from the medium so that the page is reconstructed.

[Image Deformation]

For example, assume that a series of document sheets of, e.g., an house document is input, and each of the pages has the company's logotype. Characters "CONFIDENTIAL" are added next to the company's logotype to allow a specific person outside the company to read this document. This process will be described.

For the company's logotype to be processed, one representative object is vectorized and registered by the above-described [Identical Object Comparison/Determination] process such that the data is repeatedly referred to in every page.

The operator who executes the modification process only needs to change the representative object of the logotype at the storage address to an object having additional characters "CONFIDENTIAL" after it and reconstruct the page in the same way as described in the "reconstruction information creation process".

If the representative object itself is changed, the original data is damaged. To prevent this, a new object having the additional characters "CONFIDENTIAL" after the logotype of the representative object is created. Then, the property information shown in FIG. 20 is copied, and the reference destination is changed. As described above, according to the present invention, the above-described operation can very easily be done.

Detailed examples using the above-described image processing system will be described below by exemplifying XML-based SVG recommended by W3C. However, application of the present invention is not particularly limited to this format.

EXAMPLE 1

In the first example, identical objects contained in image information of one or a plurality of input document sheets or objects which are regarded as identical by property (e.g., scaling, color, direction, or position) conversion are sequentially searched in the vectorization process, and the link to representative objects is displayed on the operation screen. A representative object is designated for each object. An object which is not linked to any representative object is registered as a new representative object.

Property conversion is designated as needed. The link of an object which is already linked to a representative object is changed. The result is stored, and the stored result is printed. If an object cannot be reconstructed from referred representative vector data, the representative object is subjected to scaling.

[Details of Operation Specifications]

<<Operation Screen Specifications>>

The operation screen includes a display device and an input device capable of designating a position in the screen. In the example to be described below, the operation screen includes an LCD and a touch panel. Instead, the operation screen may include a CRT and a mouse pointer.

<<Copy Operation Specifications>>

Figure 22:
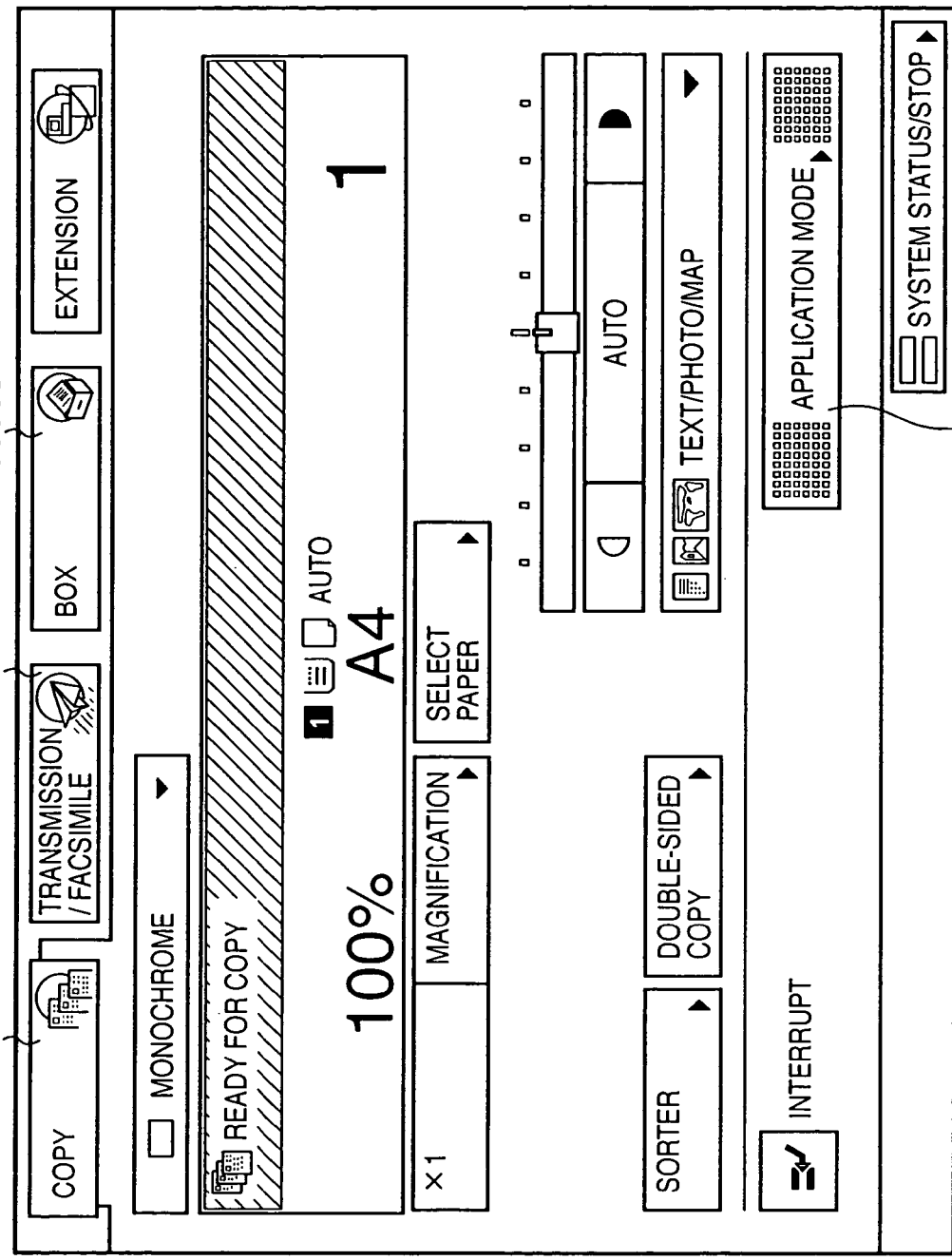
FIG. 22 is a view showing a basic window to execute the copy operation.

FIG. 22 is a view showing a basic window to execute the copy operation. The function implemented by the present invention is often set in a layer lower by one level and therefore put in an operation in "application mode" in the example of the operation screen of this embodiment. When the operator presses an "application mode" key 221 displayed on the basic window shown in FIG. 22, a window shown in FIG. 23 is displayed.

Figure 23:
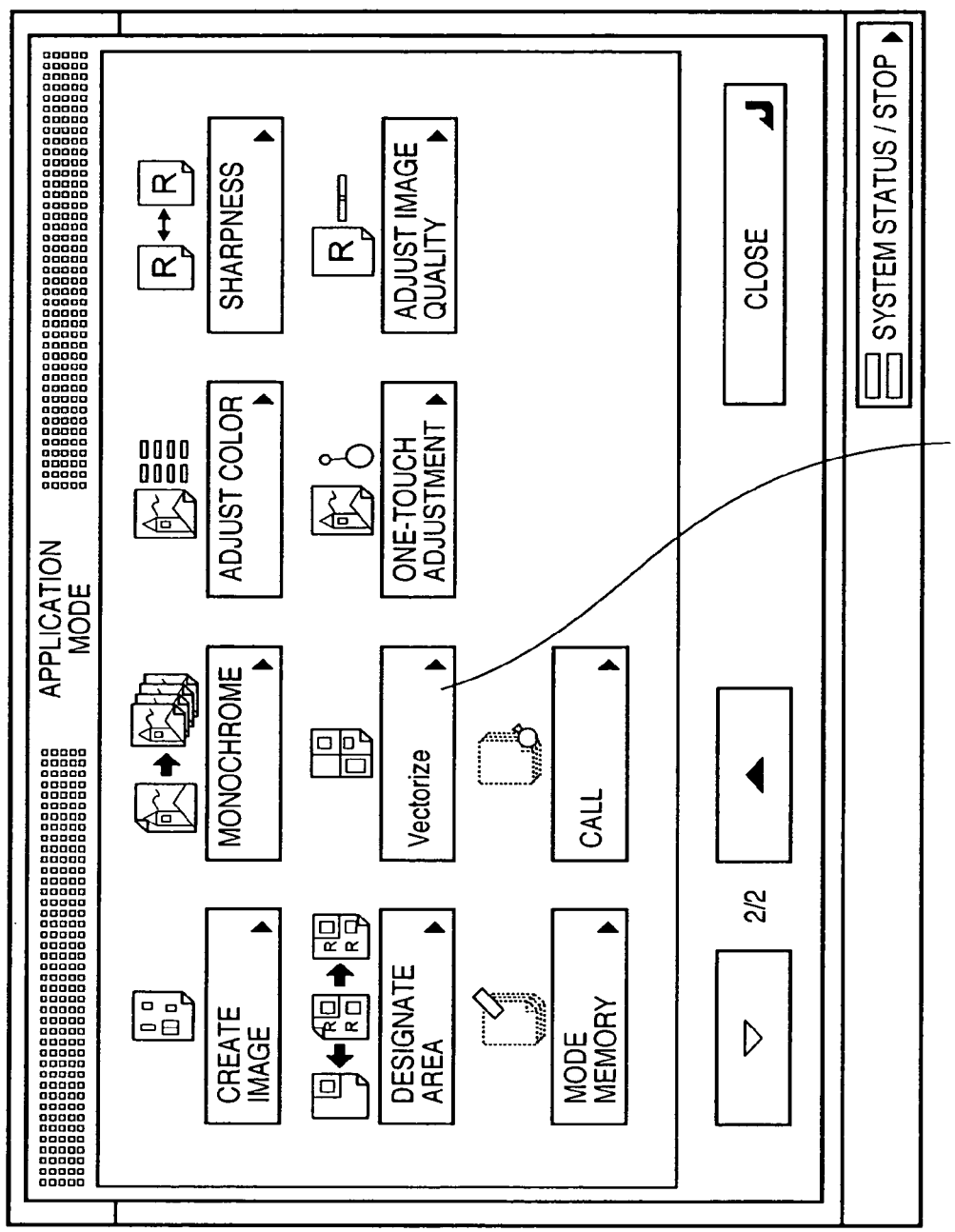
FIG. 23 is a view showing an application mode display window which displays a list of functions included in the application mode.

FIG. 23 is a view showing an application mode display window which displays a list of functions included in the application mode. When the operator presses a "Vectorize" key 231 in the application mode display window shown in FIG. 23, a window shown in FIG. 24 is displayed. FIG. 24 is a view showing a vectorization process window to execute the vectorization process function.

When the operator presses a "reading start" key 241 displayed on the vectorization process window shown in FIG. 24, the MFP 100 reads the document set in the image reading device 110. When the document is read, an XML-based SVG file is generated and stored in a memory area (not shown).

FIG. 25 is a view showing an example of an XML-based SVG file generated by reading a document. Simultaneously with the above process, the file is read out to display a window shown in FIG. 26 in accordance with the resolution of the operation unit.

Figure 26:
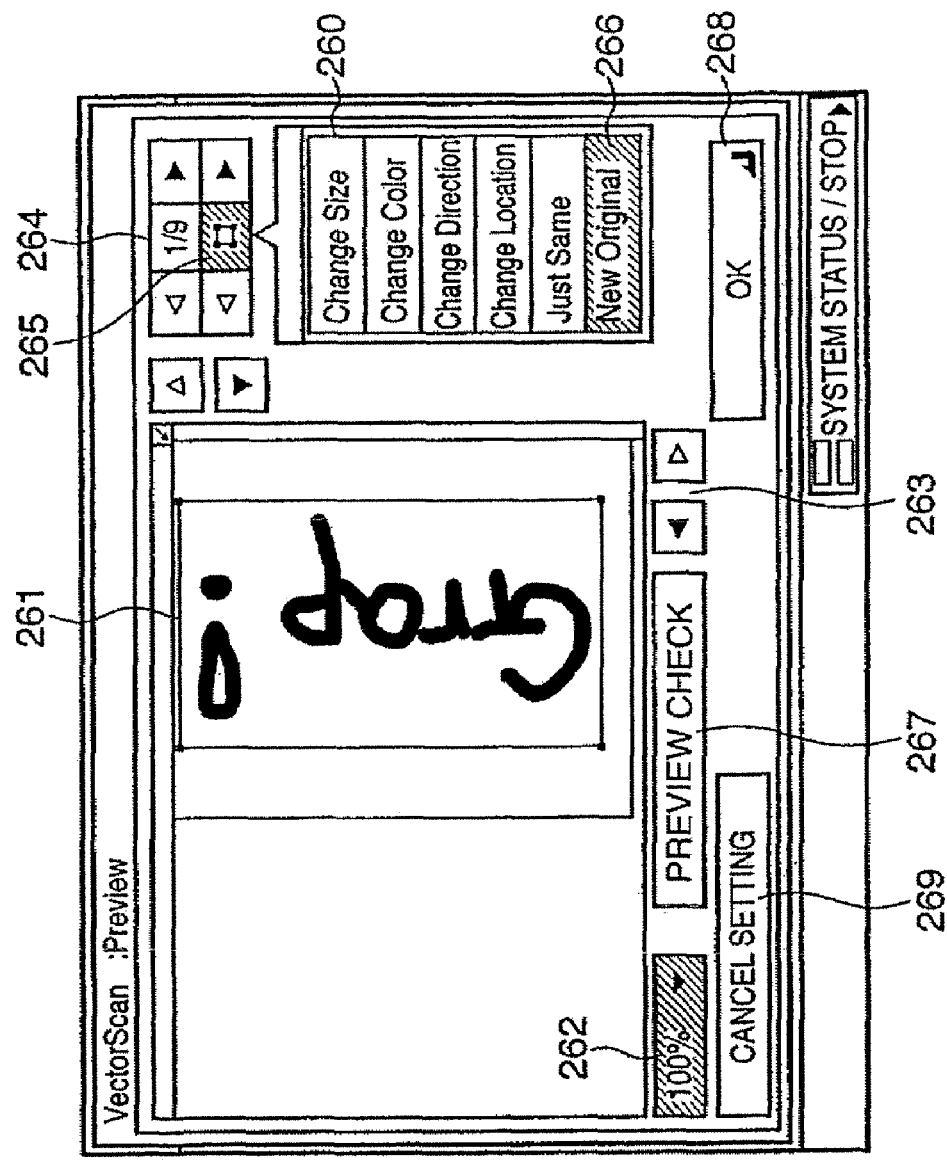
FIG. 26 is a view showing a characteristic window to apply the present invention in which a readout file is displayed.

FIG. 26 is a view showing a characteristic window to apply the present invention in which the readout file is displayed. This window will be described below in detail.

FIG. 26 shows a read image and its vectorization result. An element (to be referred to as an "object" hereinafter) which forms the window and its position are expressed by a rectangle 261. The displayed image can be enlarged by using an enlarge key 262. In this case, the image can be scrolled in the vertical and horizontal directions by clicking on a scroll key 263 so that a portion outside the display area can be displayed.

When a page select key 264 is operated, a page can be selected. When a page is selected, the image and vectorization result of that page are displayed. In the example shown in FIG. 26, the image of the first page of a 9-page document read by the ADF is displayed. Only one object, i.e., a logotype "Grap!" is displayed by the rectangle 261. The remaining part is expressed as a background. A background is an image which remains after the objects included in the window are extracted and is therefore not particularly displayed by a rectangle.

An object in the rectangle 261 can be selected by, e.g., directly touching it to designate. The display method may be changed such that, for example, the rectangle 261 of the selected object is indicated by a solid line, and an unselected object is indicated by a broken line. In this case, the operator can easily quickly recognize whether an object is selected. In addition to expressing the rectangle of the selected object by a solid line, the object is displayed in a specific color (e.g., red) assigned to the representative object.

Reference numeral 265 denotes a representative object select key. When the object designated in the rectangle 261 is linked to a representative object, the link to the object is displayed. More specifically, the representative object select key 265 is set in the ON state, and the rectangular indicator at the center of the key changes to a color (e.g., red) assigned to the representative object. Of object link keys 260, a key (e.g., a "New Original" key 266) associated with the selected object is also set in the ON state.

A case wherein the selected object is already a representative object will be described. Referring to FIG. 26, since the logotype "Grap!" selected by the rectangle 261 is already a representative object, only the "New Original" key 266 is ON.

A case wherein the selected object is not yet linked to a representative object will be described. When the logotype "Grap!" selected by the rectangle 261 is not a representative object yet, the rectangular indicator at the center of the representative object select key 265 is set in the OFF state. The rectangular indicator itself is also displayed in the normal color (e.g., black). Simultaneously, the rectangle 261 indicating the representative object is also displayed in the same color (e.g., black). All the object link keys 260 are OFF.

An operation of changing a non-representative object to a representative object will be described next. When the operator presses the "New Original" key 266 in the window shown in FIG. 26, the currently selected object is registered as a representative object. With this operation, a color (e.g., red) corresponding to the registered representative object is assigned. The representative object select key 265 is turned on. The rectangular indicator in the key and the rectangle 261 indicating the registered representative object also change to same color (e.g., red).

A process of changing an object registered as a representative object to a non-representative object. When the "New Original" key 266 already in the ON state is pressed again in the window shown in FIG. 26, the "New Original" key 266 is turned off. When all the object link keys 260 are turned off, the link to the representative object is canceled. The rectangular indicator in the representative object select key 265 is turned off. The rectangle 261 indicating the object is handled as an original object so that a rectangle in the normal color (e.g., black) representing an original object is displayed.

Figure 27:
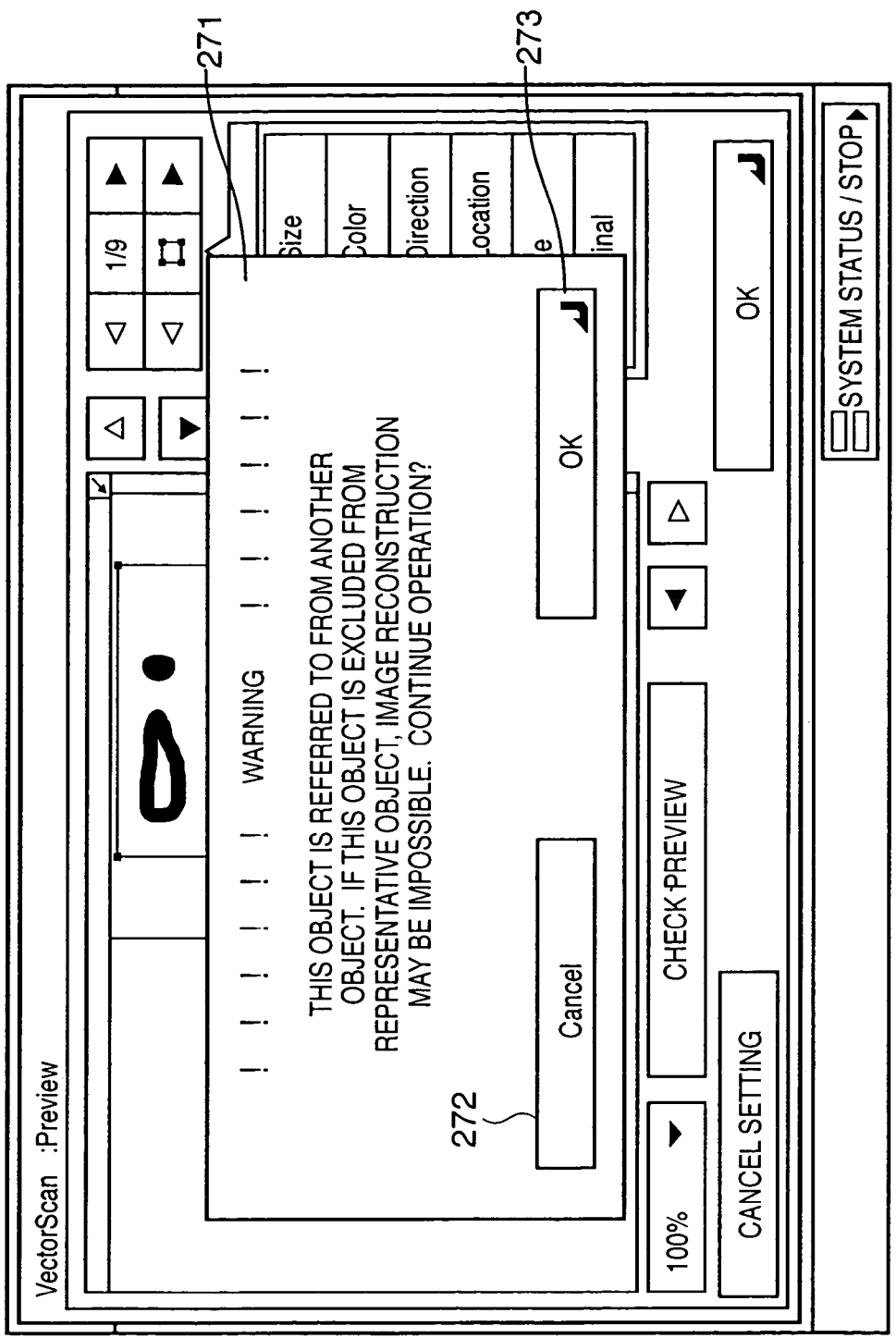
FIG. 27 is a view showing an example of a window displayed when a representative object is to be changed to an original object.

In changing a representative object to an original object, if another object is linked to the representative object, a warning message 271 shown in FIG. 27 is displayed to ask the operator whether to continue the operation. FIG. 27 is a view showing an example of a window displayed when a representative object is to be changed to an original object. When the operator presses a "Cancel" key 272, display returns to the window shown in FIG. 26. When the operator presses an "OK" key 273, the representative object is deleted from the list of representative objects.

Another process executable in the window shown in FIG. 26 will be described. When the operator presses a "preview check" key 267 in the window shown in FIG. 26, operations executed till then, including the link to a representative object, can be reflected on the image in the preview area. During preview display, the "preview check" key 267 is ON. When the operator presses the key again, display returns to the object display, and the "preview check" key 267 is turned off.

Saving and cancel of an editing result will be described next. When the operator presses an "OK" key 268 in the window shown in FIG. 26, the result is saved as a document. When the operator presses a "setting cancel" key 269, the setting is canceled, and display returns to the copy basic window shown in FIG. 22.

Figure 28:
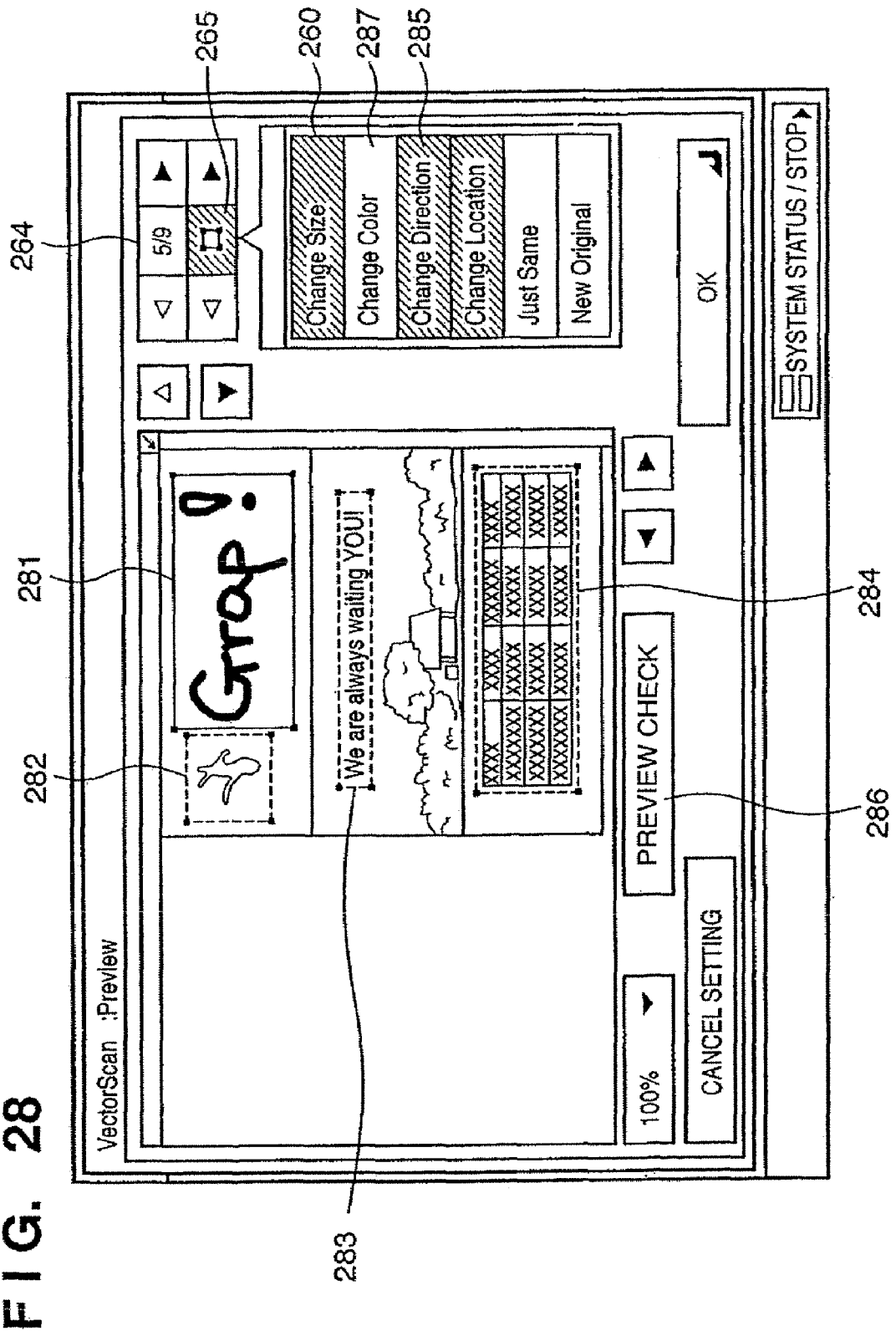
FIG. 28 is a view showing an example wherein the ⅗ page of an image obtained by reading a document by the same job as in FIG. 26.

Display of the link to a representative object will be described next. FIG. 28 is a view showing an example wherein the 5/9 page of an image obtained by reading a document by the same job as in FIG. 26. The page displayed on the window shown in FIG. 28 includes four object rectangles 281 to 284 and one background. The object rectangle 281 is linked to the representative object rectangle 261 shown in FIG. 26. To reflect this, the rectangle at the center of the representative object select key 265 and the object rectangle 281 are displayed in the color (e.g., red) assigned to the representative object 261. Of the object link keys 260, "Change Size", "Change Location", and "Change Direction" are ON.

Figure 29:
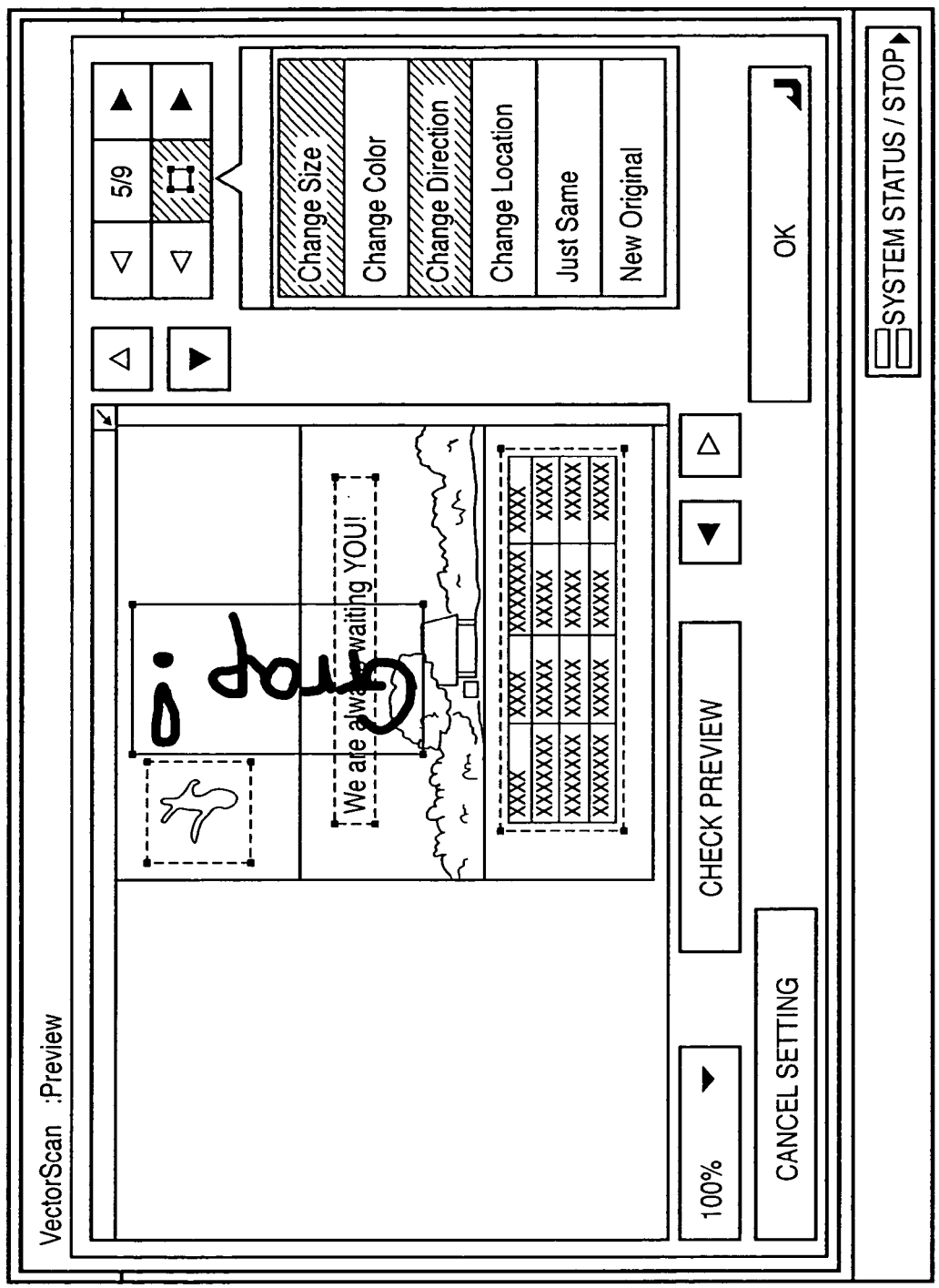
FIG. 29 is a view showing a window in which the direction and size of the representative object are changed in the window shown in FIG. 28.

A case wherein the link to a representative object is changed in the window shown in FIG. 28 will be described. The operator presses a "Change Location" key 285 in the ON state in the window shown in FIG. 28 to turn on the key and presses a "preview check" key 286. With this operation, display changes to a window shown in FIG. 29 because the direction and size of the representative object change although its position does not change. FIG. 29 is a view showing a window in which the direction and size of the representative object are changed in the window shown in FIG. 28.

When the operator presses a "Change Color" key 287 in the OFF state, a color table (not shown) is displayed so that a color can be designated. When the color is changed, the "Change Color" key is turned on.

Figure 30:
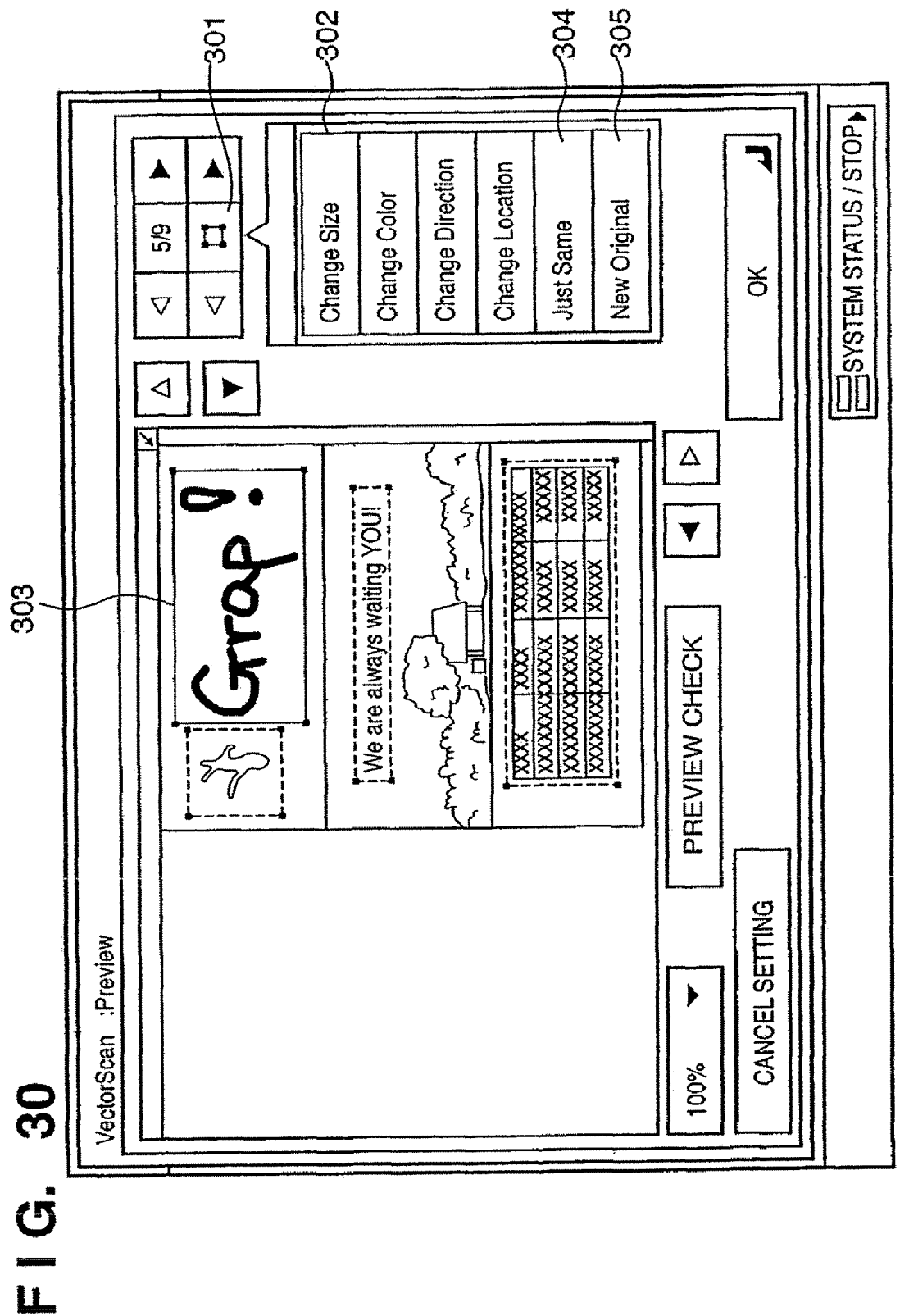
FIG. 30 is a view showing a window in which all representative object select keys and object link keys are OFF.

A case wherein the representative object is changed in the window shown in FIG. 28 will be described. Even when the operator changes the linked representative object by using the representative object select key 265, the link to the representative object indicated by the rectangle 261 does not change. As shown in FIG. 30, a representative object select key 301 and all object link keys 302 are turned off. The rectangle at the center of the representative object select key 301 changes to a color assigned to the selected representative object. FIG. 30 is a view showing a window in which the representative object select key and all the object link keys are OFF.

Figure 31:
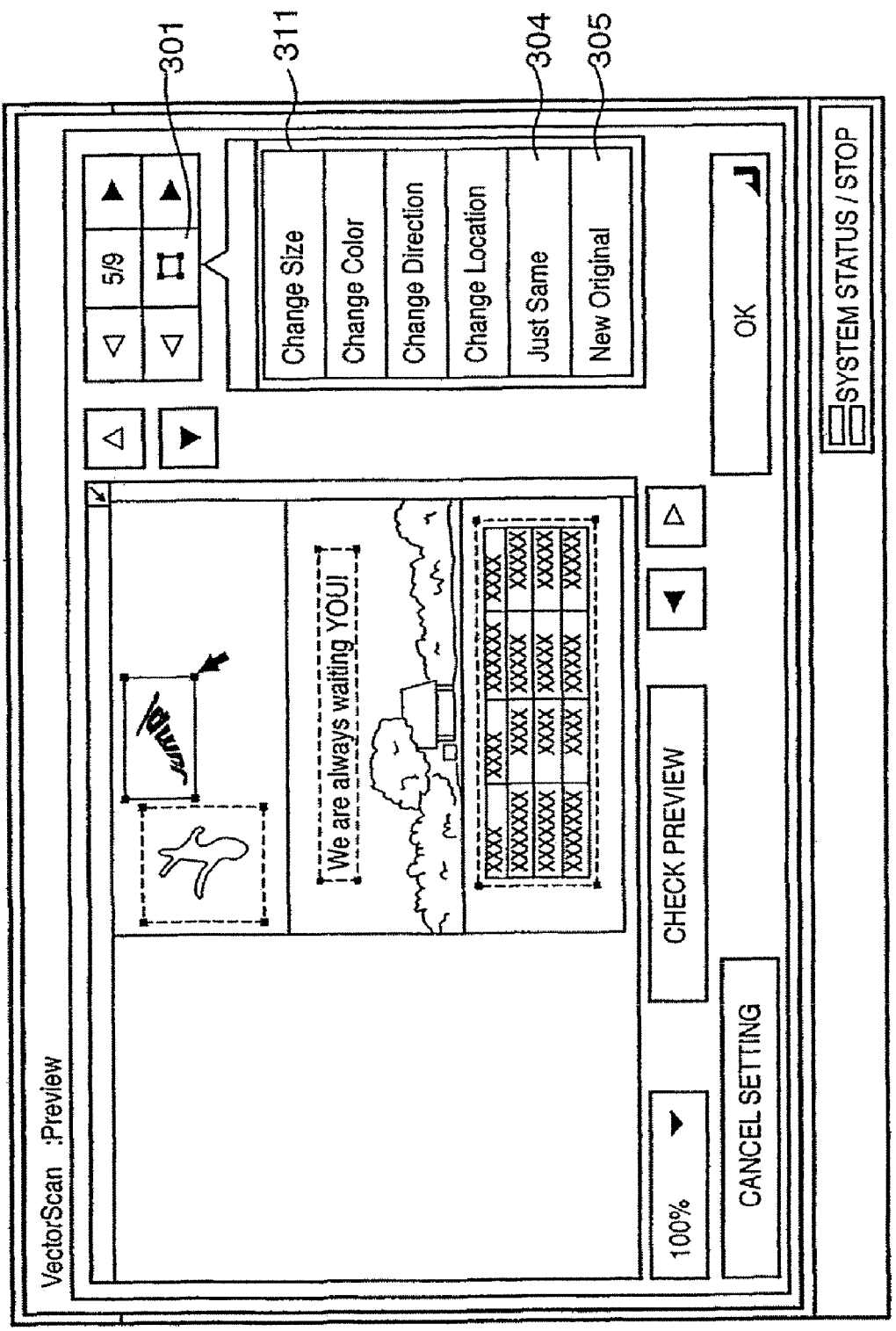
FIG. 31 is a view showing an example of a window when the link between an object and a representative object is canceled, and the object is linked to another representative object.

A case wherein the link between an object and a representative object is canceled, and the object is linked to another representative object will be described next. When another representative object is already linked in the window shown in FIG. 30, a "New Original" key 305 cannot be selected. In this state, when the operator presses the rectangle at the center of the object select key 301, the link to the representative object indicated by the rectangle 261 in FIG. 26 is canceled. The object is linked to another representative object. A rectangle 303 of the representative object is changed to a color assigned to the representative object, i.e., the color of the center of the object select key 301. Simultaneously, a "Just Same" key 304 is selected as an initial value. When the operator presses "preview check" in this state, display changes to a window shown in FIG. 31. FIG. 31 is a view showing an example of a window when the link between an object and a representative object is canceled, and the object is linked to another representative object.

Figure 32:
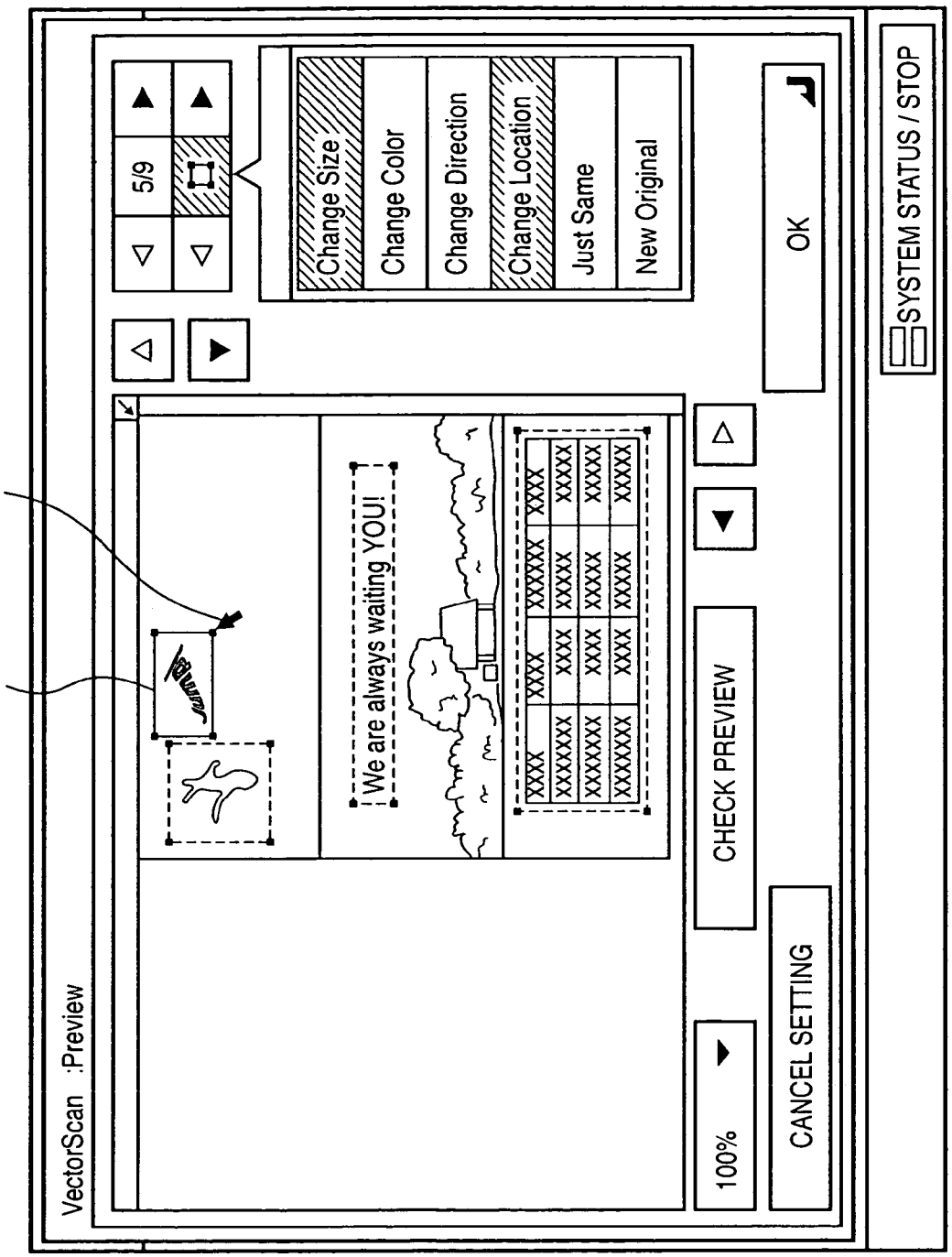
FIG. 32 is a view showing an example of a window to further change the size in the window display shown in FIG. 31.
Figure 33:
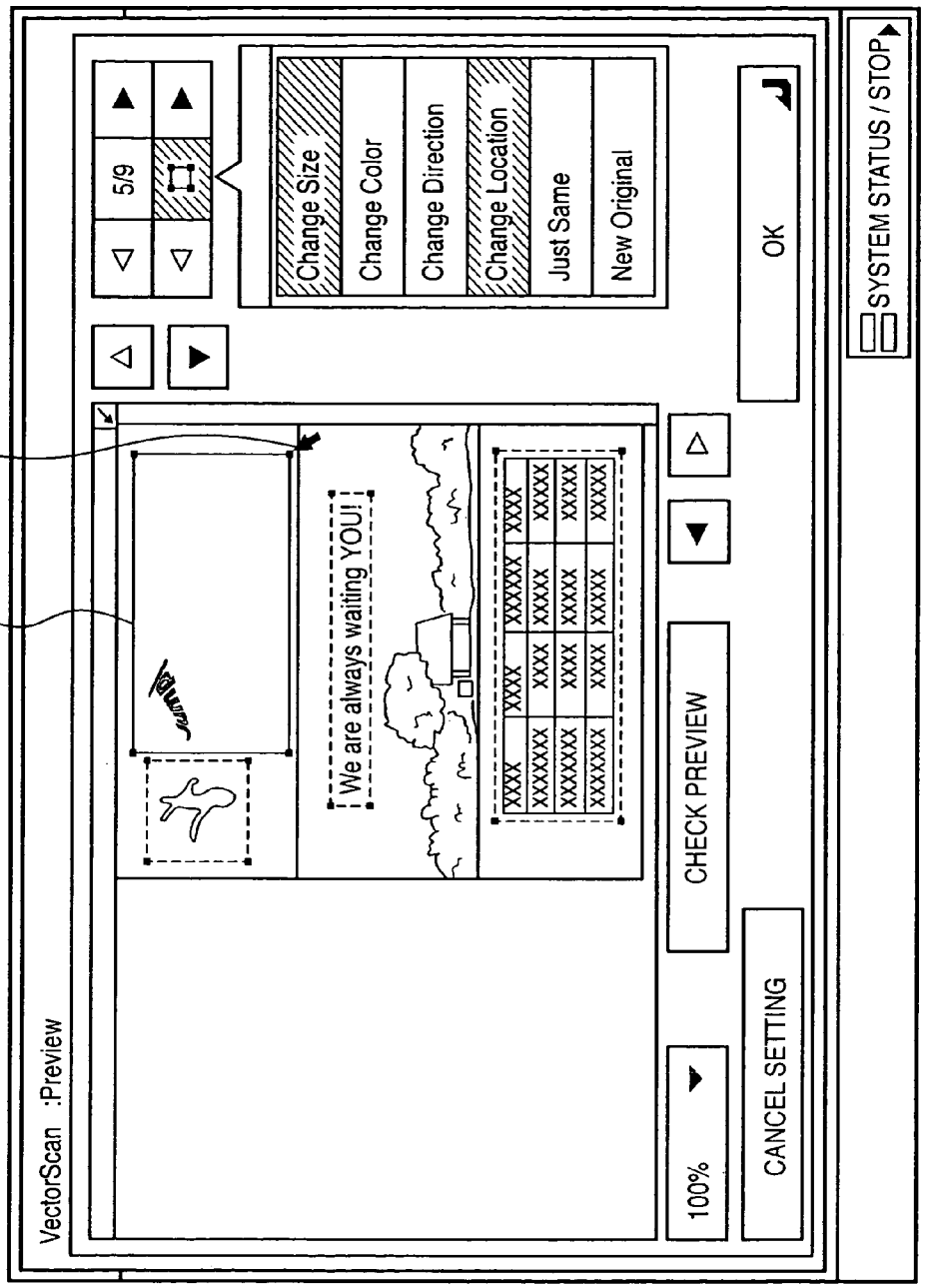
FIG. 33 is a view showing window display when the operator has dragged the arrow icon in the display shown in FIG. 31.
Figure 34:
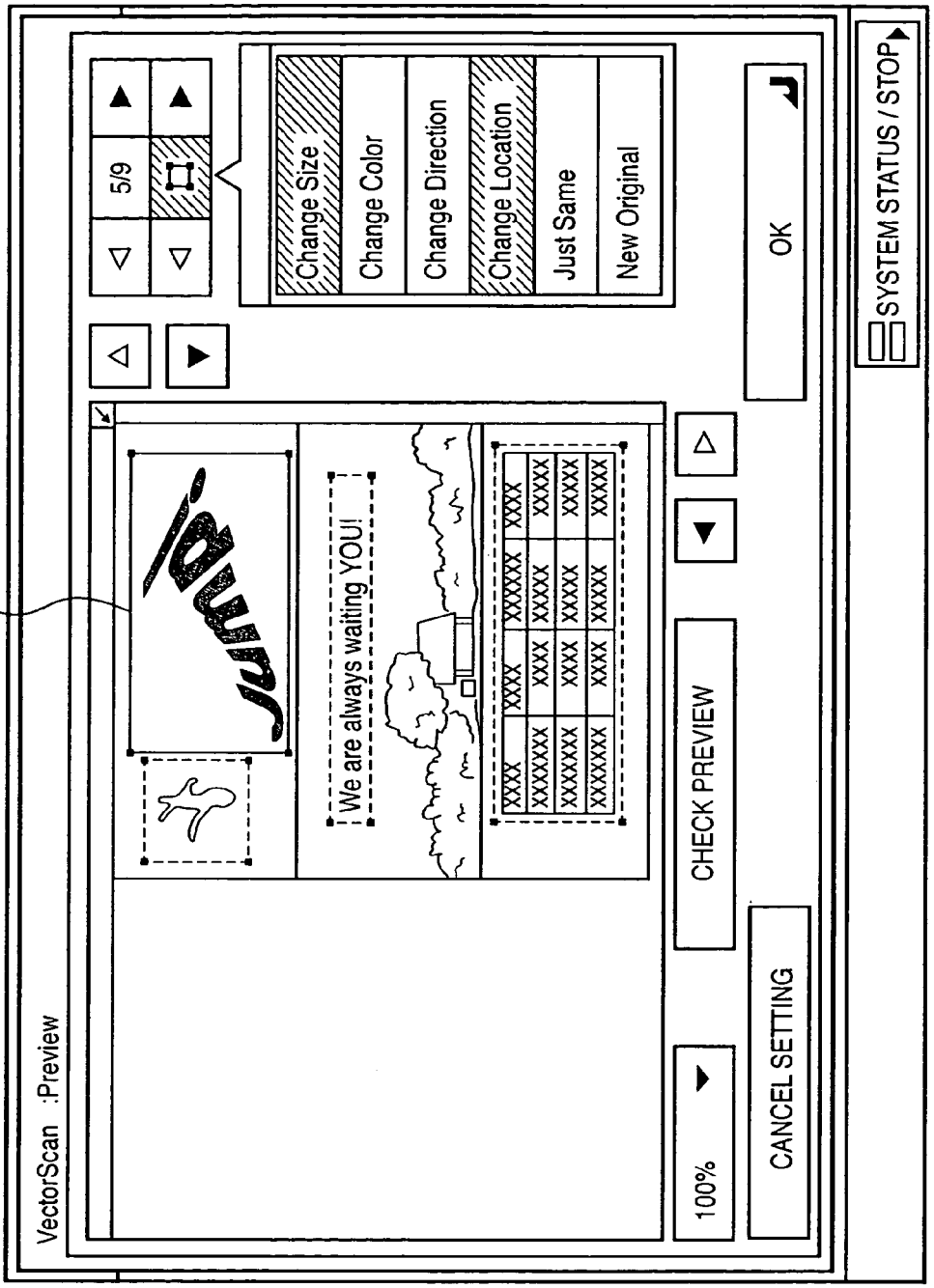
FIG. 34 is a view showing window display in which the representative object is set to a size corresponding to a rectangle defined by dragging the arrow icon.

A case wherein the link to a new representative object is designated will be described next. To further change the size in the window shown in FIG. 31, the operator presses a "Change Size" key 311. With this operation, display changes to a window shown in FIG. 32. FIG. 32 is a view showing an example of a window to further change the size in the window display shown in FIG. 31. When the operator drags a rectangle 322 to a desired size by using an arrow icon 321 synchronous with the mouse or the like, the rectangle 322 changes to a rectangle 332 in a window shown in FIG. 33 in real time. When the operator stops dragging at the position of an arrow icon 331, the representative object is set to a size corresponding to the size of a rectangle 341 in a window shown in FIG. 34. FIG. 33 is a view showing window display when the operator has dragged the arrow icon in the display shown in FIG. 31. FIG. 34 is a view showing window display in which the representative object is set to a size corresponding to the rectangle defined by dragging the arrow icon.

A case wherein the link between an object and a representative object is canceled, and the object is set to a new representative object will be described next. When no representative object is registered in that region in the window shown in FIG. 30, the "New Original" key 305 can be pressed. When the operator selects (presses) the "New Original" key 305 in this state, a new representative object is registered. The rectangle 303 indicating the representative object is changed to the color of the center of the object select key 301.

A case wherein the link to a representative object is canceled will be described next. When the representative object key in the ON state, which is at the center of the representative object select key 265, is pressed in the window shown in FIG. 28, the key is turned off. Accordingly, the link between the object indicated by the rectangle 281 and the representative object is canceled so that the object is handled as an original object. In this case, the rectangle 281 surrounding the object is changed to a color representing an original object.

Figure 35:
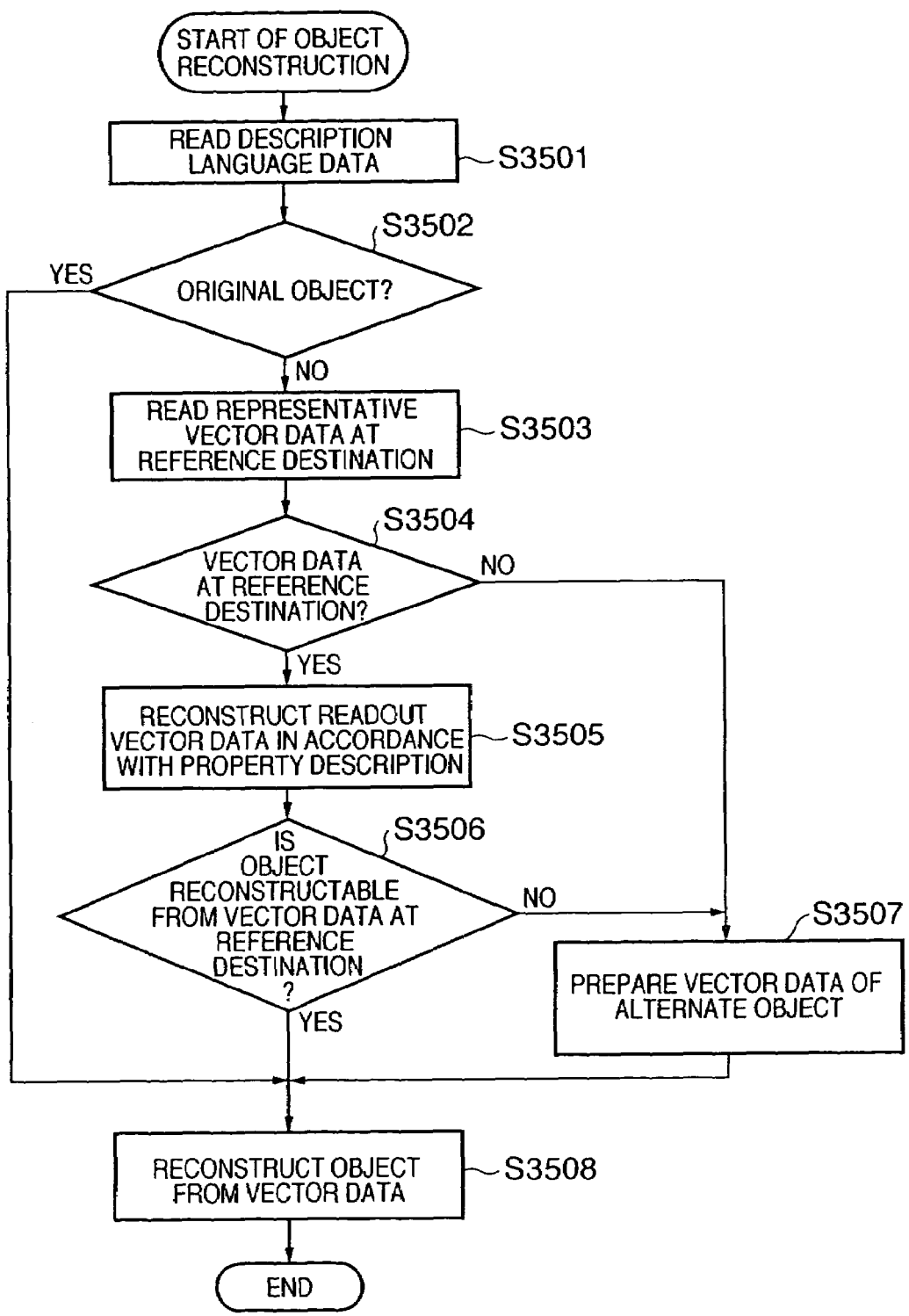
FIG. 35 is a flowchart for explaining a process of reconstructing an object from vector data.

A process of reconstructing an object from vector data will be described below. FIG. 35 is a flowchart for explaining the process of reconstructing an object from vector data.

Data about an object is read from image data described in the description language (step S3501). If the object is an original object, the object is reconstructed from the vector data. That is, it is determined whether the object is an original object (step S3502). If the object is no original object and refers to another representative object (NO in step S3502), vector data at the reference destination is read (step S3503).

It is determined by reading vector data at the reference destination whether vector data at the reference destination is present (step S3504). If vector data is present (YES in step S3504), the object is reconstructed from the vector data in accordance with the property description (step S3505). If it is determined that the vector data at the reference destination cannot be read (NO in step S3504), the vector data of the representative object is prepared (step S3507).

After the readout vector data is reconstructed in step S3503, it is determined whether the object can be reconstructed from the vector data at the reference destination (step S3506). If the object can be reconstructed from the representative vector data in accordance with the property description (YES in step S3506), the object is reconstructed from the vector data (step S3508). If the object cannot be reconstructed from the vector data at the reference destination in accordance with the property description (NO in step S3506), the vector data of the alternate object is prepared (step S3507). The object is reconstructed from the vector data (step S3508).

<Transmission/Facsimile Operation Specifications>

Figure 36:
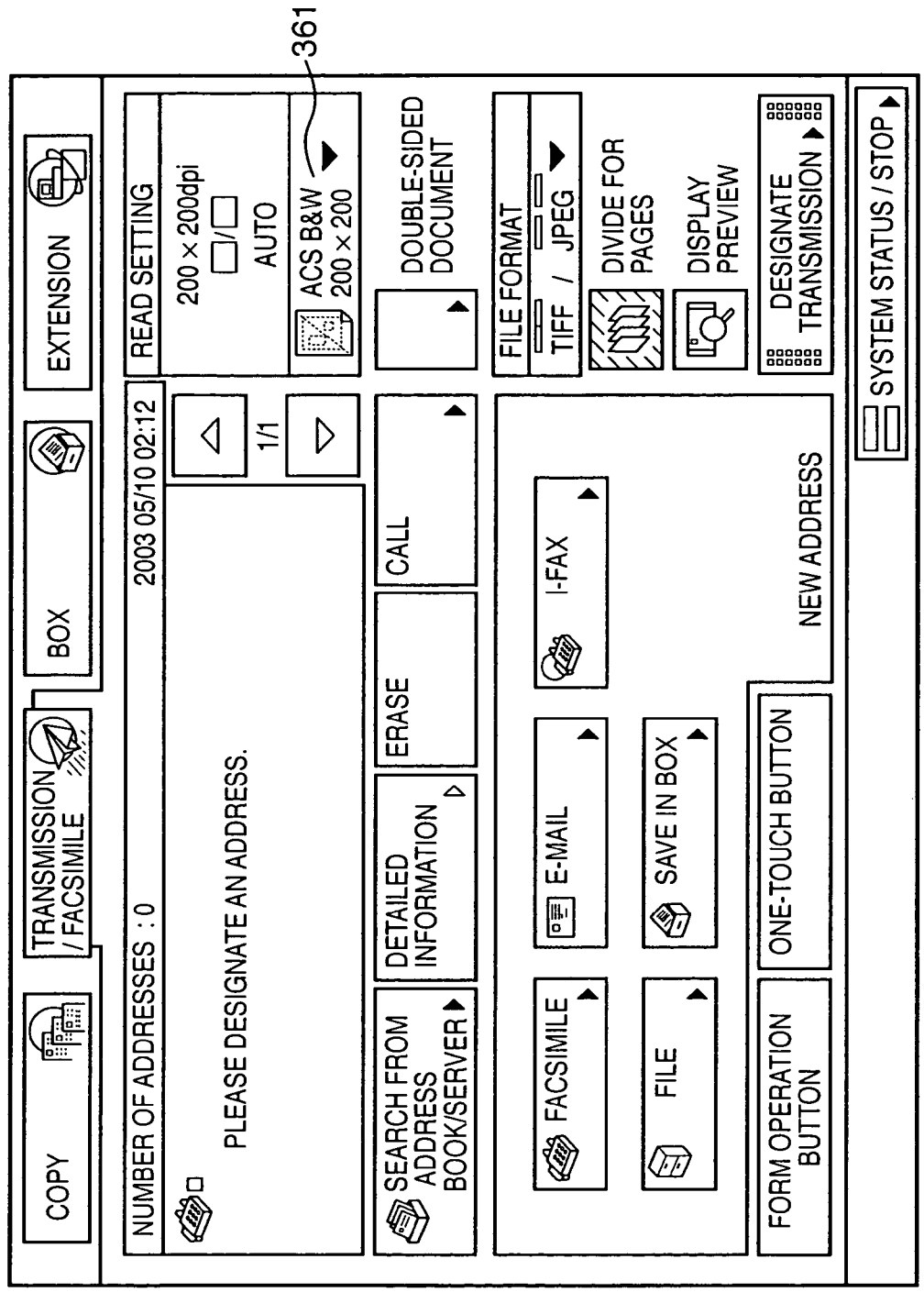
FIG. 36 is a view showing a basic window to execute the transmission/facsimile operation.
Figure 37:
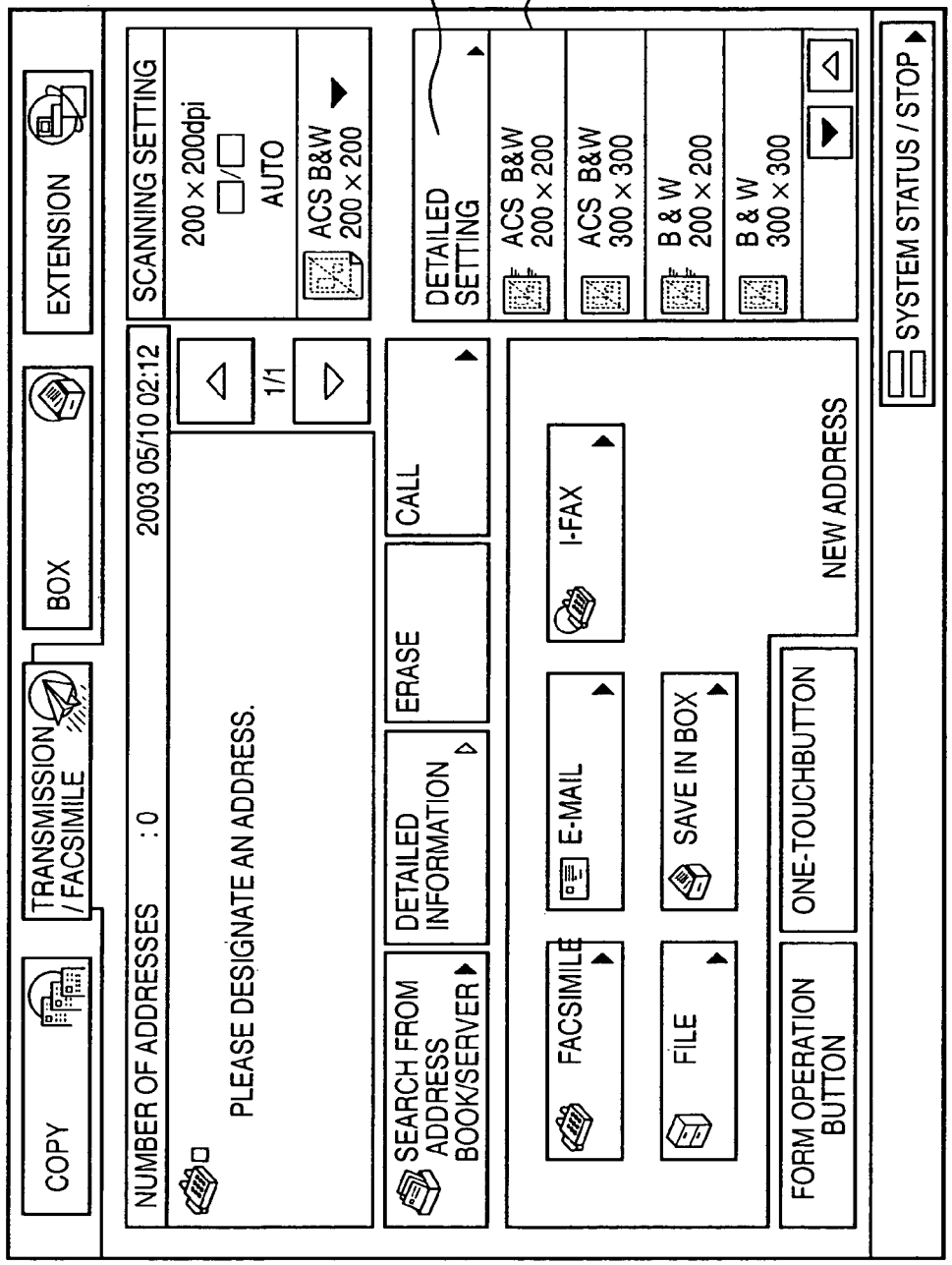
FIG. 37 is a view showing a window to execute the detailed transmission/facsimile operation.
Figure 38:
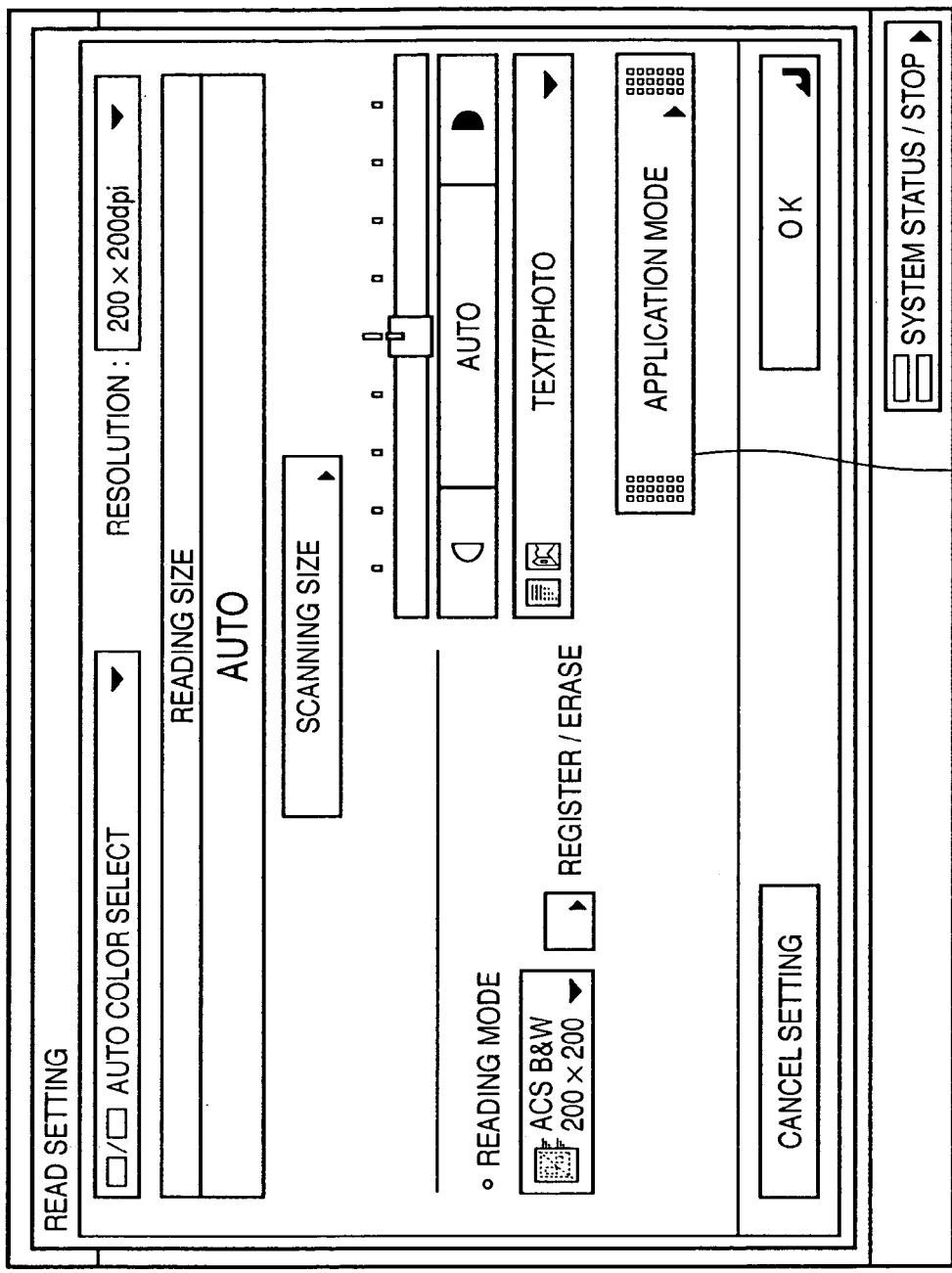
FIG. 38 is a view showing an example of the read setting detail window.

FIG. 36 is a view showing a basic window to execute the transmission/facsimile operation. To use the function of the present invention, read setting must be done. Setting can be executed from a read setting pull-down 361. When the operator presses the read setting pull-down 361 in the window shown in FIG. 36, a pull-down 371 is displayed in a window shown in FIG. 37. FIG. 37 is a view showing a window to execute the detailed transmission/facsimile operation. When a detail set key 372 is pressed, a read setting detail window shown in FIG. 38 is displayed. FIG. 38 is a view showing an example of the read setting detail window. When the operator presses an application mode key 381 in the window shown in FIG. 38, the window shown in FIG. 26 is displayed. Then, the same process as in the copy operation specifications is executed.

<Box Operation Specifications>

Figure 39:
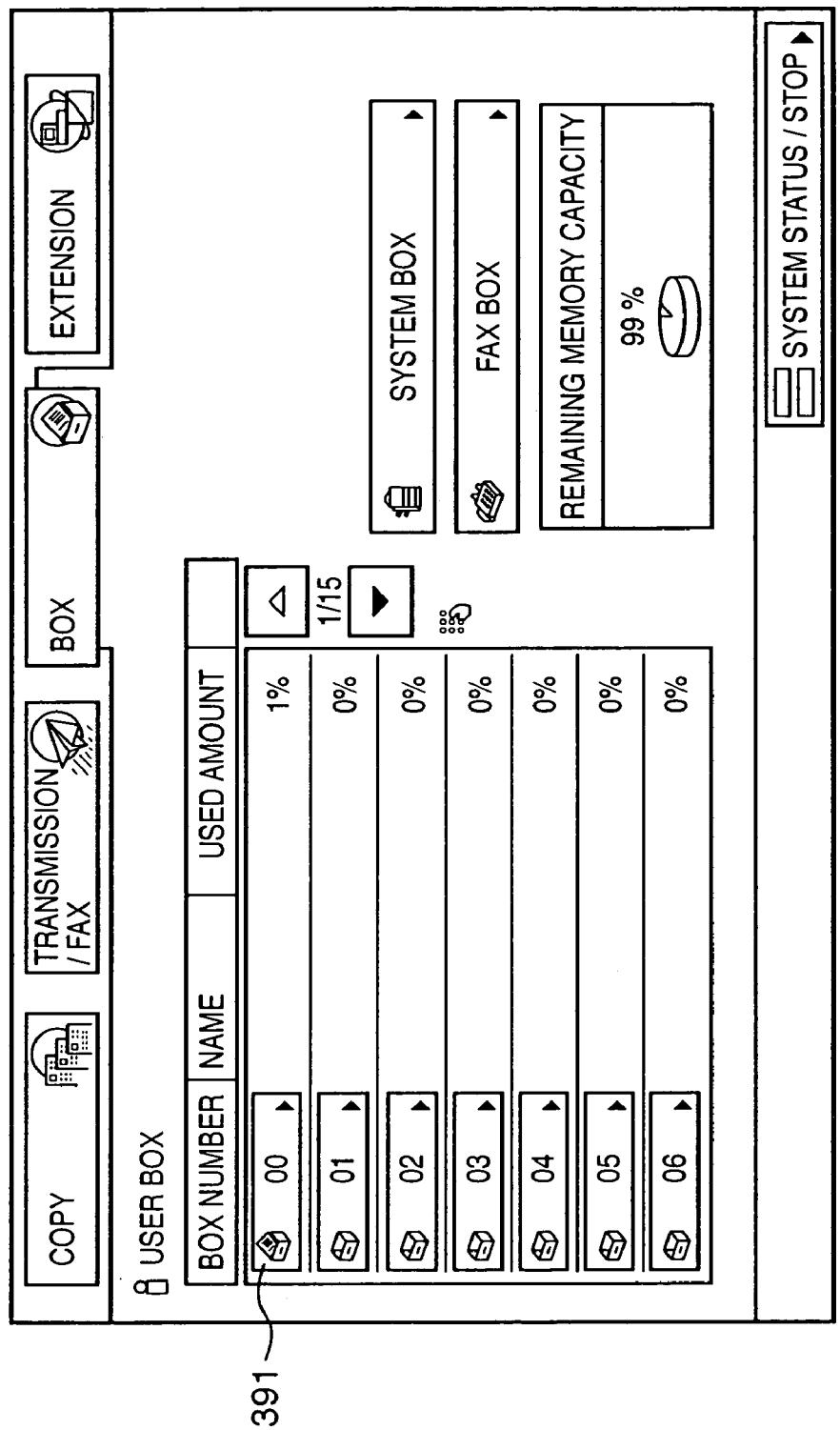
FIG. 39 is a view showing the basic window of boxes.
Figure 40:
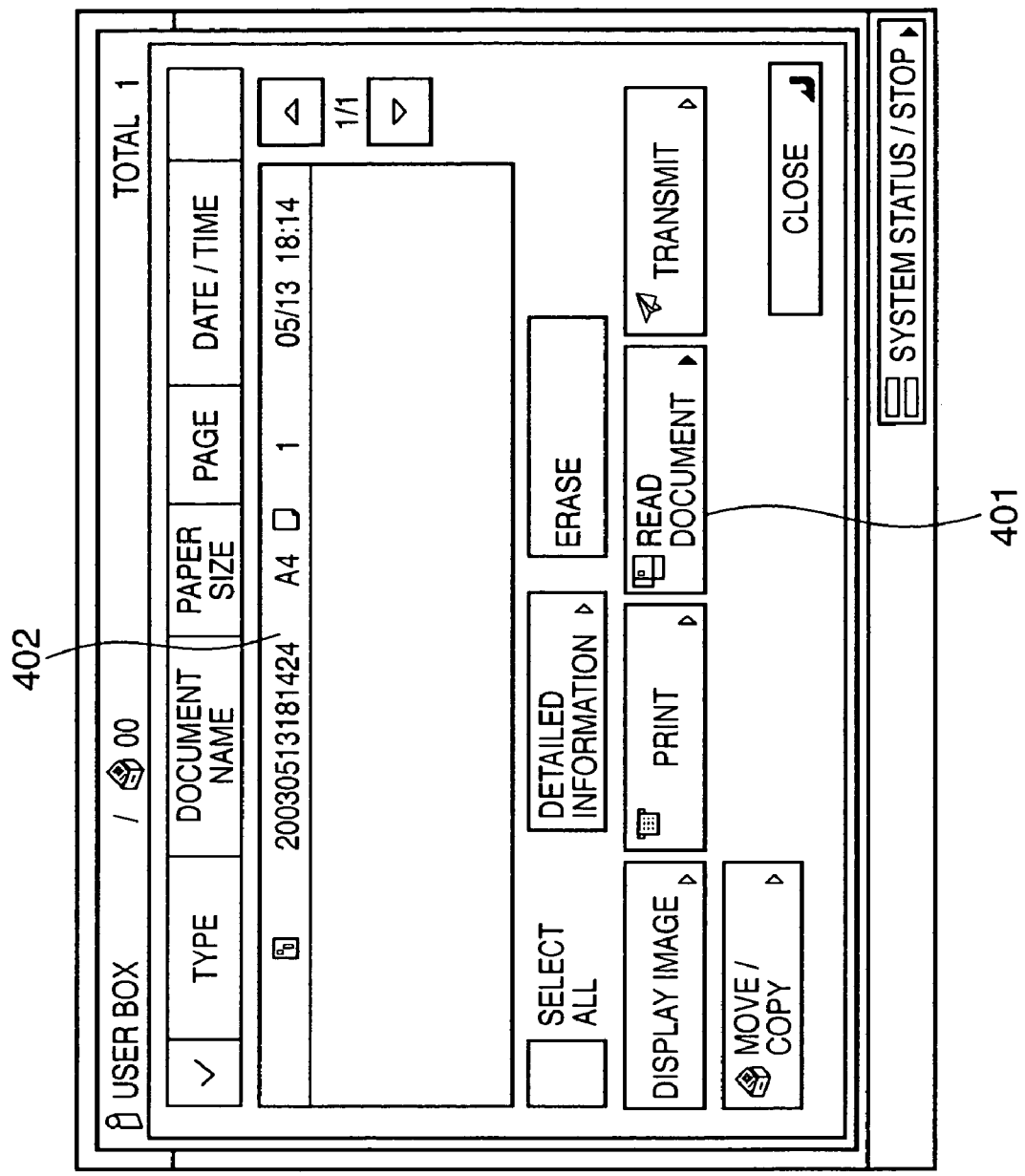
FIG. 40 is a view showing a window to display a document stored in a specific user box.

FIG. 39 is a view showing the basic window of boxes. When the operator presses a key 391 representing box 00 in the window shown in FIG. 39, a window shown in FIG. 40 is displayed. FIG. 40 is a view showing a window to display a document stored in a specific user box. When the operator presses a document read key 401 in the window shown in FIG. 40, a document read setting window is displayed. As the document read setting window, the same window as that shown in FIG. 38 for the transmission/facsimile operation specifications is displayed.

Figure 41:
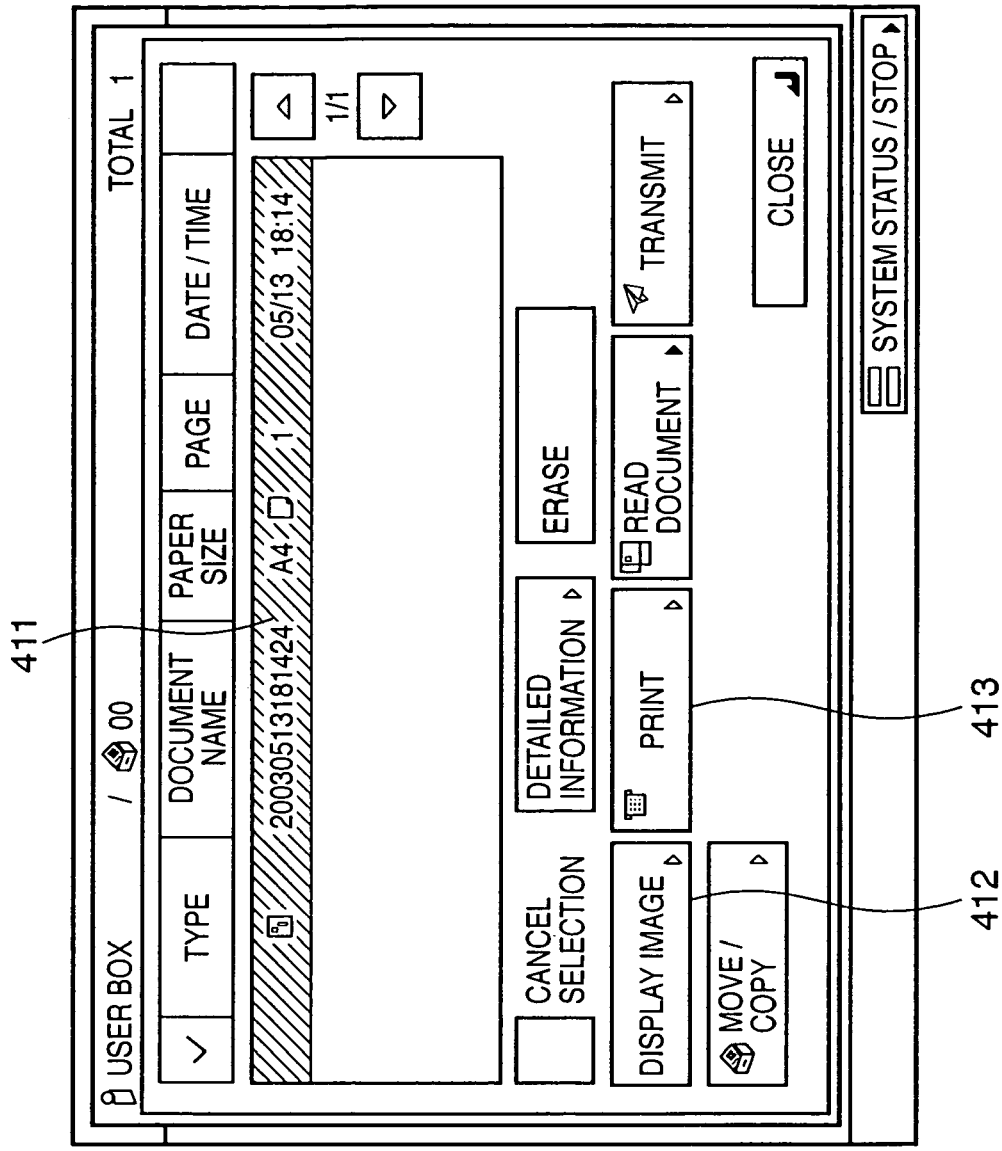
FIG. 41 is a view showing a window displayed when a row 402 in FIG. 40 is selected.

In this example, a document is already stored, as shown in FIG. 40. When a row 402 of this document is pressed, the document can be selected. FIG. 41 is a view showing a window displayed when the row 402 in FIG. 40 is selected. Referring to FIG. 41, a row 411 indicates that the row 402 in FIG. 40 is selected and highlighted. When the operator selects the document of the row 411, the document can be confirmed. When the operator presses an image display key 412, the window shown in FIG. 26 is displayed. Then, the same process as in the copy operation specifications is executed.

Figure 42:
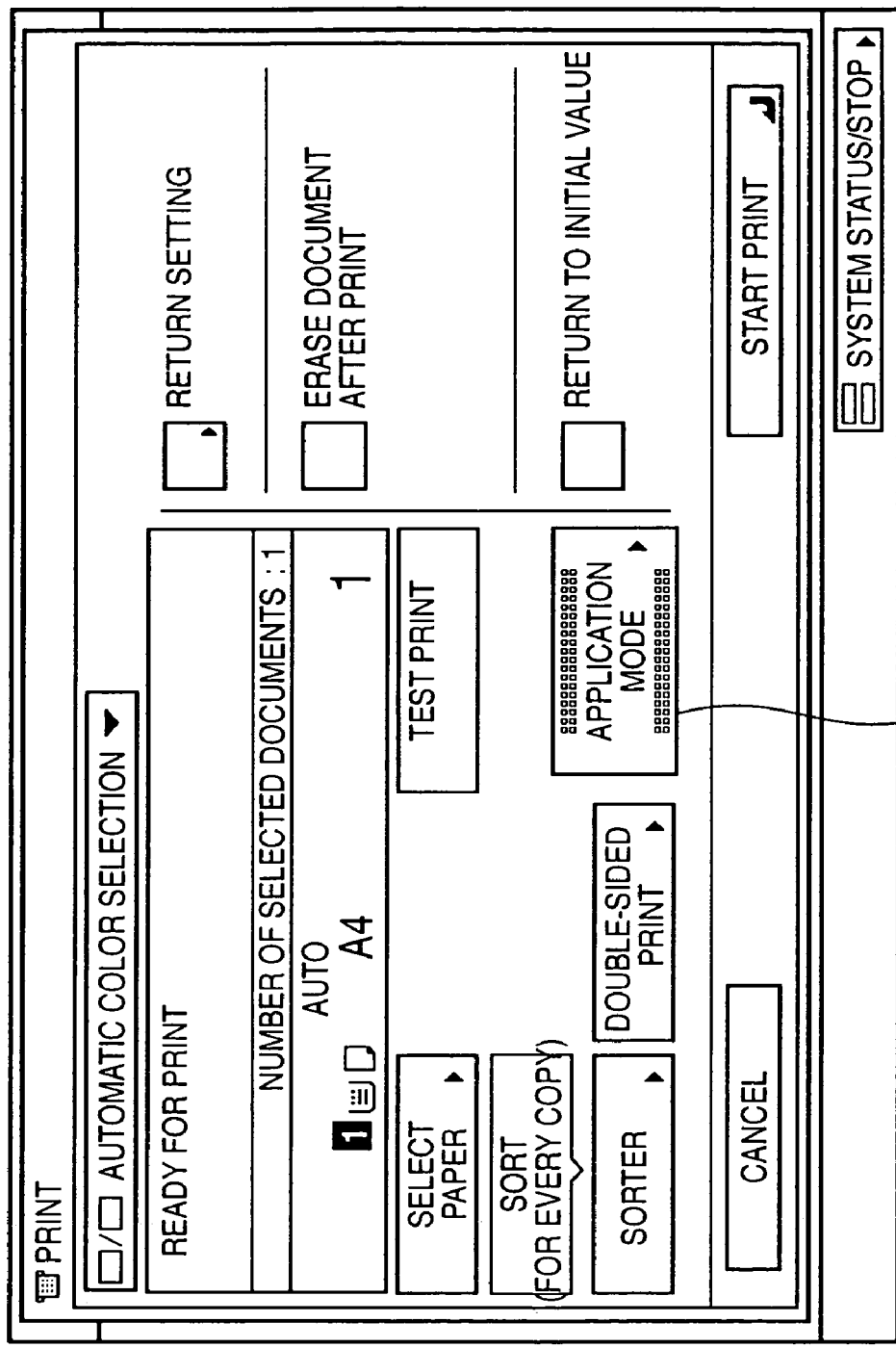
FIG. 42 is a view showing a window to execute print setting.

When the operator presses a print key 413 in the state shown in FIG. 41, a window shown in FIG. 42 is displayed so that print setting can be done. FIG. 42 is a view showing a window to execute print setting. When the operator presses an application mode key 421, the window shown in FIG. 26 is displayed. Then, the same process as in the copy operation specifications is executed.

EXAMPLE 2

Example 2 will be described next. Only different points from Example 1 will be described. In this example, an operation of canceling a representative object on the condition that a representative object referred to from another object cannot be a representative object will be described.

When the operator presses an already selected "New Original" key 266 in the window shown in FIG. 26, the "New Original" key 266 is turned off. When all object link keys 260 are turned off, the link to the representative object is canceled. The rectangular indicator at the center of a representative object select key 265 is turned off. The object indicated by a rectangle 261 is handled as an original object. The rectangle 261 is displayed in black representing an original object. Simultaneously, the rectangle at the center of the representative object select key 265, which indicates the selected object, changes to the same color (black).

Figure 43:
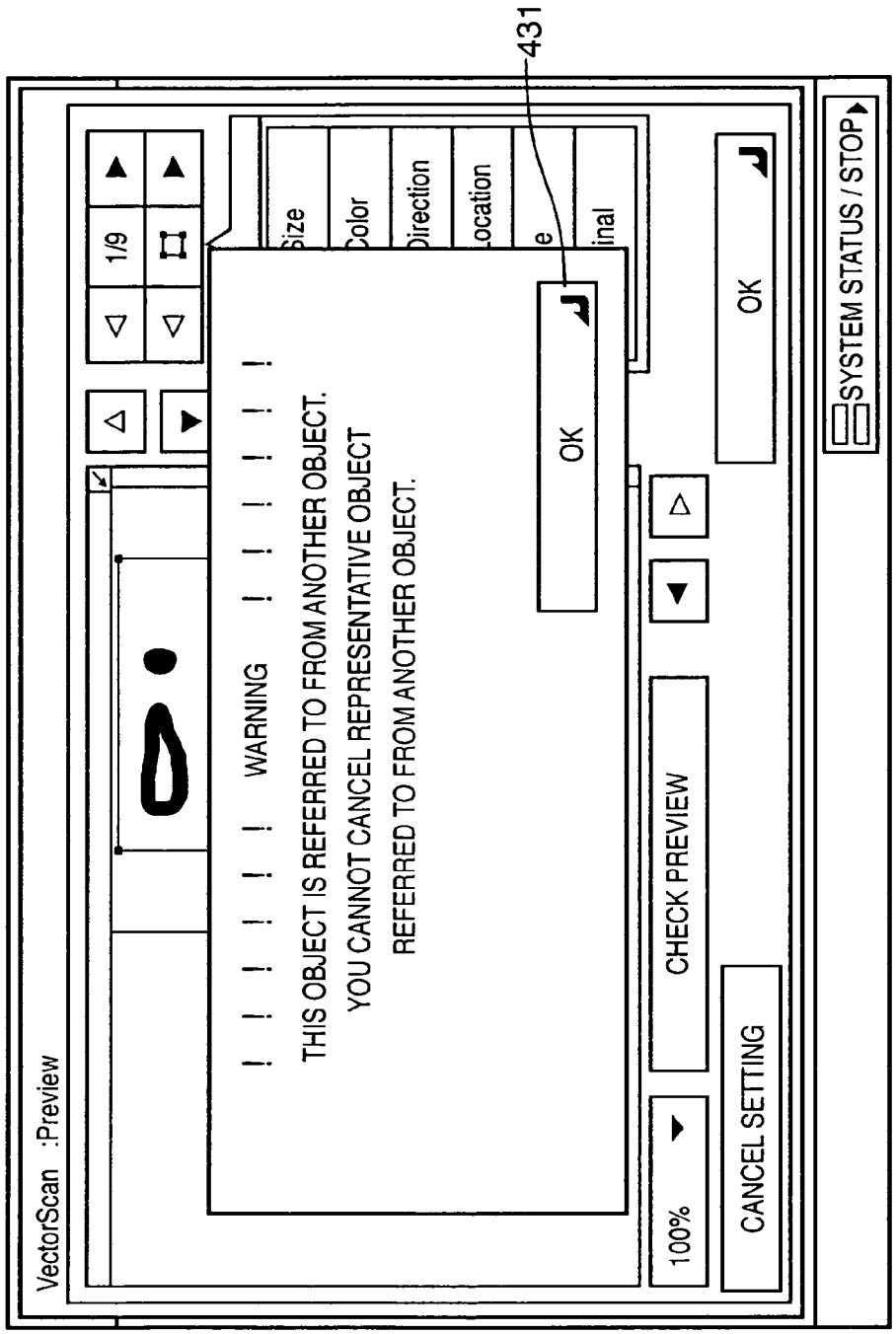
FIG. 43 is a view showing a window to display a warning message when a representative object referred to from another object is to be canceled.

When an object linked to the representative object is present, a message shown in FIG. 43 is displayed. FIG. 43 is a view showing a window to display a warning message when a representative object referred to from another object is to be canceled. When the operator presses an "OK" key 431, display returns to the window shown in FIG. 26, and the representative object is not deleted from the representative object list.

OTHER EMBODIMENT

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, for a representative object, all data are vectorized. For the same or similar object, a vectorized representative object is referred to, and difference data between the two objects is used. With this arrangement, efficient use of the memory is promoted. Additionally, the same or similar objects can be converted at once by editing only the representative object.

More specifically, when a document is to be held as image information, for all objects in the image, it is determined on the basis of a predetermined reference whether the objects are identical. For objects which can be determined as identical, only the vector data of a representative object is stored. For the remaining objects, reference to the representative object is shown. If a difference from the representative object is present, the difference is expressed by a description language. With this arrangement, the memory efficiency can be increased. Even in editing, all objects which are almost identical can be converted at once by editing only the representative object.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-200801 filed on Jul. 7, 2004, which is hereby incorporated by reference herein.

What is claimed is:

1. An image processing reproduction system comprising:
an input unit configured to input image information;
a vectorization unit configured to vectorize the input image information so that vector data of an object contained in the input image information is generated;
a first storage unit configured to store vector data of a first object contained in the input image information;
a first determination unit configured to determine whether or not the first object and a second object contained in the input image information are identical;
a second storage unit configured to store the vector data of the second object in a case where it is determined that the first object and the second object are not identical, and to store reference information related to vector data of the first object in place of vector data of the second object without storing the vector data of the second object in a case where it is determined that the first object and the second object are identical;

a second determination unit configured to determine from said reference information, in a case where an instruction is given to edit the vector data of the first object, whether or not the vector data of the first object is referred to, and whether or not editing according to the instruction disenables said reference information from referring to the vector data of an object that is identical to said second object;

an output unit configured to output warning information, when it is determined that the vector data of the first object is referred to from said reference information and that the editing according to the instruction disenables said reference information from referring to the vector data of an object that is identical to said second object;

a changing unit configured to change said stored reference information referring to vector data of the first object, so as to refer to other vector data which is different from the vector data of the first object;

a display unit configured to display the vectorized object on a screen so that each object can be distinguished; and a designation unit configured to designate one of the objects displayed on the screen by said display unit as a representative object that is to be referred to from another object, wherein the vector data of the first object is edited in a case where the editing is further instructed after the warning information is output.

2. The system according to claim 1, wherein said first determination unit determines an identity between the first object and the second object on the basis of a comparison result between the second object and an object reproduced from the vector data of the first object stored in said first storage unit.

3. The system according to claim 2, wherein said first determination unit determines on the basis of the comparison result between the reproduced object and the second object whether a difference component between the reproduced object and the second object falls within a predetermined range.

4. The system according to claim 1, wherein said first determination unit determines an identity between the first object and the second object on the basis of a comparison result between the vector data of the first object stored in said first storage unit and the vector data of the second object.

5. The system according to claim 4, wherein said first determination unit determines on the basis of the comparison result between the vector data of the first object and the vector data of the second object whether a difference component between the vector data of the first object and the vector data of the second object falls within a predetermined range.

6. The system according to claim 1, further comprising a display unit configured to display the second object on a screen, and a reception unit, configured to receive an operator's instruction from the screen.

7. The system according to claim 6, wherein said display unit displays, on the screen, the second object serving as one object unit surrounded by a rectangular graphic.

8. The system according to claim 7, further comprising a registration unit configured to register, as a representative object that is to be referred to from another object, the second object displayed by the rectangle on the screen by said display unit.

9. The system according to claim 1, wherein said first determination unit determines, in a process of causing said vectorization unit to vectorize the input image information, whether or not the first object and the second object are identical.

10. An image processing method comprising:

inputting image information;

vectorizing the input image information so that vector data of an object contained in the input image information is generated;

storing, in a storage device, vector data of a first object contained in the input image information;

determining whether or not the first object and a second object contained in the input image information are identical;

storing in the storage device the vector data of the second object in a case where it is determined that the first object and the second object are not identical, and storing in the storage device reference information related to the vector data of the first object in place of the vector data of the second object without storing the vector data of the second object in a case where it is determined that the first object and the second object are identical;

determining from said reference information, in a case where an instruction is given to edit the vector data of the first object, whether or not the vector data of the first object is referred to, and whether or not editing according to the instruction disenables said reference information from referring to the vector data of an object that is identical to said second object;

outputting warning information, when it is determined that the vector data of the first object is referred to from said reference information and that the editing according to the instruction disenables said reference information from referring to the vector data of an object that is identical to said second object;

changing said stored reference information referring to vector data of the first object, so as to refer to other vector data which is different from the vector data of the first object;

wherein the vector data of the first object is edited in a case where the editing is further instructed after the warning information is output.

11. A computer-readable storage medium storing an executable software program that causes a computer to perform the following:

inputting image information;

vectorizing the input image information so that vector data of an object contained in the input image information is generated;

storing, in a storage device, vector data of a first object contained in the input image information;

determining whether or not the first object and a second object contained in the input image information are identical;

storing in the storage device the vector data of the second object in a case where it is determined that the first object and the second object are not identical, and storing in the storage device reference information related to the vector data of the first object in place of the vector data of the second object without storing the vector data of the second object in a case where it is determined that the first object and the second object are identical;

determining from said reference information, in a case where an instruction is given to edit the vector data of the first object, whether or not the vector data of the first object is referred to, and whether or not editing according to the instruction disenables said reference information from referring to the vector data of an object that is identical to said second object;

outputting warning information, when it is determined that the vector data of the first object is referred to from said reference information and that the editing according to the instruction disenables said reference information from referring to the vector data of an object that is identical to said second object; and changing said stored reference information referring to vector data of the first object, so as to refer to other vector data which is different from the vector data of the first object;

wherein the vector data of the first object is edited in a case where the editing is further instructed after the warning information is output.

* * * * *